US011561542B2

(12) United States Patent
Shashua et al.

(10) Patent No.: US 11,561,542 B2
(45) Date of Patent: Jan. 24, 2023

(54) SAFETY AND COMFORT CONSTRAINTS FOR NAVIGATION

(71) Applicant: Mobileye Vision Technologies Ltd., Jerusalem (IL)

(72) Inventors: Amnon Shashua, Mevasseret Zion (IL); Shai Shalev-Shwartz, Jerusalem (IL); Shaked Shammah, Jerusalem (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 151 days.

(21) Appl. No.: 16/694,517

(22) Filed: Nov. 25, 2019

(65) Prior Publication Data

US 2020/0088539 A1    Mar. 19, 2020

Related U.S. Application Data

(63) Continuation of application No. PCT/IB2018/000808, filed on Jun. 14, 2018.
(Continued)

(51) Int. Cl.
*G01C 22/00* (2006.01)
*G05D 1/00* (2006.01)
(Continued)

(52) U.S. Cl.
CPC .......... *G05D 1/0088* (2013.01); *G01C 21/30* (2013.01); *G01C 21/3602* (2013.01);
(Continued)

(58) Field of Classification Search
CPC ..... G01C 21/30; G01C 21/3602; G01S 17/00; G05D 1/0088; G05D 1/0246;
(Continued)

(56) References Cited

U.S. PATENT DOCUMENTS 5,938,710 A * 8/1999 Lanza ................... B66F 9/0755
701/50
10,040,450 B1 * 8/2018 Pal ....................... G05D 1/0088
(Continued)

FOREIGN PATENT DOCUMENTS

DE    102011117100         5/2012
DE    102011117100 A1      5/2012
(Continued)

OTHER PUBLICATIONS

International Search Report and Written Opinion for International Application No. PCT/IB2018/000808 dated Jun. 14, 2018 (17 pages).
(Continued)

*Primary Examiner* — Harry Y Oh
(74) *Attorney, Agent, or Firm* — Finnegan, Henderson, Farabow, Garrett & Dunner, LLP

(57) ABSTRACT

A navigational system for a host vehicle may comprise at least one processing device. The processing device may be programmed to receive a first output and a second output associated with the host vehicle; identify a representation of a target object in the first output; and determine whether a characteristic of the target object triggers a navigational constraint. If the navigational constraint is not triggered, the processing device may verify the identification of the representation of the target object based on a combination of the first output and the second output. If the navigational constraint is triggered, the processing device may verify the identification of the representation of the target object based on the first output; and in response to the verification, cause at least one navigational change to the host vehicle.

19 Claims, 34 Drawing Sheets

Related U.S. Application Data

(60) Provisional application No. 62/519,471, filed on Jun. 14, 2017, provisional application No. 62/519,493, filed on Jun. 14, 2017.

(51) Int. Cl.
  *G01C 21/30* (2006.01)
  *G01C 21/36* (2006.01)
  *G05D 1/02* (2020.01)
  *G06K 9/62* (2022.01)
  *G06V 20/56* (2022.01)

(52) U.S. Cl.
  CPC ......... *G05D 1/0246* (2013.01); *G05D 1/0276* (2013.01); *G06K 9/6289* (2013.01); *G06V 20/56* (2022.01); *G06V 20/588* (2022.01); *G05D 2201/0212* (2013.01); *G05D 2201/0213* (2013.01)

(58) Field of Classification Search
  CPC ......... G05D 1/0276; G05D 2201/0212; G05D 2201/0213; G06K 9/00791; G06K 9/00798; G06K 9/6289; B60W 2556/20; B60W 2556/25; B60W 60/001
  See application file for complete search history.

(56) References Cited

U.S. PATENT DOCUMENTS

| | | | |
|---|---|---|---|
| 2005/0131646 A1* | 6/2005 | Camus | G01S 3/7864 |
| | | | 701/301 |
| 2010/0202657 A1 | 8/2010 | Garbis et al. | |
| 2015/0266471 A1 | 9/2015 | Ferguson et al. | |
| 2016/0292905 A1* | 10/2016 | Nehmadi | G06K 9/00825 |

FOREIGN PATENT DOCUMENTS

| | | |
|---|---|---|
| DE | 102013020435 A1 | 6/2014 |
| KR | 10-2013-0015740 A | 2/2013 |
| KR | 10-2016-0035099 A | 3/2016 |
| WO | WO 2016/122969 A1 | 8/2016 |

OTHER PUBLICATIONS

European Search Report for Application No. 20182733.4-1001, dated Oct. 15, 2020 (9 pages).

\* cited by examiner

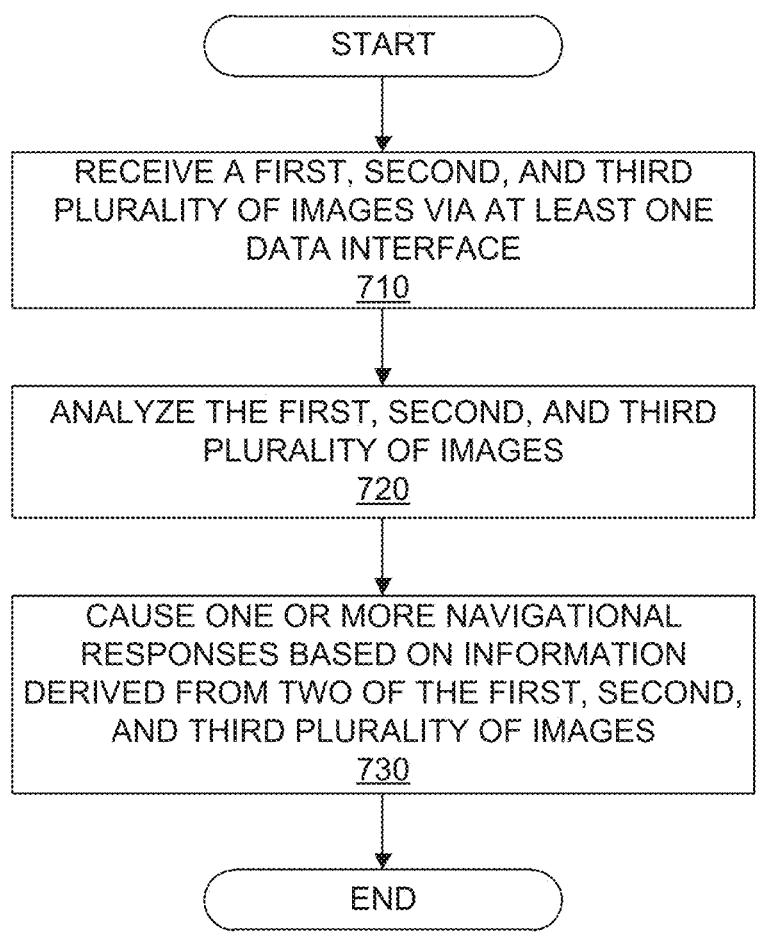

SAFETY AND COMFORT CONSTRAINTS FOR NAVIGATION

CROSS-REFERENCES TO RELATED APPLICATIONS

This application is a continuation of PCT International Application No. PCT/IB2018/000808, filed Jun. 14, 2018, which claims the benefit of priority of U.S. Provisional Patent Application No. 62/519,471, filed on Jun. 14, 2017, and United States Provisional Patent Application No. 62/519,493, filed on Jun. 14, 2017. All of the foregoing applications are incorporated herein by reference in their entirety.

BACKGROUND

Technical Field

The present disclosure relates generally to autonomous vehicle navigation.

Background Information

As technology continues to advance, the goal of a fully autonomous vehicle that is capable of navigating on roadways is on the horizon. Autonomous vehicles may need to take into account a variety of factors and make appropriate decisions based on those factors to safely and accurately reach an intended destination. For example, an autonomous vehicle may need to process and interpret visual information (e.g., information captured from a camera) and may also use information obtained from other sources (e.g., from a GPS device, a speed sensor, an accelerometer, a suspension sensor, etc.). At the same time, in order to navigate to a destination, an autonomous vehicle may also need to identify its location within a particular roadway (e.g., a specific lane within a multi-lane road), navigate alongside other vehicles, avoid obstacles and pedestrians, observe traffic signals and signs, and travel from on road to another road at appropriate intersections or interchanges. Harnessing and interpreting vast volumes of information collected by an autonomous vehicle as the vehicle travels to its destination poses a multitude of design challenges. The sheer quantity of data (e.g., captured image data, map data, GPS data, sensor data, etc.) that an autonomous vehicle may need to analyze, access, and/or store poses challenges that can in fact limit or even adversely affect autonomous navigation. Furthermore, if an autonomous vehicle relies on traditional mapping technology to navigate, the sheer volume of data needed to store and update the map poses daunting challenges.

In addition to the collection of data for updating the map, autonomous vehicles must be able to use the map for navigation. Accordingly, the size and detail of the map must be optimized, as well as the construction and transmission thereof. In addition, the autonomous vehicle must navigate using the map as well as using constraints based on the surrounding of the vehicle to ensure safety of its passengers and other drivers and pedestrians on the roadway.

SUMMARY

Embodiments consistent with the present disclosure provide systems and methods for autonomous vehicle navigation. The disclosed embodiments may use cameras to provide autonomous vehicle navigation features. For example, consistent with the disclosed embodiments, the disclosed systems may include one, two, or more cameras that monitor the environment of a vehicle. The disclosed systems may provide a navigational response based on, for example, an analysis of images captured by one or more of the cameras. The disclosed systems may also provide for constructing and navigating with a crowdsourced sparse map. Other disclosed systems may use relevant analysis of images to perform localization that may supplement navigation with a sparse map. The navigational response may also take into account other data including, for example, global positioning system (GPS) data, sensor data (e.g., from an accelerometer, a speed sensor, a suspension sensor, etc.), and/or other map data. Finally, disclosed embodiments may use comfort and safety constraints to fuse data from a plurality of sources, such as cameras, sensors, maps, or the like, in order to optimize the vehicle's navigation without endangering other drivers and pedestrians.

In one embodiment, a navigational system for a host vehicle, the navigational system may comprise at least one processing device. The at least one processing device may be programmed to receive a first output from a first data source associated with the host vehicle and a second output from a second data source associated with the host vehicle. At least one of the first data source and the second data source may comprise a sensor onboard the host vehicle. The at least one processing device may be further programmed to: identify a representation of a target object in the first output; determine whether a characteristic of the target object triggers at least one navigational constraint; if the at least one navigational constraint is not triggered by the characteristic of the target object, verify the identification of the representation of the target object based on a combination of the first output and the second output; if the at least one navigational constraint is triggered by the characteristic of the target object, verify the identification of the representation of the target object based on the first output; and in response to the verification, cause at least one navigational change to the host vehicle.

In one embodiment, a computer-implemented method for navigating a host vehicle may comprise receiving a first output from a first data source associated with the host vehicle and a second output from a second data source associated with the host vehicle. At least one of the first data source and the second data source may comprise a sensor onboard the host vehicle. The method may further comprise identifying a representation of a target object in the first output; determining whether a characteristic of the target object triggers at least one navigational constraint; if the at least one navigational constraint is not triggered by the characteristic of the target object, verifying the identification of the representation of the target object based on a combination of the first output and the second output; if the at least one navigational constraint is triggered by the characteristic of the target object, verifying the identification of the representation of the target object based on the first output; and in response to the verification, causing at least one navigational change to the host vehicle.

In one embodiment, a server for aligning navigation information from a plurality of vehicles may comprise at least one processing device. The at least one processing device may be programmed to receive the navigation information from the plurality of vehicles. The navigation information from the plurality of vehicles may be associated with a common road segment. The at least one processing device may be further programmed to align the navigation information within a coordinate system local to the common road segment. The local coordinate system may comprise a coordinate system based on a plurality of images captured by image sensors included on the plurality of vehicles. The at least one processing device may be further programmed to store the aligned navigational information in association with the common road segment and distribute the aligned navigational information to one or more autonomous vehicles for use in autonomously navigating the one or more autonomous vehicles along the common road segment.

In one embodiment, a computer-implemented method for aligning navigation information from a plurality of vehicles may comprise receiving the navigation information from the plurality of vehicles. The navigation information from the plurality of vehicles may be associated with a common road segment. The method may further comprise aligning the navigation information within a coordinate system local to the common road segment. The local coordinate system may comprise a coordinate system based on a plurality of images captured by image sensors included on the plurality of vehicles. The method may further comprise storing the aligned navigational information in association with the common road segment and distributing the aligned navigational information to one or more autonomous vehicles for use in autonomously navigating the one or more autonomous vehicles along the common road segment.

Consistent with other disclosed embodiments, non-transitory computer-readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 7 is a flowchart showing an exemplary process for causing one or more navigational responses based on an analysis of three sets of images consistent with the disclosed embodiments.

DETAILED DESCRIPTION

Figure 1:
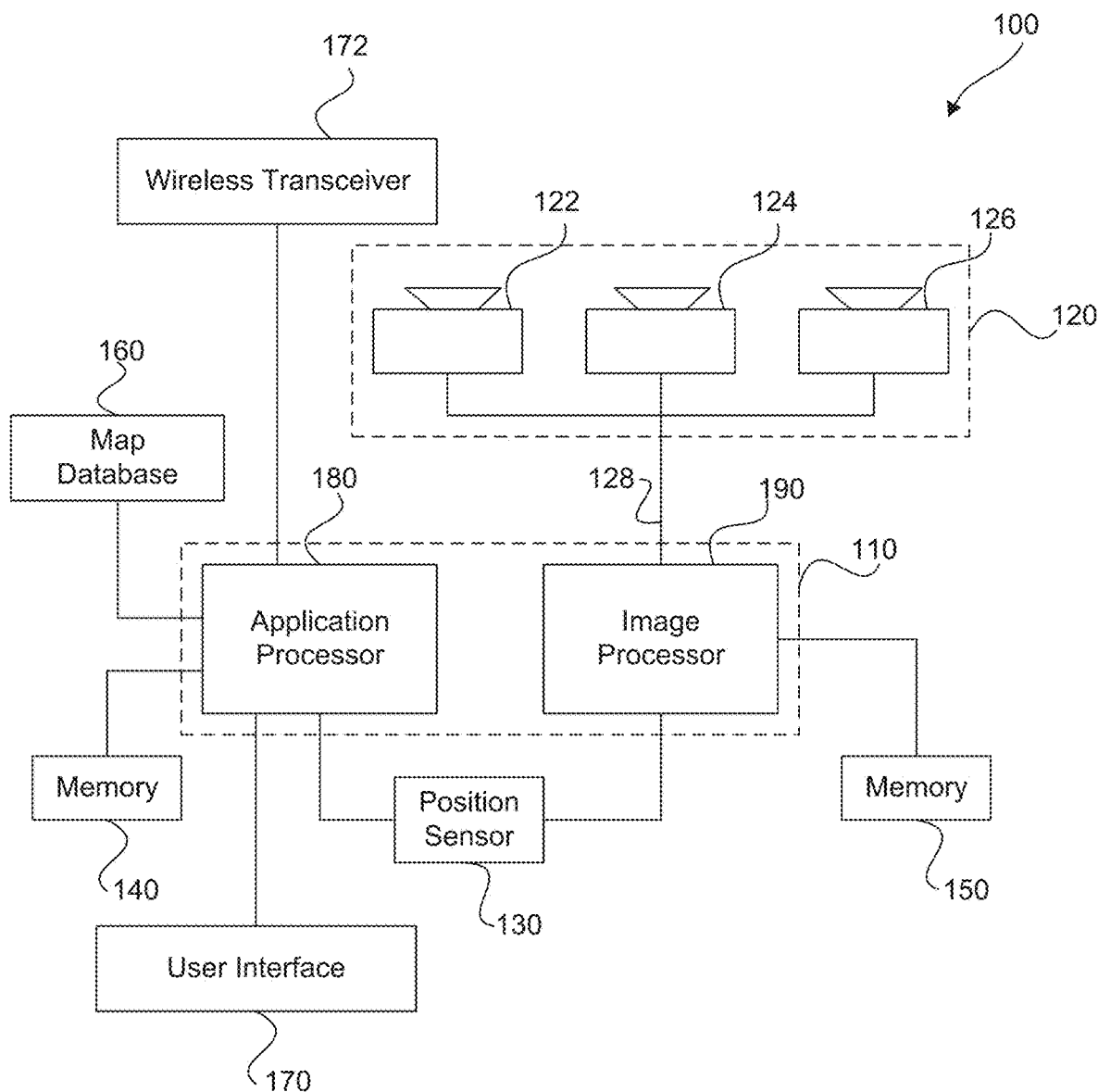
FIG. 1 is a diagrammatic representation of an exemplary system consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Autonomous Vehicle Overview

As used throughout this disclosure, the term "autonomous vehicle" refers to a vehicle capable of implementing at least one navigational change without driver input. A "navigational change" refers to a change in one or more of steering, braking, or acceleration of the vehicle. To be autonomous, a vehicle need not be fully automatic (e.g., fully operation without a driver or without driver input). Rather, an autonomous vehicle includes those that can operate under driver control during certain time periods and without driver control during other time periods. Autonomous vehicles may also include vehicles that control only some aspects of vehicle navigation, such as steering (e.g., to maintain a vehicle course between vehicle lane constraints), but may leave other aspects to the driver (e.g., braking) In some cases, autonomous vehicles may handle some or all aspects of braking, speed control, and/or steering of the vehicle.

As human drivers typically rely on visual cues and observations order to control a vehicle, transportation infrastructures are built accordingly, with lane markings, traffic signs, and traffic lights are all designed to provide visual information to drivers. In view of these design characteristics of transportation infrastructures, an autonomous vehicle may include a camera and a processing unit that analyzes visual information captured from the environment of the vehicle. The visual information may include, for example, components of the transportation infrastructure (e.g., lane markings, traffic signs, traffic lights, etc.) that are observable by drivers and other obstacles (e.g., other vehicles, pedestrians, debris, etc.). Additionally, an autonomous vehicle may also use stored information, such as information that provides a model of the vehicle's environment when navigating. For example, the vehicle may use GPS data, sensor data (e.g., from an accelerometer, a speed sensor, a suspension sensor, etc.), and/or other map data to provide information related to its environment while the vehicle is traveling, and the vehicle (as well as other vehicles) may use the information to localize itself on the model.

In some embodiments in this disclosure, an autonomous vehicle may use information obtained while navigating (e.g., from a camera, GPS device, an accelerometer, a speed sensor, a suspension sensor, etc.). In other embodiments, an autonomous vehicle may use information obtained from past navigations by the vehicle (or by other vehicles) while navigating. In yet other embodiments, an autonomous vehicle may use a combination of information obtained while navigating and information obtained from past navigations. The following sections provide an overview of a system consistent with the disclosed embodiments, following by an overview of a forward-facing imaging system and methods consistent with the system. The sections that follow disclose systems and methods for constructing, using, and updating a sparse map for autonomous vehicle navigation.

System Overview

FIG. 1 is a block diagram representation of a system 100 consistent with the exemplary disclosed embodiments. System 100 may include various components depending on the requirements of a particular implementation. In some embodiments, system 100 may include a processing unit 110, an image acquisition unit 120, a position sensor 130, one or more memory units 140, 150, a map database 160, a user interface 170, and a wireless transceiver 172. Processing unit 110 may include one or more processing devices. In some embodiments, processing unit 110 may include an applications processor 180, an image processor 190, or any other suitable processing device. Similarly, image acquisition unit 120 may include any number of image acquisition devices and components depending on the requirements of a particular application. In some embodiments, image acquisition unit 120 may include one or more image capture devices (e.g., cameras), such as image capture device 122, image capture device 124, and image capture device 126. System 100 may also include a data interface 128 communicatively connecting processing device 110 to image acquisition device 120. For example, data interface 128 may include any wired and/or wireless link or links for transmitting image data acquired by image accusation device 120 to processing unit 110.

Wireless transceiver 172 may include one or more devices configured to exchange transmissions over an air interface to one or more networks (e.g., cellular, the Internet, etc.) by use of a radio frequency, infrared frequency, magnetic field, or an electric field. Wireless transceiver 172 may use any known standard to transmit and/or receive data (e.g., Wi-Fi, Bluetooth®, Bluetooth Smart, 802.15.4, ZigBee, etc.). Such transmissions can include communications from the host vehicle to one or more remotely located servers. Such transmissions may also include communications (one-way or two-way) between the host vehicle and one or more target vehicles in an environment of the host vehicle (e.g., to facilitate coordination of navigation of the host vehicle in view of or together with target vehicles in the environment of the host vehicle), or even a broadcast transmission to unspecified recipients in a vicinity of the transmitting vehicle.

Both applications processor 180 and image processor 190 may include various types of processing devices. For example, either or both of applications processor 180 and image processor 190 may include a microprocessor, preprocessors (such as an image preprocessor), a graphics processing unit (GPU), a central processing unit (CPU), support circuits, digital signal processors, integrated circuits, memory, or any other types of devices suitable for running applications and for image processing and analysis. In some embodiments, applications processor 180 and/or image processor 190 may include any type of single or multi-core processor, mobile device microcontroller, central processing unit, etc. Various processing devices may be used, including, for example, processors available from manufacturers such as Intel®, AMD®, etc., or GPUs available from manufacturers such as NVIDIA®, ATI®, etc. and may include various architectures (e.g., x86 processor, ARM®, etc.).

In some embodiments, applications processor 180 and/or image processor 190 may include any of the EyeQ series of processor chips available from Mobileye®. These processor designs each include multiple processing units with local memory and instruction sets. Such processors may include video inputs for receiving image data from multiple image sensors and may also include video out capabilities. In one example, the EyeQ2® uses 90 nm-micron technology operating at 332 Mhz. The EyeQ2® architecture consists of two floating point, hyper-thread 32-bit RISC CPUs (MIPS32® 34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMP™ and the DMA, the second MIPS34K CPU and the multi-channel DMA as well as the other peripherals. The five VCEs, three VMP® and the MIPS34K CPU can perform intensive vision computations required by multi-function bundle applications. In another example, the EyeQ3®, which is a third generation processor and is six times more powerful that the EyeQ2®, may be used in the disclosed embodiments. In other examples, the EyeQ4® and/or the EyeQ5® may be used in the disclosed embodiments. Of course, any newer or future EyeQ processing devices may also be used together with the disclosed embodiments.

Any of the processing devices disclosed herein may be configured to perform certain functions. Configuring a processing device, such as any of the described EyeQ processors or other controller or microprocessor, to perform certain functions may include programming of computer executable instructions and making those instructions available to the processing device for execution during operation of the processing device. In some embodiments, configuring a processing device may include programming the processing device directly with architectural instructions. For example, processing devices such as field-programmable gate arrays (FPGAs), application-specific integrated circuits (ASICs), and the like may be configured using, for example, one or more hardware description languages (HDLs).

In other embodiments, configuring a processing device may include storing executable instructions on a memory that is accessible to the processing device during operation. For example, the processing device may access the memory to obtain and execute the stored instructions during operation. In either case, the processing device configured to perform the sensing, image analysis, and/or navigational functions disclosed herein represents a specialized hardware-based system in control of multiple hardware based components of a host vehicle.

While FIG. 1 depicts two separate processing devices included in processing unit 110, more or fewer processing devices may be used. For example, in some embodiments, a single processing device may be used to accomplish the tasks of applications processor 180 and image processor 190. In other embodiments, these tasks may be performed by more than two processing devices. Further, in some embodiments, system 100 may include one or more of processing unit 110 without including other components, such as image acquisition unit 120.

Processing unit 110 may comprise various types of devices. For example, processing unit 110 may include various devices, such as a controller, an image preprocessor, a central processing unit (CPU), a graphics processing unit (GPU), support circuits, digital signal processors, integrated circuits, memory, or any other types of devices for image processing and analysis. The image preprocessor may include a video processor for capturing, digitizing and processing the imagery from the image sensors. The CPU may comprise any number of microcontrollers or microprocessors. The GPU may also comprise any number of microcontrollers or microprocessors. The support circuits may be any number of circuits generally well known in the art, including cache, power supply, clock and input-output circuits. The memory may store software that, when executed by the processor, controls the operation of the system. The memory may include databases and image processing software. The memory may comprise any number of random access memories, read only memories, flash memories, disk drives, optical storage, tape storage, removable storage and other types of storage. In one instance, the memory may be separate from the processing unit 110. In another instance, the memory may be integrated into the processing unit 110.

Each memory 140, 150 may include software instructions that when executed by a processor (e.g., applications processor 180 and/or image processor 190), may control operation of various aspects of system 100. These memory units may include various databases and image processing software, as well as a trained system, such as a neural network, or a deep neural network, for example. The memory units may include random access memory (RAM), read only memory (ROM), flash memory, disk drives, optical storage, tape storage, removable storage and/or any other types of storage. In some embodiments, memory units 140, 150 may be separate from the applications processor 180 and/or image processor 190. In other embodiments, these memory units may be integrated into applications processor 180 and/or image processor 190.

Position sensor 130 may include any type of device suitable for determining a location associated with at least one component of system 100. In some embodiments, position sensor 130 may include a GPS receiver. Such receivers can determine a user position and velocity by processing signals broadcasted by global positioning system satellites. Position information from position sensor 130 may be made available to applications processor 180 and/or image processor 190.

In some embodiments, system 100 may include components such as a speed sensor (e.g., a tachometer, a speedometer) for measuring a speed of vehicle 200 and/or an accelerometer (either single axis or multiaxis) for measuring acceleration of vehicle 200.

User interface 170 may include any device suitable for providing information to or for receiving inputs from one or more users of system 100. In some embodiments, user interface 170 may include user input devices, including, for example, a touchscreen, microphone, keyboard, pointer devices, track wheels, cameras, knobs, buttons, etc. With such input devices, a user may be able to provide information inputs or commands to system 100 by typing instructions or information, providing voice commands, selecting menu options on a screen using buttons, pointers, or eye-tracking capabilities, or through any other suitable techniques for communicating information to system 100.

User interface 170 may be equipped with one or more processing devices configured to provide and receive information to or from a user and process that information for use by, for example, applications processor 180. In some embodiments, such processing devices may execute instructions for recognizing and tracking eye movements, receiving and interpreting voice commands, recognizing and interpreting touches and/or gestures made on a touchscreen, responding to keyboard entries or menu selections, etc. In some embodiments, user interface 170 may include a display, speaker, tactile device, and/or any other devices for providing output information to a user.

Map database 160 may include any type of database for storing map data useful to system 100. In some embodiments, map database 160 may include data relating to the position, in a reference coordinate system, of various items, including roads, water features, geographic features, businesses, points of interest, restaurants, gas stations, etc. Map database 160 may store not only the locations of such items, but also descriptors relating to those items, including, for example, names associated with any of the stored features. In some embodiments, map database 160 may be physically located with other components of system 100. Alternatively or additionally, map database 160 or a portion thereof may be located remotely with respect to other components of system 100 (e.g., processing unit 110). In such embodiments, information from map database 160 may be downloaded over a wired or wireless data connection to a network (e.g., over a cellular network and/or the Internet, etc.). In some cases, map database 160 may store a sparse data model including polynomial representations of certain road features (e.g., lane markings) or target trajectories for the host vehicle. Systems and methods of generating such a map are discussed below with references to FIGS. 8-19.

Image capture devices 122, 124, and 126 may each include any type of device suitable for capturing at least one image from an environment. Moreover, any number of image capture devices may be used to acquire images for input to the image processor. Some embodiments may include only a single image capture device, while other embodiments may include two, three, or even four or more image capture devices. Image capture devices 122, 124, and 126 will be further described with reference to FIGS. 2B-2E, below.

Figure 2A:
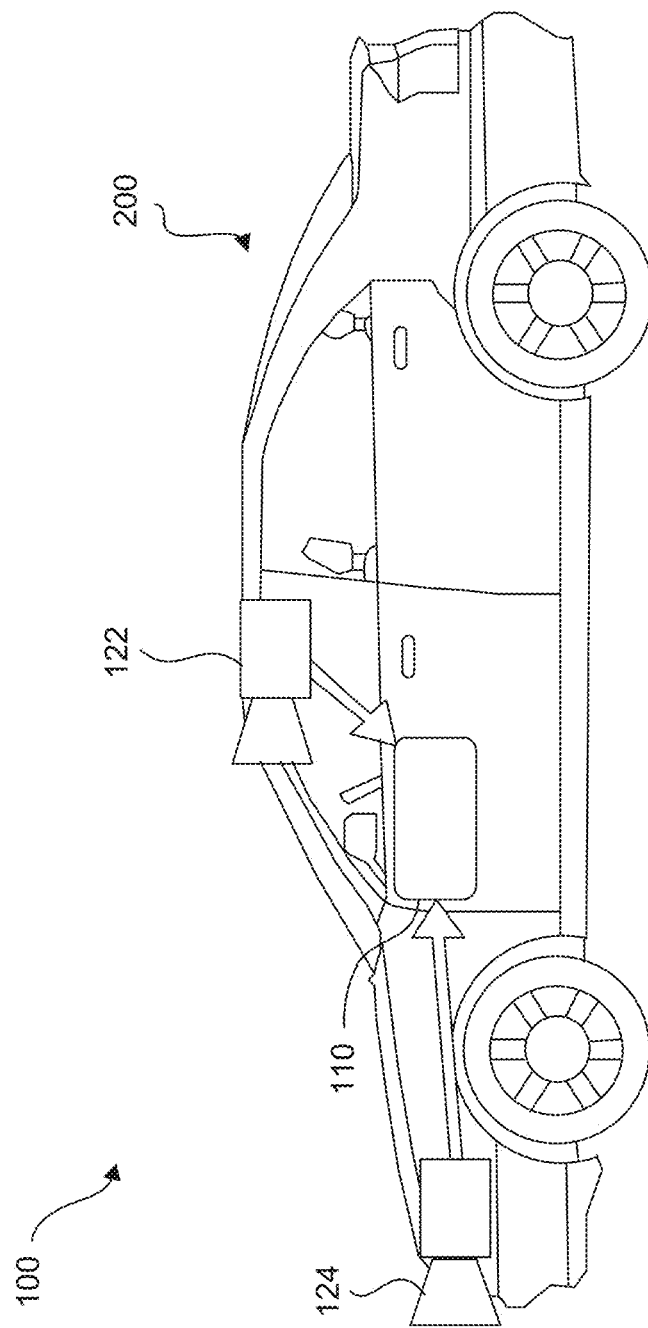
FIG. 2A is a diagrammatic side view representation of an exemplary vehicle including a system consistent with the disclosed embodiments.

System 100, or various components thereof, may be incorporated into various different platforms. In some embodiments, system 100 may be included on a vehicle 200, as shown in FIG. 2A. For example, vehicle 200 may be equipped with a processing unit 110 and any of the other components of system 100, as described above relative to FIG. 1. While in some embodiments vehicle 200 may be equipped with only a single image capture device (e.g., camera), in other embodiments, such as those discussed in connection with FIGS. 2B-2E, multiple image capture devices may be used. For example, either of image capture devices 122 and 124 of vehicle 200, as shown in FIG. 2A, may be part of an ADAS (Advanced Driver Assistance Systems) imaging set.

The image capture devices included on vehicle 200 as part of the image acquisition unit 120 may be positioned at any suitable location. In some embodiments, as shown in FIGS. 2A-2E and 3A-3C, image capture device 122 may be located in the vicinity of the rearview mirror. This position may provide a line of sight similar to that of the driver of vehicle 200, which may aid in determining what is and is not visible to the driver. Image capture device 122 may be positioned at any location near the rearview mirror, but placing image capture device 122 on the driver side of the mirror may further aid in obtaining images representative of the driver's field of view and/or line of sight.

Other locations for the image capture devices of image acquisition unit 120 may also be used. For example, image capture device 124 may be located on or in a bumper of vehicle 200. Such a location may be especially suitable for image capture devices having a wide field of view. The line of sight of bumper-located image capture devices can be different from that of the driver and, therefore, the bumper image capture device and driver may not always see the same objects. The image capture devices (e.g., image capture devices 122, 124, and 126) may also be located in other locations. For example, the image capture devices may be located on or in one or both of the side mirrors of vehicle 200, on the roof of vehicle 200, on the hood of vehicle 200, on the trunk of vehicle 200, on the sides of vehicle 200, mounted on, positioned behind, or positioned in front of any of the windows of vehicle 200, and mounted in or near light figures on the front and/or back of vehicle 200, etc.

In addition to image capture devices, vehicle 200 may include various other components of system 100. For example, processing unit 110 may be included on vehicle 200 either integrated with or separate from an engine control unit (ECU) of the vehicle. Vehicle 200 may also be equipped with a position sensor 130, such as a GPS receiver and may also include a map database 160 and memory units 140 and 150.

As discussed earlier, wireless transceiver 172 may and/or receive data over one or more networks (e.g., cellular networks, the Internet, etc.). For example, wireless transceiver 172 may upload data collected by system 100 to one or more servers, and download data from the one or more servers.

Via wireless transceiver 172, system 100 may receive, for example, periodic or on demand updates to data stored in map database 160, memory 140, and/or memory 150. Similarly, wireless transceiver 172 may upload any data (e.g., images captured by image acquisition unit 120, data received by position sensor 130 or other sensors, vehicle control systems, etc.) from by system 100 and/or any data processed by processing unit 110 to the one or more servers.

System 100 may upload data to a server (e.g., to the cloud) based on a privacy level setting. For example, system 100 may implement privacy level settings to regulate or limit the types of data (including metadata) sent to the server that may uniquely identify a vehicle and or driver/owner of a vehicle. Such settings may be set by user via, for example, wireless transceiver 172, be initialized by factory default settings, or by data received by wireless transceiver 172.

In some embodiments, system 100 may upload data according to a "high" privacy level, and under setting a setting, system 100 may transmit data (e.g., location information related to a route, captured images, etc.) without any details about the specific vehicle and/or driver/owner. For example, when uploading data according to a "high" privacy setting, system 100 may not include a vehicle identification number (VIN) or a name of a driver or owner of the vehicle, and may instead of transmit data, such as captured images and/or limited location information related to a route.

Other privacy levels are contemplated. For example, system 100 may transmit data to a server according to an "intermediate" privacy level and include additional information not included under a "high" privacy level, such as a make and/or model of a vehicle and/or a vehicle type (e.g., a passenger vehicle, sport utility vehicle, truck, etc.). In some embodiments, system 100 may upload data according to a "low" privacy level. Under a "low" privacy level setting, system 100 may upload data and include information sufficient to uniquely identify a specific vehicle, owner/driver, and/or a portion or entirely of a route traveled by the vehicle. Such "low" privacy level data may include one or more of, for example, a VIN, a driver/owner name, an origination point of a vehicle prior to departure, an intended destination of the vehicle, a make and/or model of the vehicle, a type of the vehicle, etc.

Figure 2B:
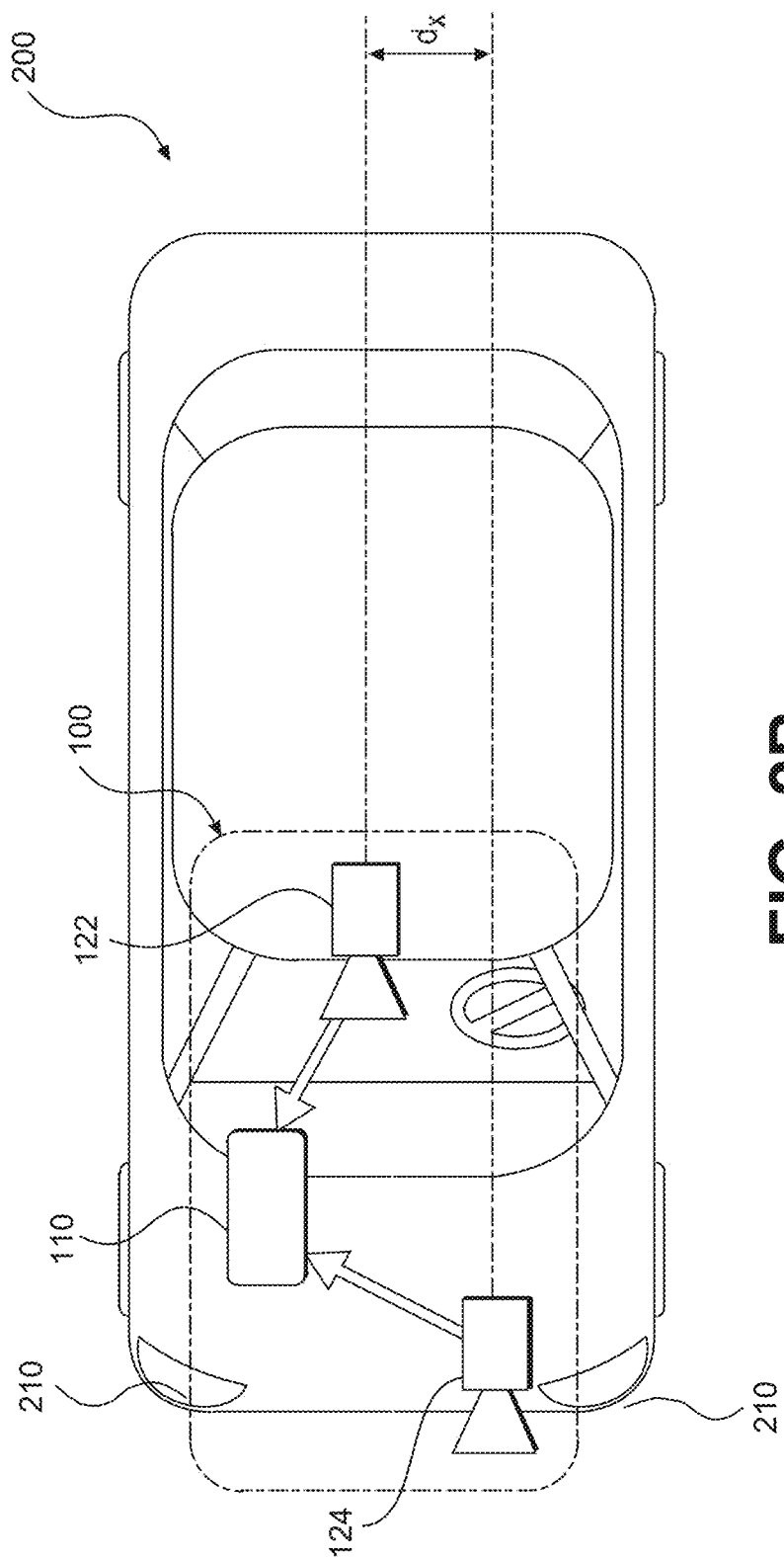
FIG. 2B is a diagrammatic top view representation of the vehicle and system shown in FIG. 2A consistent with the disclosed embodiments.

FIG. 2A is a diagrammatic side view representation of an exemplary vehicle imaging system consistent with the disclosed embodiments. FIG. 2B is a diagrammatic top view illustration of the embodiment shown in FIG. 2A. As illustrated in FIG. 2B, the disclosed embodiments may include a vehicle 200 including in its body a system 100 with a first image capture device 122 positioned in the vicinity of the rearview mirror and/or near the driver of vehicle 200, a second image capture device 124 positioned on or in a bumper region (e.g., one of bumper regions 210) of vehicle 200, and a processing unit 110.

Figure 2C:
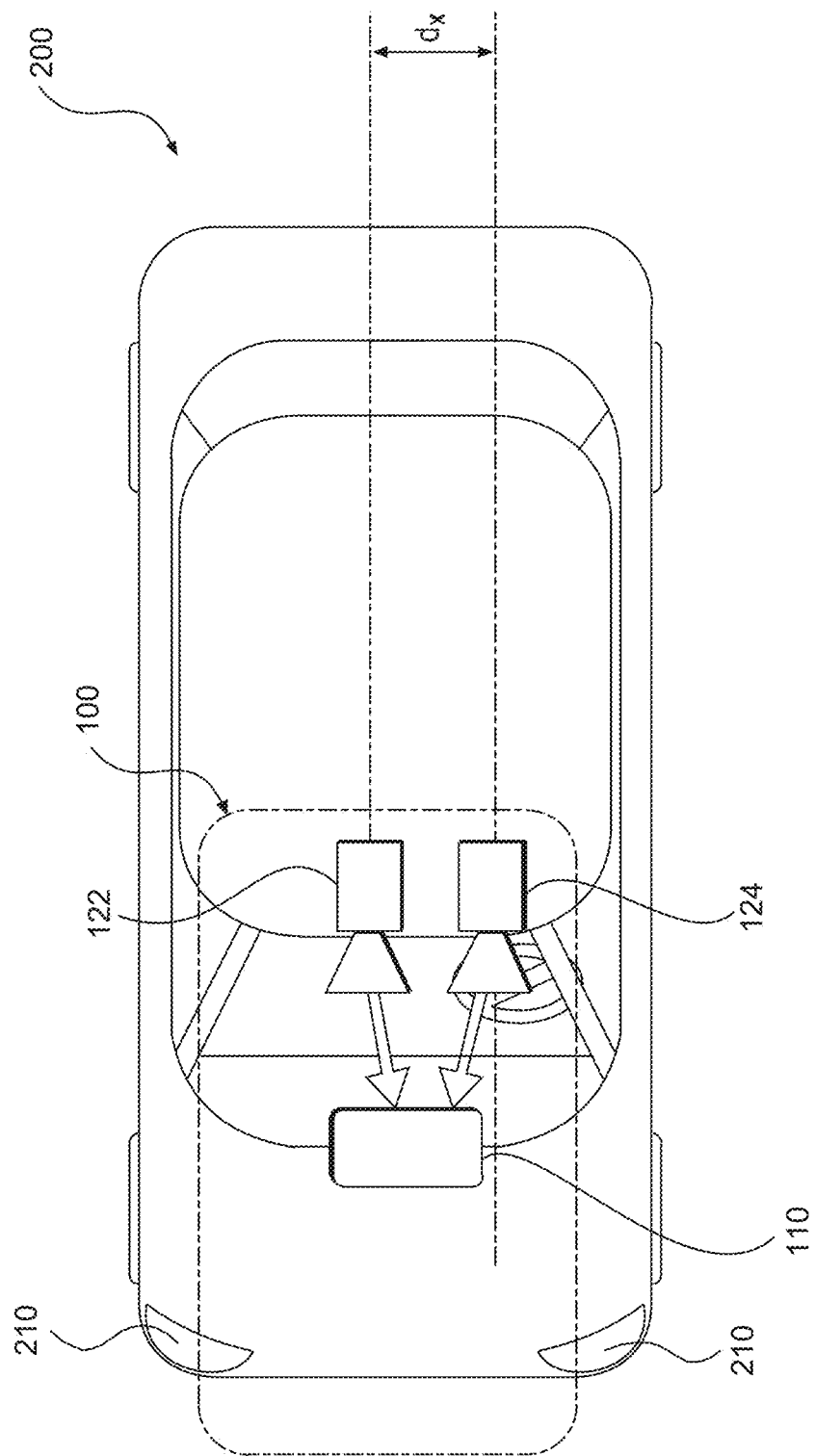
FIG. 2C is a diagrammatic top view representation of another embodiment of a vehicle including a system consistent with the disclosed embodiments.

As illustrated in FIG. 2C, image capture devices 122 and 124 may both be positioned in the vicinity of the rearview mirror and/or near the driver of vehicle 200. Additionally, while two image capture devices 122 and 124 are shown in FIGS. 2B and 2C, it should be understood that other embodiments may include more than two image capture devices. For example, in the embodiments shown in FIGS. 2D and 2E, first, second, and third image capture devices 122, 124, and 126, are included in the system 100 of vehicle 200.

Figure 2D:
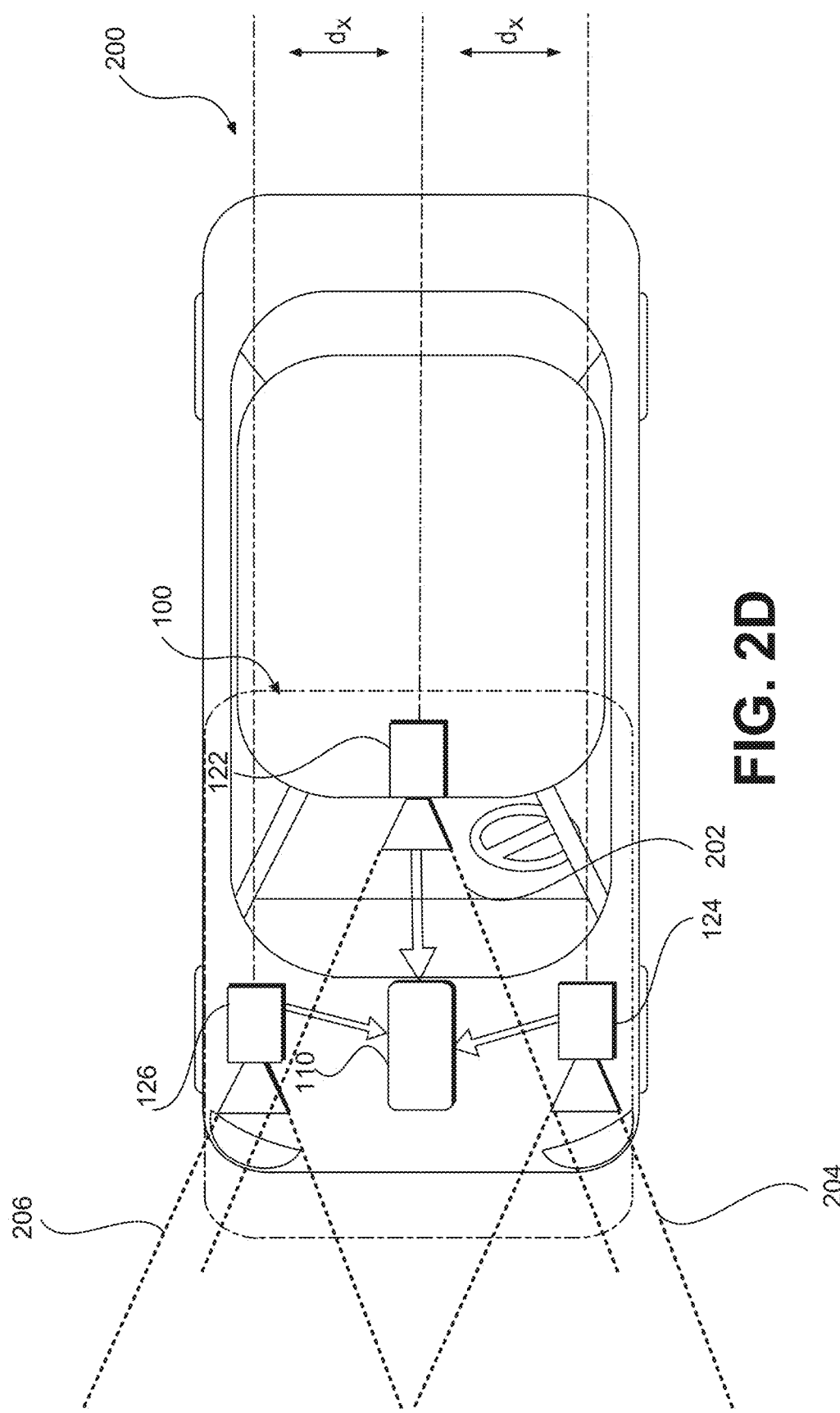
FIG. 2D is a diagrammatic top view representation of yet another embodiment of a vehicle including a system consistent with the disclosed embodiments.
Figure 2E:
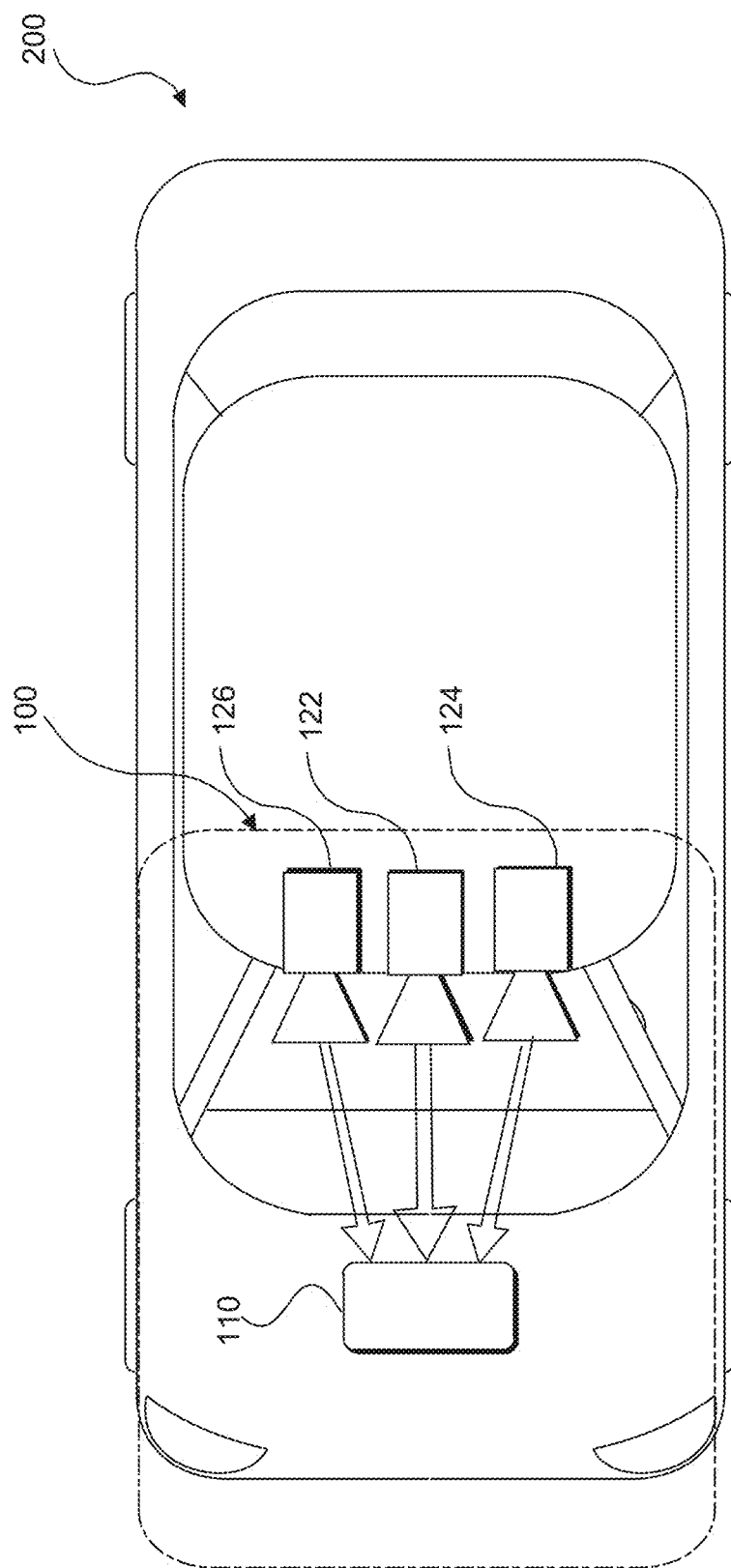
FIG. 2E is a diagrammatic top view representation of yet another embodiment of a vehicle including a system consistent with the disclosed embodiments.

As illustrated in FIG. 2D, image capture device 122 may be positioned in the vicinity of the rearview mirror and/or near the driver of vehicle 200, and image capture devices 124 and 126 may be positioned on or in a bumper region (e.g., one of bumper regions 210) of vehicle 200. And as shown in FIG. 2E, image capture devices 122, 124, and 126 may be positioned in the vicinity of the rearview mirror and/or near the driver seat of vehicle 200. The disclosed embodiments are not limited to any particular number and configuration of the image capture devices, and the image capture devices may be positioned in any appropriate location within and/or on vehicle 200.

It is to be understood that the disclosed embodiments are not limited to vehicles and could be applied in other contexts. It is also to be understood that disclosed embodiments are not limited to a particular type of vehicle 200 and may be applicable to all types of vehicles including automobiles, trucks, trailers, and other types of vehicles.

The first image capture device 122 may include any suitable type of image capture device. Image capture device 122 may include an optical axis. In one instance, the image capture device 122 may include an Aptina M9V024 WVGA sensor with a global shutter. In other embodiments, image capture device 122 may provide a resolution of 1280×960 pixels and may include a rolling shutter. Image capture device 122 may include various optical elements. In some embodiments one or more lenses may be included, for example, to provide a desired focal length and field of view for the image capture device. In some embodiments, image capture device 122 may be associated with a 6 mm lens or a 12 mm lens. In some embodiments, image capture device 122 may be configured to capture images having a desired field-of-view (FOV) 202, as illustrated in FIG. 2D. For example, image capture device 122 may be configured to have a regular FOV, such as within a range of 40 degrees to 56 degrees, including a 46 degree FOV, 50 degree FOV, 52 degree FOV, or greater. Alternatively, image capture device 122 may be configured to have a narrow FOV in the range of 23 to 40 degrees, such as a 28 degree FOV or 36 degree FOV. In addition, image capture device 122 may be configured to have a wide FOV in the range of 100 to 180 degrees.

In some embodiments, image capture device 122 may include a wide angle bumper camera or one with up to a 180 degree FOV. In some embodiments, image capture device 122 may be a 7.2M pixel image capture device with an aspect ratio of about 2:1 (e.g., HxV=3800×1900 pixels) with about 100 degree horizontal FOV. Such an image capture device may be used in place of a three image capture device configuration. Due to significant lens distortion, the vertical FOV of such an image capture device may be significantly less than 50 degrees in implementations in which the image capture device uses a radially symmetric lens. For example, such a lens may not be radially symmetric which would allow for a vertical FOV greater than 50 degrees with 100 degree horizontal FOV.

The first image capture device 122 may acquire a plurality of first images relative to a scene associated with the vehicle 200. Each of the plurality of first images may be acquired as a series of image scan lines, which may be captured using a rolling shutter. Each scan line may include a plurality of pixels.

The first image capture device 122 may have a scan rate associated with acquisition of each of the first series of image scan lines. The scan rate may refer to a rate at which an image sensor can acquire image data associated with each pixel included in a particular scan line.

Image capture devices 122, 124, and 126 may contain any suitable type and number of image sensors, including CCD sensors or CMOS sensors, for example. In one embodiment, a CMOS image sensor may be employed along with a rolling shutter, such that each pixel in a row is read one at a time, and scanning of the rows proceeds on a row-by-row basis until an entire image frame has been captured. In some embodiments, the rows may be captured sequentially from top to bottom relative to the frame.

In some embodiments, one or more of the image capture devices (e.g., image capture devices 122, 124, and 126) disclosed herein may constitute a high resolution imager and may have a resolution greater than 5M pixel, 7M pixel, 10M pixel, or greater.

The use of a rolling shutter may result in pixels in different rows being exposed and captured at different times, which may cause skew and other image artifacts in the captured image frame. On the other hand, when the image capture device 122 is configured to operate with a global or synchronous shutter, all of the pixels may be exposed for the same amount of time and during a common exposure period. As a result, the image data in a frame collected from a system employing a global shutter represents a snapshot of the entire FOV (such as FOV 202) at a particular time. In contrast, in a rolling shutter application, each row in a frame is exposed and data is capture at different times. Thus, moving objects may appear distorted in an image capture device having a rolling shutter. This phenomenon will be described in greater detail below.

The second image capture device 124 and the third image capturing device 126 may be any type of image capture device. Like the first image capture device 122, each of image capture devices 124 and 126 may include an optical axis. In one embodiment, each of image capture devices 124 and 126 may include an Aptina M9V024 WVGA sensor with a global shutter. Alternatively, each of image capture devices 124 and 126 may include a rolling shutter. Like image capture device 122, image capture devices 124 and 126 may be configured to include various lenses and optical elements. In some embodiments, lenses associated with image capture devices 124 and 126 may provide FOVs (such as FOVs 204 and 206) that are the same as, or narrower than, a FOV (such as FOV 202) associated with image capture device 122. For example, image capture devices 124 and 126 may have FOVs of 40 degrees, 30 degrees, 26 degrees, 23 degrees, 20 degrees, or less.

Image capture devices 124 and 126 may acquire a plurality of second and third images relative to a scene associated with the vehicle 200. Each of the plurality of second and third images may be acquired as a second and third series of image scan lines, which may be captured using a rolling shutter. Each scan line or row may have a plurality of pixels. Image capture devices 124 and 126 may have second and third scan rates associated with acquisition of each of image scan lines included in the second and third series.

Each image capture device 122, 124, and 126 may be positioned at any suitable position and orientation relative to vehicle 200. The relative positioning of the image capture devices 122, 124, and 126 may be selected to aid in fusing together the information acquired from the image capture devices. For example, in some embodiments, a FOV (such as FOV 204) associated with image capture device 124 may overlap partially or fully with a FOV (such as FOV 202) associated with image capture device 122 and a FOV (such as FOV 206) associated with image capture device 126.

Image capture devices 122, 124, and 126 may be located on vehicle 200 at any suitable relative heights. In one instance, there may be a height difference between the image capture devices 122, 124, and 126, which may provide sufficient parallax information to enable stereo analysis. For example, as shown in FIG. 2A, the two image capture devices 122 and 124 are at different heights. There may also be a lateral displacement difference between image capture devices 122, 124, and 126, giving additional parallax information for stereo analysis by processing unit 110, for example. The difference in the lateral displacement may be denoted by $d_x$, as shown in FIGS. 2C and 2D. In some embodiments, fore or aft displacement (e.g., range displacement) may exist between image capture devices 122, 124, and 126. For example, image capture device 122 may be located 0.5 to 2 meters or more behind image capture device 124 and/or image capture device 126. This type of displacement may enable one of the image capture devices to cover potential blind spots of the other image capture device(s).

Image capture devices 122 may have any suitable resolution capability (e.g., number of pixels associated with the image sensor), and the resolution of the image sensor(s) associated with the image capture device 122 may be higher, lower, or the same as the resolution of the image sensor(s) associated with image capture devices 124 and 126. In some embodiments, the image sensor(s) associated with image capture device 122 and/or image capture devices 124 and 126 may have a resolution of 640×480, 1024×768, 1280× 960, or any other suitable resolution.

The frame rate (e.g., the rate at which an image capture device acquires a set of pixel data of one image frame before moving on to capture pixel data associated with the next image frame) may be controllable. The frame rate associated with image capture device 122 may be higher, lower, or the same as the frame rate associated with image capture devices 124 and 126. The frame rate associated with image capture devices 122, 124, and 126 may depend on a variety of factors that may affect the timing of the frame rate. For example, one or more of image capture devices 122, 124, and 126 may include a selectable pixel delay period imposed before or after acquisition of image data associated with one or more pixels of an image sensor in image capture device 122, 124, and/or 126. Generally, image data corresponding to each pixel may be acquired according to a clock rate for the device (e.g., one pixel per clock cycle). Additionally, in embodiments including a rolling shutter, one or more of image capture devices 122, 124, and 126 may include a selectable horizontal blanking period imposed before or after acquisition of image data associated with a row of pixels of an image sensor in image capture device 122, 124, and/or 126. Further, one or more of image capture devices 122, 124, and/or 126 may include a selectable vertical blanking period imposed before or after acquisition of image data associated with an image frame of image capture device 122, 124, and 126.

These timing controls may enable synchronization of frame rates associated with image capture devices 122, 124, and 126, even where the line scan rates of each are different. Additionally, as will be discussed in greater detail below, these selectable timing controls, among other factors (e.g., image sensor resolution, maximum line scan rates, etc.) may enable synchronization of image capture from an area where the FOV of image capture device 122 overlaps with one or more FOVs of image capture devices 124 and 126, even where the field of view of image capture device 122 is different from the FOVs of image capture devices 124 and 126.

Frame rate timing in image capture device 122, 124, and 126 may depend on the resolution of the associated image sensors. For example, assuming similar line scan rates for both devices, if one device includes an image sensor having a resolution of 640×480 and another device includes an image sensor with a resolution of 1280×960, then more time will be required to acquire a frame of image data from the sensor having the higher resolution.

Another factor that may affect the timing of image data acquisition in image capture devices 122, 124, and 126 is the maximum line scan rate. For example, acquisition of a row of image data from an image sensor included in image capture device 122, 124, and 126 will require some minimum amount of time. Assuming no pixel delay periods are added, this minimum amount of time for acquisition of a row of image data will be related to the maximum line scan rate for a particular device. Devices that offer higher maximum line scan rates have the potential to provide higher frame rates than devices with lower maximum line scan rates. In some embodiments, one or more of image capture devices 124 and 126 may have a maximum line scan rate that is higher than a maximum line scan rate associated with image capture device 122. In some embodiments, the maximum line scan rate of image capture device 124 and/or 126 may be 1.25, 1.5, 1.75, or 2 times or more than a maximum line scan rate of image capture device 122.

In another embodiment, image capture devices 122, 124, and 126 may have the same maximum line scan rate, but image capture device 122 may be operated at a scan rate less than or equal to its maximum scan rate. The system may be configured such that one or more of image capture devices 124 and 126 operate at a line scan rate that is equal to the line scan rate of image capture device 122. In other instances, the system may be configured such that the line scan rate of image capture device 124 and/or image capture device 126 may be 1.25, 1.5, 1.75, or 2 times or more than the line scan rate of image capture device 122.

In some embodiments, image capture devices 122, 124, and 126 may be asymmetric. That is, they may include cameras having different fields of view (FOV) and focal lengths. The fields of view of image capture devices 122, 124, and 126 may include any desired area relative to an environment of vehicle 200, for example. In some embodiments, one or more of image capture devices 122, 124, and 126 may be configured to acquire image data from an environment in front of vehicle 200, behind vehicle 200, to the sides of vehicle 200, or combinations thereof.

Further, the focal length associated with each image capture device 122, 124, and/or 126 may be selectable (e.g., by inclusion of appropriate lenses etc.) such that each device acquires images of objects at a desired distance range relative to vehicle 200. For example, in some embodiments image capture devices 122, 124, and 126 may acquire images of close-up objects within a few meters from the vehicle. Image capture devices 122, 124, and 126 may also be configured to acquire images of objects at ranges more distant from the vehicle (e.g., 25 m, 50 m, 100 m, 150 m, or more). Further, the focal lengths of image capture devices 122, 124, and 126 may be selected such that one image capture device (e.g., image capture device 122) can acquire images of objects relatively close to the vehicle (e.g., within 10 m or within 20 m) while the other image capture devices (e.g., image capture devices 124 and 126) can acquire images of more distant objects (e.g., greater than 20 m, 50 m, 100 m, 150 m, etc.) from vehicle 200.

According to some embodiments, the FOV of one or more image capture devices 122, 124, and 126 may have a wide angle. For example, it may be advantageous to have a FOV of 140 degrees, especially for image capture devices 122, 124, and 126 that may be used to capture images of the area in the vicinity of vehicle 200. For example, image capture device 122 may be used to capture images of the area to the right or left of vehicle 200 and, in such embodiments, it may be desirable for image capture device 122 to have a wide FOV (e.g., at least 140 degrees).

The field of view associated with each of image capture devices 122, 124, and 126 may depend on the respective focal lengths. For example, as the focal length increases, the corresponding field of view decreases.

Image capture devices 122, 124, and 126 may be configured to have any suitable fields of view. In one particular example, image capture device 122 may have a horizontal FOV of 46 degrees, image capture device 124 may have a horizontal FOV of 23 degrees, and image capture device 126 may have a horizontal FOV in between 23 and 46 degrees. In another instance, image capture device 122 may have a horizontal FOV of 52 degrees, image capture device 124 may have a horizontal FOV of 26 degrees, and image capture device 126 may have a horizontal FOV in between 26 and 52 degrees. In some embodiments, a ratio of the FOV of image capture device 122 to the FOVs of image capture device 124 and/or image capture device 126 may vary from 1.5 to 2.0. In other embodiments, this ratio may vary between 1.25 and 2.25.

System 100 may be configured so that a field of view of image capture device 122 overlaps, at least partially or fully, with a field of view of image capture device 124 and/or image capture device 126. In some embodiments, system 100 may be configured such that the fields of view of image capture devices 124 and 126, for example, fall within (e.g., are narrower than) and share a common center with the field of view of image capture device 122. In other embodiments, the image capture devices 122, 124, and 126 may capture adjacent FOVs or may have partial overlap in their FOVs. In some embodiments, the fields of view of image capture devices 122, 124, and 126 may be aligned such that a center of the narrower FOV image capture devices 124 and/or 126 may be located in a lower half of the field of view of the wider FOV device 122.

Figure 2F:
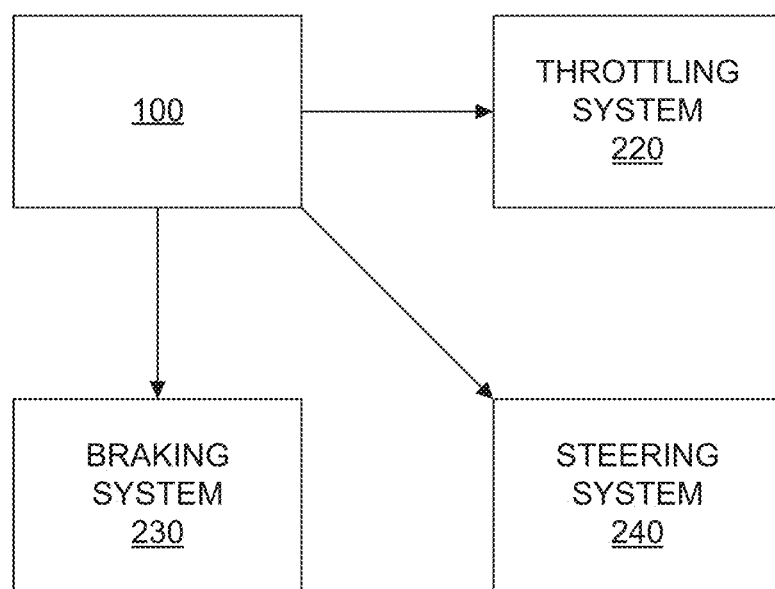
FIG. 2F is a diagrammatic representation of exemplary vehicle control systems consistent with the disclosed embodiments.

FIG. 2F is a diagrammatic representation of exemplary vehicle control systems, consistent with the disclosed embodiments. As indicated in FIG. 2F, vehicle 200 may include throttling system 220, braking system 230, and steering system 240. System 100 may provide inputs (e.g., control signals) to one or more of throttling system 220, braking system 230, and steering system 240 over one or more data links (e.g., any wired and/or wireless link or links for transmitting data). For example, based on analysis of images acquired by image capture devices 122, 124, and/or 126, system 100 may provide control signals to one or more of throttling system 220, braking system 230, and steering system 240 to navigate vehicle 200 (e.g., by causing an acceleration, a turn, a lane shift, etc.). Further, system 100 may receive inputs from one or more of throttling system 220, braking system 230, and steering system 24 indicating operating conditions of vehicle 200 (e.g., speed, whether vehicle 200 is braking and/or turning, etc.). Further details are provided in connection with FIGS. 4-7, below.

Figure 3A:
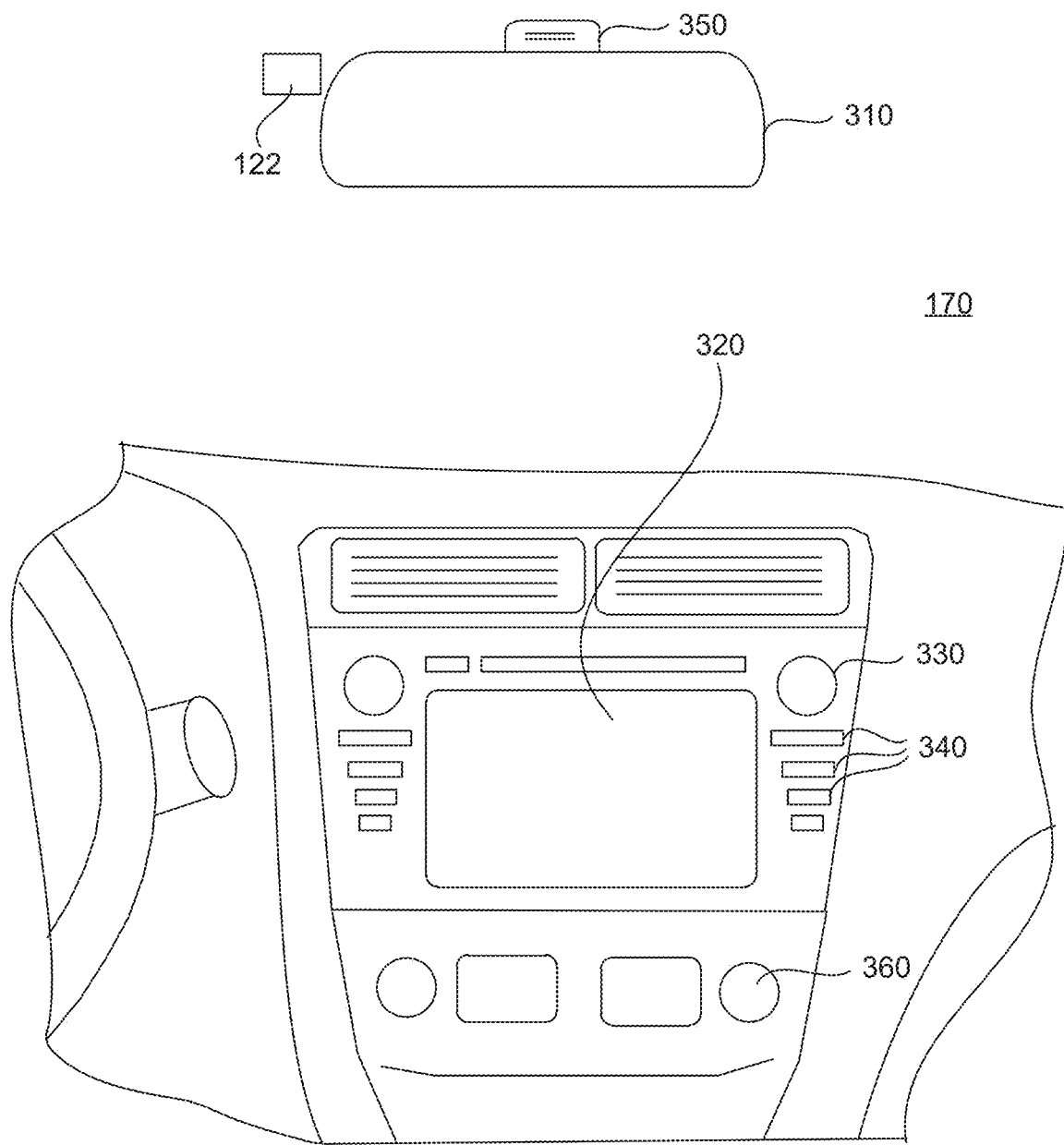
FIG. 3A is a diagrammatic representation of an interior of a vehicle including a rearview mirror and a user interface for a vehicle imaging system consistent with the disclosed embodiments.

As shown in FIG. 3A, vehicle 200 may also include a user interface 170 for interacting with a driver or a passenger of vehicle 200. For example, user interface 170 in a vehicle application may include a touch screen 320, knobs 330, buttons 340, and a microphone 350. A driver or passenger of vehicle 200 may also use handles (e.g., located on or near the steering column of vehicle 200 including, for example, turn signal handles), buttons (e.g., located on the steering wheel of vehicle 200), and the like, to interact with system 100. In some embodiments, microphone 350 may be positioned adjacent to a rearview mirror 310. Similarly, in some embodiments, image capture device 122 may be located near rearview mirror 310. In some embodiments, user interface 170 may also include one or more speakers 360 (e.g., speakers of a vehicle audio system). For example, system 100 may provide various notifications (e.g., alerts) via speakers 360.

Figure 3B:
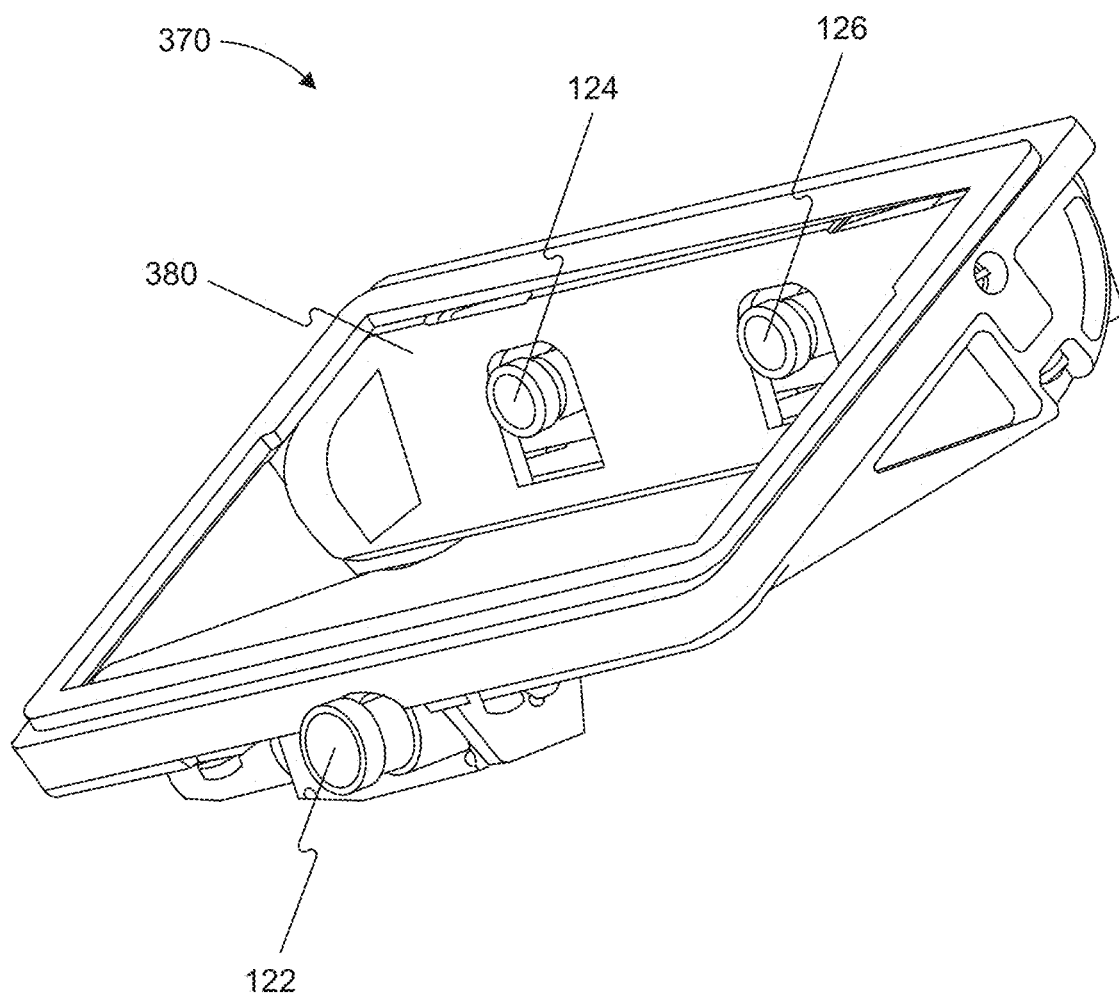
FIG. 3B is an illustration of an example of a camera mount that is configured to be positioned behind a rearview mirror and against a vehicle windshield consistent with the disclosed embodiments.
Figure 3C:
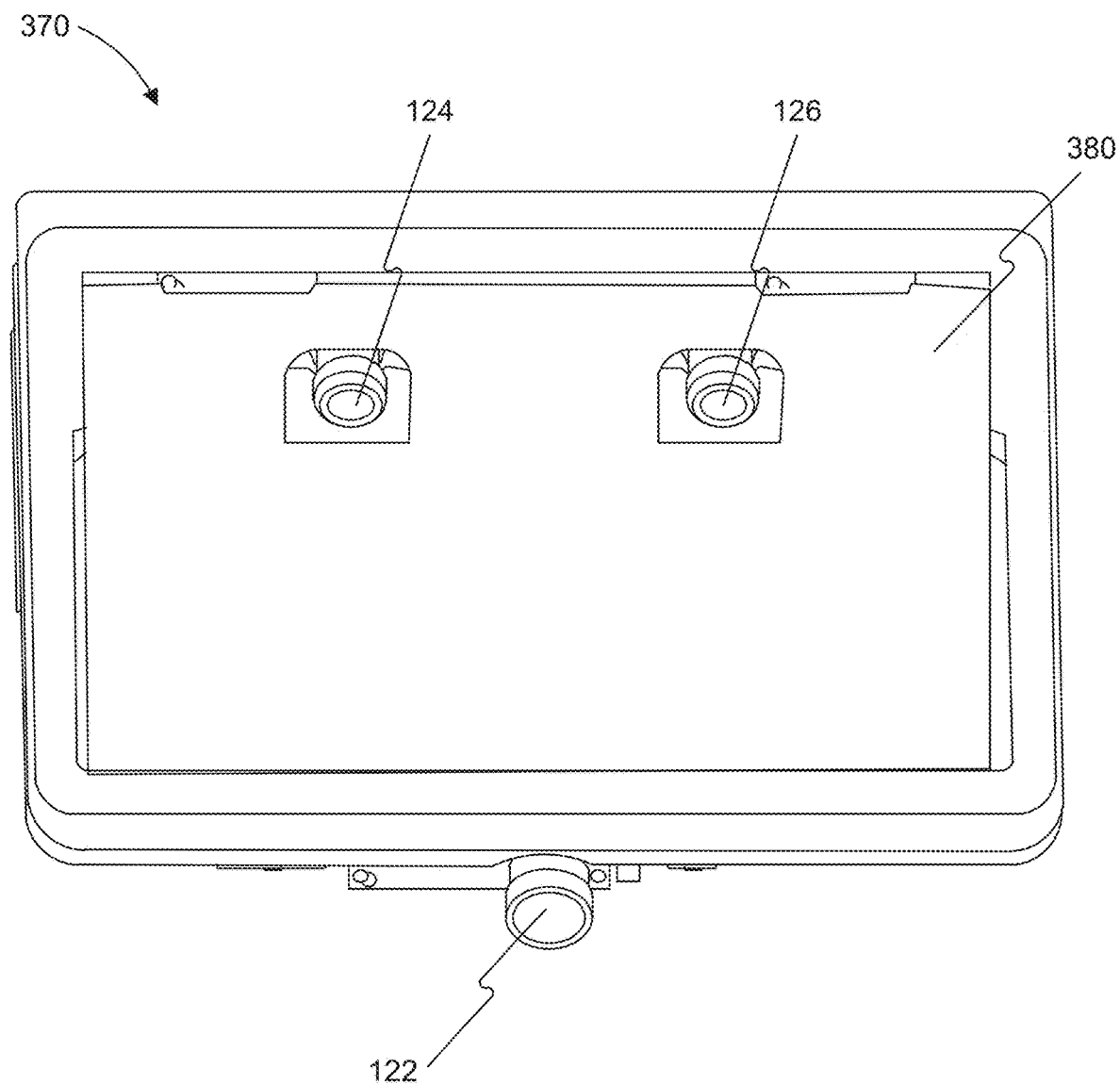
FIG. 3C is an illustration of the camera mount shown in FIG. 3B from a different perspective consistent with the disclosed embodiments.
Figure 3D:
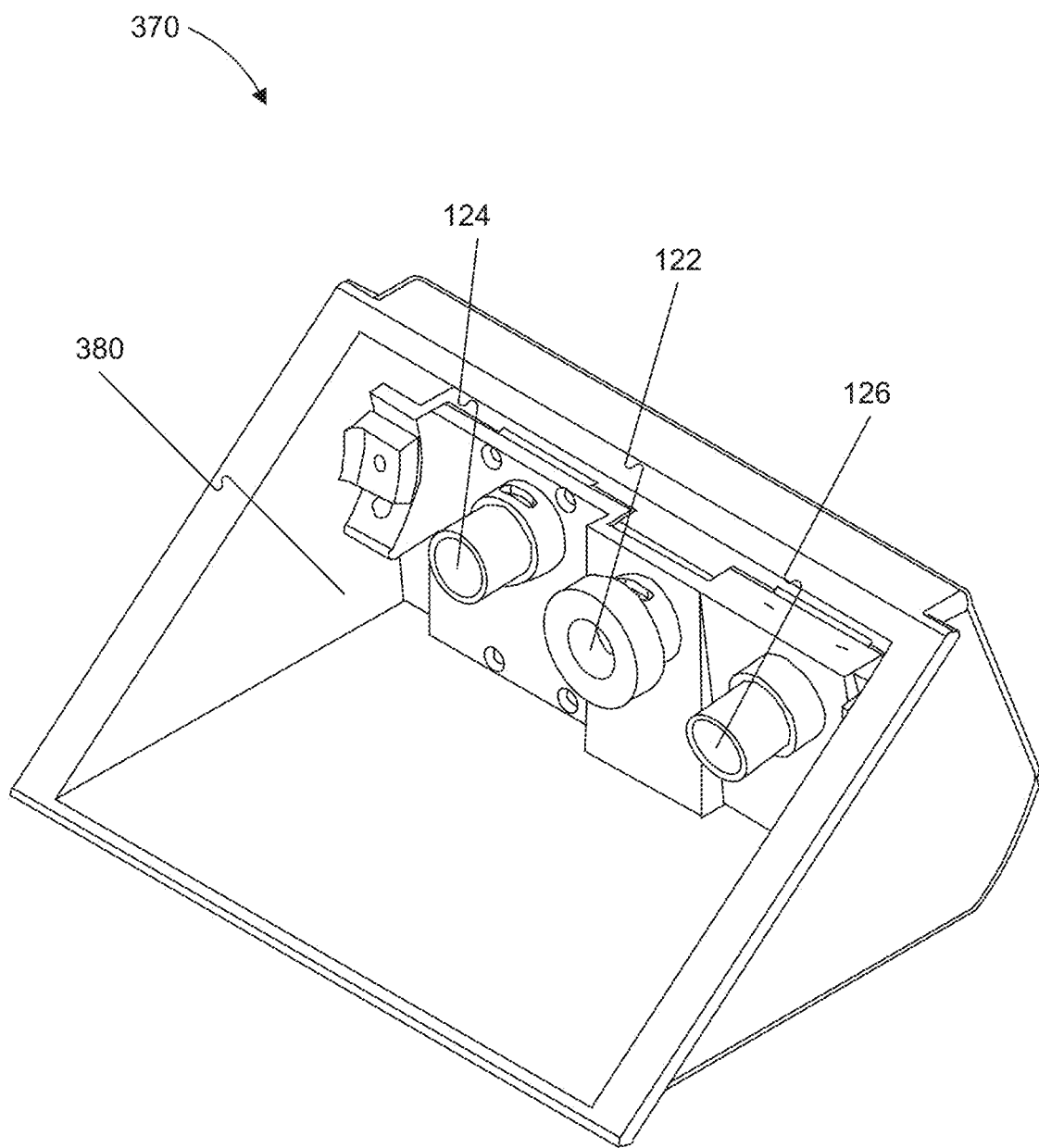
FIG. 3D is an illustration of an example of a camera mount that is configured to be positioned behind a rearview mirror and against a vehicle windshield consistent with the disclosed embodiments.

FIGS. 3B-3D are illustrations of an exemplary camera mount 370 configured to be positioned behind a rearview mirror (e.g., rearview mirror 310) and against a vehicle windshield, consistent with disclosed embodiments. As shown in FIG. 3B, camera mount 370 may include image capture devices 122, 124, and 126. Image capture devices 124 and 126 may be positioned behind a glare shield 380, which may be flush against the vehicle windshield and include a composition of film and/or anti-reflective materials. For example, glare shield 380 may be positioned such that the shield aligns against a vehicle windshield having a matching slope. In some embodiments, each of image capture devices 122, 124, and 126 may be positioned behind glare shield 380, as depicted, for example, in FIG. 3D. The disclosed embodiments are not limited to any particular configuration of image capture devices 122, 124, and 126, camera mount 370, and glare shield 380. FIG. 3C is an illustration of camera mount 370 shown in FIG. 3B from a front perspective.

As will be appreciated by a person skilled in the art having the benefit of this disclosure, numerous variations and/or modifications may be made to the foregoing disclosed embodiments. For example, not all components are essential for the operation of system 100. Further, any component may be located in any appropriate part of system 100 and the components may be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 200 and navigate vehicle 200 in response to the analysis.

As discussed below in further detail and consistent with various disclosed embodiments, system 100 may provide a variety of features related to autonomous driving and/or driver assist technology. For example, system 100 may analyze image data, position data (e.g., GPS location information), map data, speed data, and/or data from sensors included in vehicle 200. System 100 may collect the data for analysis from, for example, image acquisition unit 120, position sensor 130, and other sensors. Further, system 100 may analyze the collected data to determine whether or not vehicle 200 should take a certain action, and then automatically take the determined action without human intervention. For example, when vehicle 200 navigates without human intervention, system 100 may automatically control the braking, acceleration, and/or steering of vehicle 200 (e.g., by sending control signals to one or more of throttling system 220, braking system 230, and steering system 240). Further, system 100 may analyze the collected data and issue warnings and/or alerts to vehicle occupants based on the analysis of the collected data. Additional details regarding the various embodiments that are provided by system 100 are provided below.

Forward-Facing Multi-Imaging System

As discussed above, system 100 may provide drive assist functionality that uses a multi-camera system. The multi-camera system may use one or more cameras facing in the forward direction of a vehicle. In other embodiments, the multi-camera system may include one or more cameras facing to the side of a vehicle or to the rear of the vehicle. In one embodiment, for example, system 100 may use a two-camera imaging system, where a first camera and a second camera (e.g., image capture devices 122 and 124) may be positioned at the front and/or the sides of a vehicle (e.g., vehicle 200). The first camera may have a field of view that is greater than, less than, or partially overlapping with, the field of view of the second camera. In addition, the first camera may be connected to a first image processor to perform monocular image analysis of images provided by the first camera, and the second camera may be connected to a second image processor to perform monocular image analysis of images provided by the second camera. The outputs (e.g., processed information) of the first and second image processors may be combined. In some embodiments, the second image processor may receive images from both the first camera and second camera to perform stereo analysis. In another embodiment, system 100 may use a three-camera imaging system where each of the cameras has a different field of view. Such a system may, therefore, make decisions based on information derived from objects located at varying distances both forward and to the sides of the vehicle. References to monocular image analysis may refer to instances where image analysis is performed based on images captured from a single point of view (e.g., from a single camera). Stereo image analysis may refer to instances where image analysis is performed based on two or more images captured with one or more variations of an image capture parameter. For example, captured images suitable for performing stereo image analysis may include images captured: from two or more different positions, from different fields of view, using different focal lengths, along with parallax information, etc.

For example, in one embodiment, system 100 may implement a three camera configuration using image capture devices 122, 124, and 126. In such a configuration, image capture device 122 may provide a narrow field of view (e.g., 34 degrees, or other values selected from a range of about 20 to 45 degrees, etc.), image capture device 124 may provide a wide field of view (e.g., 150 degrees or other values selected from a range of about 100 to about 180 degrees), and image capture device 126 may provide an intermediate field of view (e.g., 46 degrees or other values selected from a range of about 35 to about 60 degrees). In some embodiments, image capture device 126 may act as a main or primary camera. Image capture devices 122, 124, and 126 may be positioned behind rearview mirror 310 and positioned substantially side-by-side (e.g., 6 cm apart). Further, in some embodiments, as discussed above, one or more of image capture devices 122, 124, and 126 may be mounted behind glare shield 380 that is flush with the windshield of vehicle 200. Such shielding may act to minimize the impact of any reflections from inside the car on image capture devices 122, 124, and 126.

In another embodiment, as discussed above in connection with FIGS. 3B and 3C, the wide field of view camera (e.g., image capture device 124 in the above example) may be mounted lower than the narrow and main field of view cameras (e.g., image devices 122 and 126 in the above example). This configuration may provide a free line of sight from the wide field of view camera. To reduce reflections, the cameras may be mounted close to the windshield of vehicle 200, and may include polarizers on the cameras to damp reflected light.

A three camera system may provide certain performance characteristics. For example, some embodiments may include an ability to validate the detection of objects by one camera based on detection results from another camera. In the three camera configuration discussed above, processing unit 110 may include, for example, three processing devices (e.g., three EyeQ series of processor chips, as discussed above), with each processing device dedicated to processing images captured by one or more of image capture devices 122, 124, and 126.

In a three camera system, a first processing device may receive images from both the main camera and the narrow field of view camera, and perform vision processing of the narrow FOV camera to, for example, detect other vehicles, pedestrians, lane marks, traffic signs, traffic lights, and other road objects. Further, the first processing device may calculate a disparity of pixels between the images from the main camera and the narrow camera and create a 3D reconstruction of the environment of vehicle 200. The first processing device may then combine the 3D reconstruction with 3D map data or with 3D information calculated based on information from another camera.

The second processing device may receive images from main camera and perform vision processing to detect other vehicles, pedestrians, lane marks, traffic signs, traffic lights, and other road objects. Additionally, the second processing device may calculate a camera displacement and, based on the displacement, calculate a disparity of pixels between successive images and create a 3D reconstruction of the scene (e.g., a structure from motion). The second processing device may send the structure from motion based 3D reconstruction to the first processing device to be combined with the stereo 3D images.

The third processing device may receive images from the wide FOV camera and process the images to detect vehicles, pedestrians, lane marks, traffic signs, traffic lights, and other road objects. The third processing device may further execute additional processing instructions to analyze images to identify objects moving in the image, such as vehicles changing lanes, pedestrians, etc.

In some embodiments, having streams of image-based information captured and processed independently may provide an opportunity for providing redundancy in the system. Such redundancy may include, for example, using a first image capture device and the images processed from that device to validate and/or supplement information obtained by capturing and processing image information from at least a second image capture device.

In some embodiments, system 100 may use two image capture devices (e.g., image capture devices 122 and 124) in providing navigation assistance for vehicle 200 and use a third image capture device (e.g., image capture device 126) to provide redundancy and validate the analysis of data received from the other two image capture devices. For example, in such a configuration, image capture devices 122 and 124 may provide images for stereo analysis by system 100 for navigating vehicle 200, while image capture device 126 may provide images for monocular analysis by system 100 to provide redundancy and validation of information obtained based on images captured from image capture device 122 and/or image capture device 124. That is, image capture device 126 (and a corresponding processing device) may be considered to provide a redundant sub-system for providing a check on the analysis derived from image capture devices 122 and 124 (e.g., to provide an automatic emergency braking (AEB) system). Furthermore, in some embodiments, redundancy and validation of received data may be supplemented based on information received from one more sensors (e.g., radar, lidar, acoustic sensors, information received from one or more transceivers outside of a vehicle, etc.).

One of skill in the art will recognize that the above camera configurations, camera placements, number of cameras, camera locations, etc., are examples only. These components and others described relative to the overall system may be assembled and used in a variety of different configurations without departing from the scope of the disclosed embodiments. Further details regarding usage of a multi-camera system to provide driver assist and/or autonomous vehicle functionality follow below.

Figure 4:
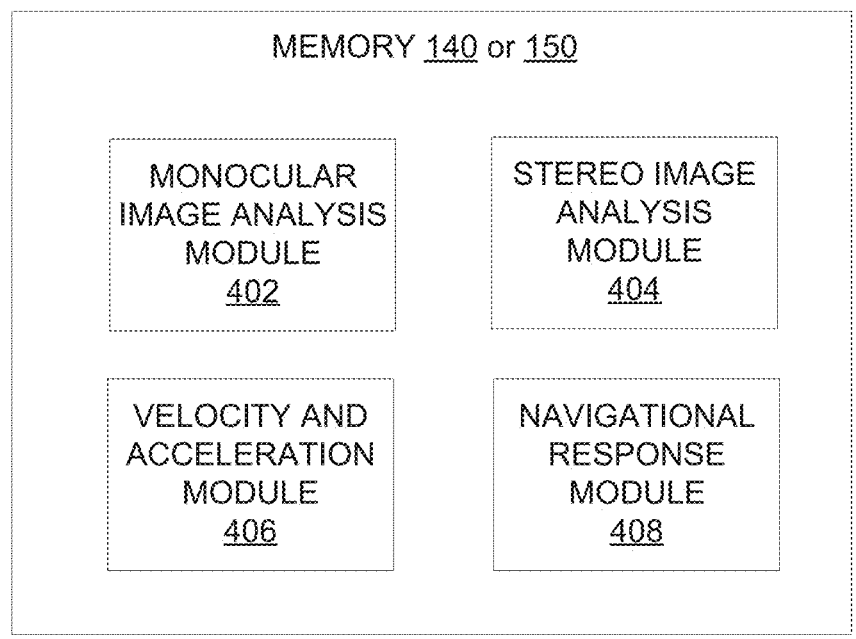
FIG. 4 is an exemplary block diagram of a memory configured to store instructions for performing one or more operations consistent with the disclosed embodiments.

FIG. 4 is an exemplary functional block diagram of memory 140 and/or 150, which may be stored/programmed with instructions for performing one or more operations consistent with the disclosed embodiments. Although the following refers to memory 140, one of skill in the art will recognize that instructions may be stored in memory 140 and/or 150.

As shown in FIG. 4, memory 140 may store a monocular image analysis module 402, a stereo image analysis module 404, a velocity and acceleration module 406, and a navigational response module 408. The disclosed embodiments are not limited to any particular configuration of memory 140. Further, application processor 180 and/or image processor 190 may execute the instructions stored in any of modules 402, 404, 406, and 408 included in memory 140. One of skill in the art will understand that references in the following discussions to processing unit 110 may refer to application processor 180 and image processor 190 individually or collectively. Accordingly, steps of any of the following processes may be performed by one or more processing devices.

In one embodiment, monocular image analysis module 402 may store instructions (such as computer vision software) which, when executed by processing unit 110, performs monocular image analysis of a set of images acquired by one of image capture devices 122, 124, and 126. In some embodiments, processing unit 110 may combine information from a set of images with additional sensory information (e.g., information from radar, lidar, etc.) to perform the monocular image analysis. As described in connection with FIGS. 5A-5D below, monocular image analysis module 402 may include instructions for detecting a set of features within the set of images, such as lane markings, vehicles, pedestrians, road signs, highway exit ramps, traffic lights, hazardous objects, and any other feature associated with an environment of a vehicle. Based on the analysis, system 100 (e.g., via processing unit 110) may cause one or more navigational responses in vehicle 200, such as a turn, a lane shift, a change in acceleration, and the like, as discussed below in connection with navigational response module 408.

In one embodiment, stereo image analysis module 404 may store instructions (such as computer vision software) which, when executed by processing unit 110, performs stereo image analysis of first and second sets of images acquired by a combination of image capture devices selected from any of image capture devices 122, 124, and 126. In some embodiments, processing unit 110 may combine information from the first and second sets of images with additional sensory information (e.g., information from radar) to perform the stereo image analysis. For example, stereo image analysis module 404 may include instructions for performing stereo image analysis based on a first set of images acquired by image capture device 124 and a second set of images acquired by image capture device 126. As described in connection with FIG. 6 below, stereo image analysis module 404 may include instructions for detecting a set of features within the first and second sets of images, such as lane markings, vehicles, pedestrians, road signs, highway exit ramps, traffic lights, hazardous objects, and the like. Based on the analysis, processing unit 110 may cause one or more navigational responses in vehicle 200, such as a turn, a lane shift, a change in acceleration, and the like, as discussed below in connection with navigational response module 408. Furthermore, in some embodiments, stereo image analysis module 404 may implement techniques associated with a trained system (such as a neural network or a deep neural network) or an untrained system, such as a system that may be configured to use computer vision algorithms to detect and/or label objects in an environment from which sensory information was captured and processed. In one embodiment, stereo image analysis module 404 and/or other image processing modules may be configured to use a combination of a trained and untrained system.

In one embodiment, velocity and acceleration module 406 may store software configured to analyze data received from one or more computing and electromechanical devices in vehicle 200 that are configured to cause a change in velocity and/or acceleration of vehicle 200. For example, processing unit 110 may execute instructions associated with velocity and acceleration module 406 to calculate a target speed for vehicle 200 based on data derived from execution of monocular image analysis module 402 and/or stereo image analysis module 404. Such data may include, for example, a target position, velocity, and/or acceleration, the position and/or speed of vehicle 200 relative to a nearby vehicle, pedestrian, or road object, position information for vehicle 200 relative to lane markings of the road, and the like. In addition, processing unit 110 may calculate a target speed for vehicle 200 based on sensory input (e.g., information from radar) and input from other systems of vehicle 200, such as throttling system 220, braking system 230, and/or steering system 240 of vehicle 200. Based on the calculated target speed, processing unit 110 may transmit electronic signals to throttling system 220, braking system 230, and/or steering system 240 of vehicle 200 to trigger a change in velocity and/or acceleration by, for example, physically depressing the brake or easing up off the accelerator of vehicle 200.

In one embodiment, navigational response module 408 may store software executable by processing unit 110 to determine a desired navigational response based on data derived from execution of monocular image analysis module 402 and/or stereo image analysis module 404. Such data may include position and speed information associated with nearby vehicles, pedestrians, and road objects, target position information for vehicle 200, and the like. Additionally, in some embodiments, the navigational response may be based (partially or fully) on map data, a predetermined position of vehicle 200, and/or a relative velocity or a relative acceleration between vehicle 200 and one or more objects detected from execution of monocular image analysis module 402 and/or stereo image analysis module 404. Navigational response module 408 may also determine a desired navigational response based on sensory input (e.g., information from radar) and inputs from other systems of vehicle 200, such as throttling system 220, braking system 230, and steering system 240 of vehicle 200. Based on the desired navigational response, processing unit 110 may transmit electronic signals to throttling system 220, braking system 230, and steering system 240 of vehicle 200 to trigger a desired navigational response by, for example, turning the steering wheel of vehicle 200 to achieve a rotation of a predetermined angle. In some embodiments, processing unit 110 may use the output of navigational response module 408 (e.g., the desired navigational response) as an input to execution of velocity and acceleration module 406 for calculating a change in speed of vehicle 200.

Furthermore, any of the modules (e.g., modules 402, 404, and 406) disclosed herein may implement techniques associated with a trained system (such as a neural network or a deep neural network) or an untrained system.

Figure 5A:
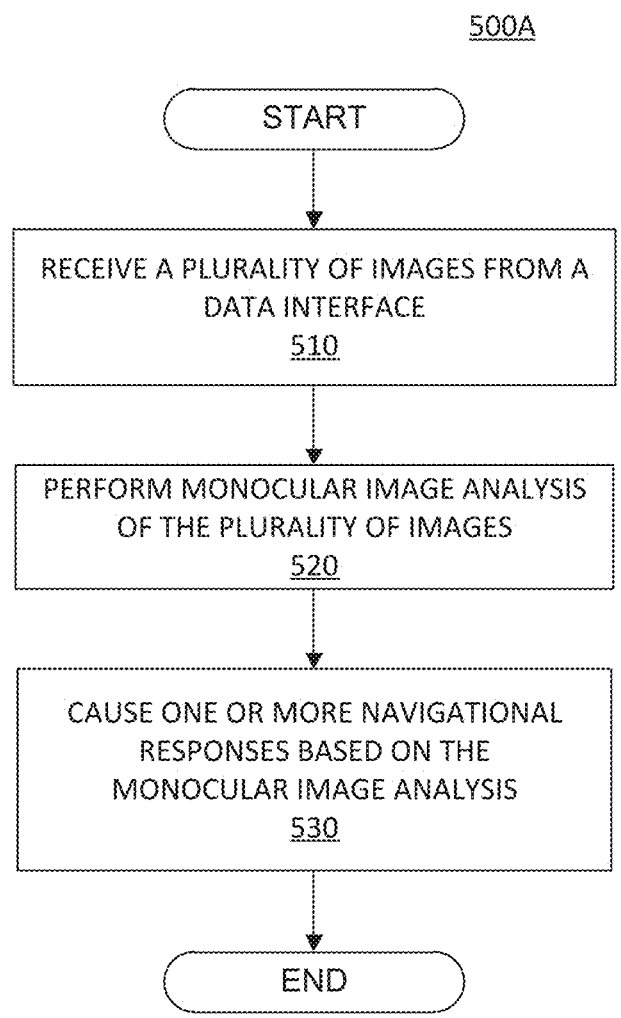
FIG. 5A is a flowchart showing an exemplary process for causing one or more navigational responses based on monocular image analysis consistent with disclosed embodiments.

FIG. 5A is a flowchart showing an exemplary process 500A for causing one or more navigational responses based on monocular image analysis, consistent with disclosed embodiments. At step 510, processing unit 110 may receive a plurality of images via data interface 128 between processing unit 110 and image acquisition unit 120. For instance, a camera included in image acquisition unit 120 (such as image capture device 122 having field of view 202) may capture a plurality of images of an area forward of vehicle 200 (or to the sides or rear of a vehicle, for example) and transmit them over a data connection (e.g., digital, wired, USB, wireless, Bluetooth, etc.) to processing unit 110. Processing unit 110 may execute monocular image analysis module 402 to analyze the plurality of images at step 520, as described in further detail in connection with FIGS. 5B-5D below. By performing the analysis, processing unit 110 may detect a set of features within the set of images, such as lane markings, vehicles, pedestrians, road signs, highway exit ramps, traffic lights, and the like.

Processing unit 110 may also execute monocular image analysis module 402 to detect various road hazards at step 520, such as, for example, parts of a truck tire, fallen road signs, loose cargo, small animals, and the like. Road hazards may vary in structure, shape, size, and color, which may make detection of such hazards more challenging. In some embodiments, processing unit 110 may execute monocular image analysis module 402 to perform multi-frame analysis on the plurality of images to detect road hazards. For example, processing unit 110 may estimate camera motion between consecutive image frames and calculate the disparities in pixels between the frames to construct a 3D-map of the road. Processing unit 110 may then use the 3D-map to detect the road surface, as well as hazards existing above the road surface.

At step 530, processing unit 110 may execute navigational response module 408 to cause one or more navigational responses in vehicle 200 based on the analysis performed at step 520 and the techniques as described above in connection with FIG. 4. Navigational responses may include, for example, a turn, a lane shift, a change in acceleration, and the like. In some embodiments, processing unit 110 may use data derived from execution of velocity and acceleration module 406 to cause the one or more navigational responses. Additionally, multiple navigational responses may occur simultaneously, in sequence, or any combination thereof. For instance, processing unit 110 may cause vehicle 200 to shift one lane over and then accelerate by, for example, sequentially transmitting control signals to steering system 240 and throttling system 220 of vehicle 200. Alternatively, processing unit 110 may cause vehicle 200 to brake while at the same time shifting lanes by, for example, simultaneously transmitting control signals to braking system 230 and steering system 240 of vehicle 200.

Figure 5B:
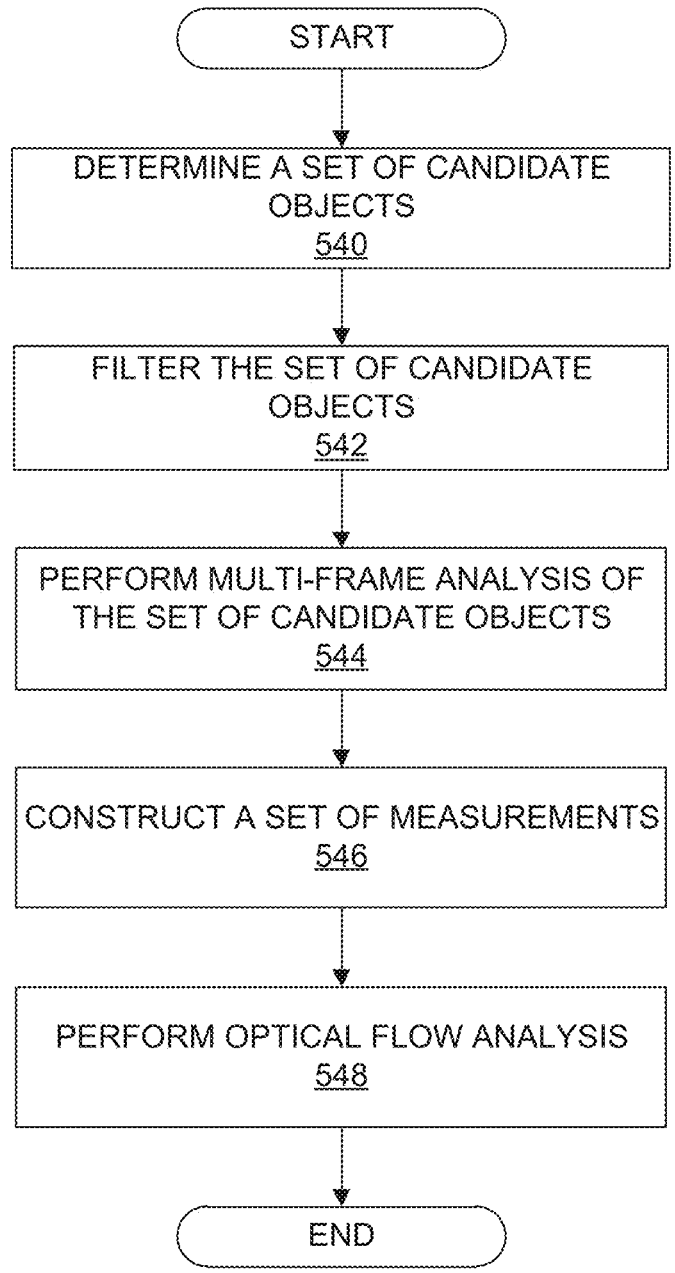
FIG. 5B is a flowchart showing an exemplary process for detecting one or more vehicles and/or pedestrians in a set of images consistent with the disclosed embodiments.

FIG. 5B is a flowchart showing an exemplary process 500B for detecting one or more vehicles and/or pedestrians in a set of images, consistent with disclosed embodiments. Processing unit 110 may execute monocular image analysis module 402 to implement process 500B. At step 540, processing unit 110 may determine a set of candidate objects representing possible vehicles and/or pedestrians. For example, processing unit 110 may scan one or more images, compare the images to one or more predetermined patterns, and identify within each image possible locations that may contain objects of interest (e.g., vehicles, pedestrians, or portions thereof). The predetermined patterns may be designed in such a way to achieve a high rate of "false hits" and a low rate of "misses." For example, processing unit 110 may use a low threshold of similarity to predetermined patterns for identifying candidate objects as possible vehicles or pedestrians. Doing so may allow processing unit 110 to reduce the probability of missing (e.g., not identifying) a candidate object representing a vehicle or pedestrian.

At step 542, processing unit 110 may filter the set of candidate objects to exclude certain candidates (e.g., irrelevant or less relevant objects) based on classification criteria. Such criteria may be derived from various properties associated with object types stored in a database (e.g., a database stored in memory 140). Properties may include object shape, dimensions, texture, position (e.g., relative to vehicle 200), and the like. Thus, processing unit 110 may use one or more sets of criteria to reject false candidates from the set of candidate objects.

At step 544, processing unit 110 may analyze multiple frames of images to determine whether objects in the set of candidate objects represent vehicles and/or pedestrians. For example, processing unit 110 may track a detected candidate object across consecutive frames and accumulate frame-by-frame data associated with the detected object (e.g., size, position relative to vehicle 200, etc.). Additionally, processing unit 110 may estimate parameters for the detected object and compare the object's frame-by-frame position data to a predicted position.

At step 546, processing unit 110 may construct a set of measurements for the detected objects. Such measurements may include, for example, position, velocity, and acceleration values (relative to vehicle 200) associated with the detected objects. In some embodiments, processing unit 110 may construct the measurements based on estimation techniques using a series of time-based observations such as Kalman filters or linear quadratic estimation (LQE), and/or based on available modeling data for different object types (e.g., cars, trucks, pedestrians, bicycles, road signs, etc.). The Kalman filters may be based on a measurement of an object's scale, where the scale measurement is proportional to a time to collision (e.g., the amount of time for vehicle 200 to reach the object). Thus, by performing steps 540-546, processing unit 110 may identify vehicles and pedestrians appearing within the set of captured images and derive information (e.g., position, speed, size) associated with the vehicles and pedestrians. Based on the identification and the derived information, processing unit 110 may cause one or more navigational responses in vehicle 200, as described in connection with FIG. 5A, above.

At step 548, processing unit 110 may perform an optical flow analysis of one or more images to reduce the probabilities of detecting a "false hit" and missing a candidate object that represents a vehicle or pedestrian. The optical flow analysis may refer to, for example, analyzing motion patterns relative to vehicle 200 in the one or more images associated with other vehicles and pedestrians, and that are distinct from road surface motion. Processing unit 110 may calculate the motion of candidate objects by observing the different positions of the objects across multiple image frames, which are captured at different times. Processing unit 110 may use the position and time values as inputs into mathematical models for calculating the motion of the candidate objects. Thus, optical flow analysis may provide another method of detecting vehicles and pedestrians that are nearby vehicle 200. Processing unit 110 may perform optical flow analysis in combination with steps 540-546 to provide redundancy for detecting vehicles and pedestrians and increase the reliability of system 100.

Figure 5C:
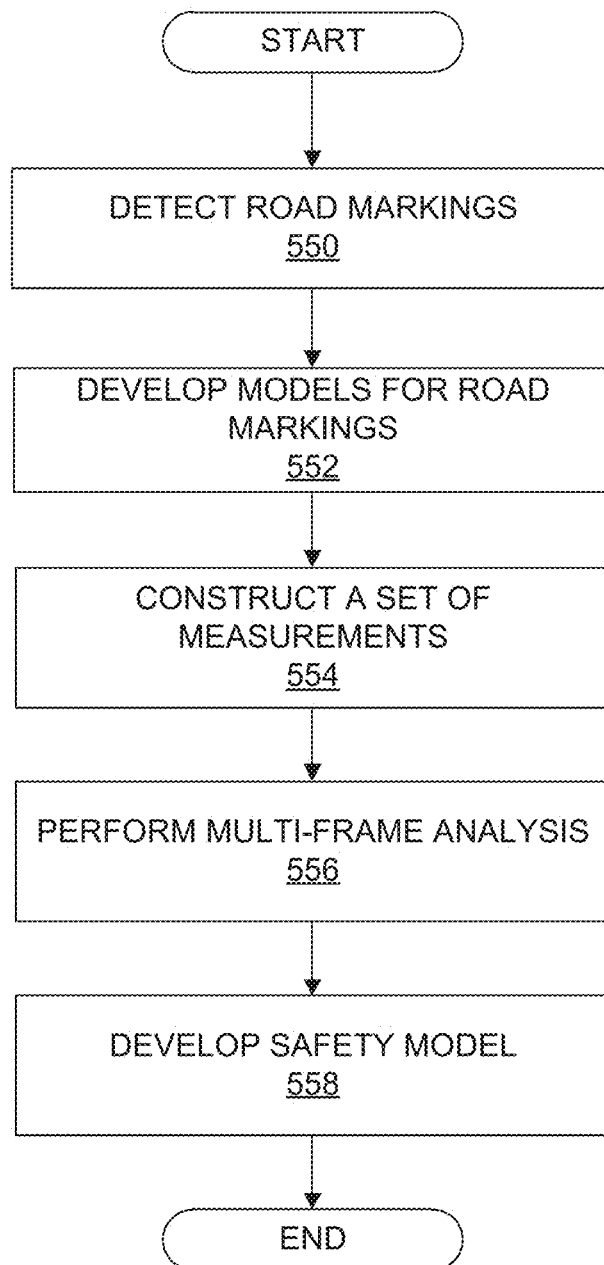
FIG. 5C is a flowchart showing an exemplary process for detecting road marks and/or lane geometry information in a set of images consistent with the disclosed embodiments.

FIG. 5C is a flowchart showing an exemplary process 500C for detecting road marks and/or lane geometry information in a set of images, consistent with disclosed embodiments. Processing unit 110 may execute monocular image analysis module 402 to implement process 500C. At step 550, processing unit 110 may detect a set of objects by scanning one or more images. To detect segments of lane markings, lane geometry information, and other pertinent road marks, processing unit 110 may filter the set of objects to exclude those determined to be irrelevant (e.g., minor potholes, small rocks, etc.). At step 552, processing unit 110 may group together the segments detected in step 550 belonging to the same road mark or lane mark. Based on the grouping, processing unit 110 may develop a model to represent the detected segments, such as a mathematical model.

At step 554, processing unit 110 may construct a set of measurements associated with the detected segments. In some embodiments, processing unit 110 may create a projection of the detected segments from the image plane onto the real-world plane. The projection may be characterized using a 3rd-degree polynomial having coefficients corresponding to physical properties such as the position, slope, curvature, and curvature derivative of the detected road. In generating the projection, processing unit 110 may take into account changes in the road surface, as well as pitch and roll rates associated with vehicle 200. In addition, processing unit 110 may model the road elevation by analyzing position and motion cues present on the road surface. Further, processing unit 110 may estimate the pitch and roll rates associated with vehicle 200 by tracking a set of feature points in the one or more images.

At step 556, processing unit 110 may perform multi-frame analysis by, for example, tracking the detected segments across consecutive image frames and accumulating frame-by-frame data associated with detected segments. As processing unit 110 performs multi-frame analysis, the set of measurements constructed at step 554 may become more reliable and associated with an increasingly higher confidence level. Thus, by performing steps 550, 552, 554, and 556, processing unit 110 may identify road marks appearing within the set of captured images and derive lane geometry information. Based on the identification and the derived information, processing unit 110 may cause one or more navigational responses in vehicle 200, as described in connection with FIG. 5A, above.

At step 558, processing unit 110 may consider additional sources of information to further develop a safety model for vehicle 200 in the context of its surroundings. Processing unit 110 may use the safety model to define a context in which system 100 may execute autonomous control of vehicle 200 in a safe manner. To develop the safety model, in some embodiments, processing unit 110 may consider the position and motion of other vehicles, the detected road edges and barriers, and/or general road shape descriptions extracted from map data (such as data from map database 160). By considering additional sources of information, processing unit 110 may provide redundancy for detecting road marks and lane geometry and increase the reliability of system 100.

Figure 5D:
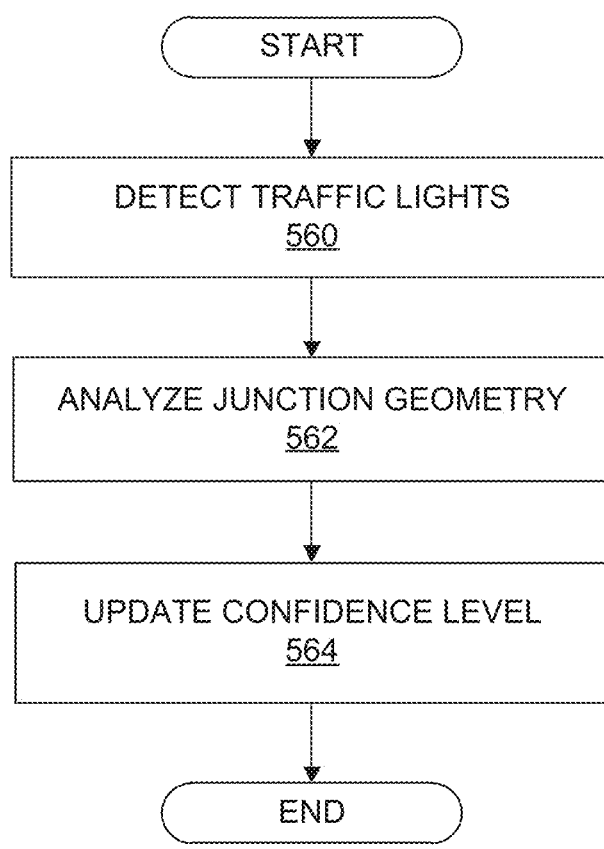
FIG. 5D is a flowchart showing an exemplary process for detecting traffic lights in a set of images consistent with the disclosed embodiments.

FIG. 5D is a flowchart showing an exemplary process 500D for detecting traffic lights in a set of images, consistent with disclosed embodiments. Processing unit 110 may execute monocular image analysis module 402 to implement process 500D. At step 560, processing unit 110 may scan the set of images and identify objects appearing at locations in the images likely to contain traffic lights. For example, processing unit 110 may filter the identified objects to construct a set of candidate objects, excluding those objects unlikely to correspond to traffic lights. The filtering may be done based on various properties associated with traffic lights, such as shape, dimensions, texture, position (e.g., relative to vehicle 200), and the like. Such properties may be based on multiple examples of traffic lights and traffic control signals and stored in a database. In some embodiments, processing unit 110 may perform multi-frame analysis on the set of candidate objects reflecting possible traffic lights. For example, processing unit 110 may track the candidate objects across consecutive image frames, estimate the real-world position of the candidate objects, and filter out those objects that are moving (which are unlikely to be traffic lights). In some embodiments, processing unit 110 may perform color analysis on the candidate objects and identify the relative position of the detected colors appearing inside possible traffic lights.

At step 562, processing unit 110 may analyze the geometry of a junction. The analysis may be based on any combination of: (i) the number of lanes detected on either side of vehicle 200, (ii) markings (such as arrow marks) detected on the road, and (iii) descriptions of the junction extracted from map data (such as data from map database 160). Processing unit 110 may conduct the analysis using information derived from execution of monocular analysis module 402. In addition, Processing unit 110 may determine a correspondence between the traffic lights detected at step 560 and the lanes appearing near vehicle 200.

As vehicle 200 approaches the junction, at step 564, processing unit 110 may update the confidence level associated with the analyzed junction geometry and the detected traffic lights. For instance, the number of traffic lights estimated to appear at the junction as compared with the number actually appearing at the junction may impact the confidence level. Thus, based on the confidence level, processing unit 110 may delegate control to the driver of vehicle 200 in order to improve safety conditions. By performing steps 560, 562, and 564, processing unit 110 may identify traffic lights appearing within the set of captured images and analyze junction geometry information. Based on the identification and the analysis, processing unit 110 may cause one or more navigational responses in vehicle 200, as described in connection with FIG. 5A, above.

Figure 5E:
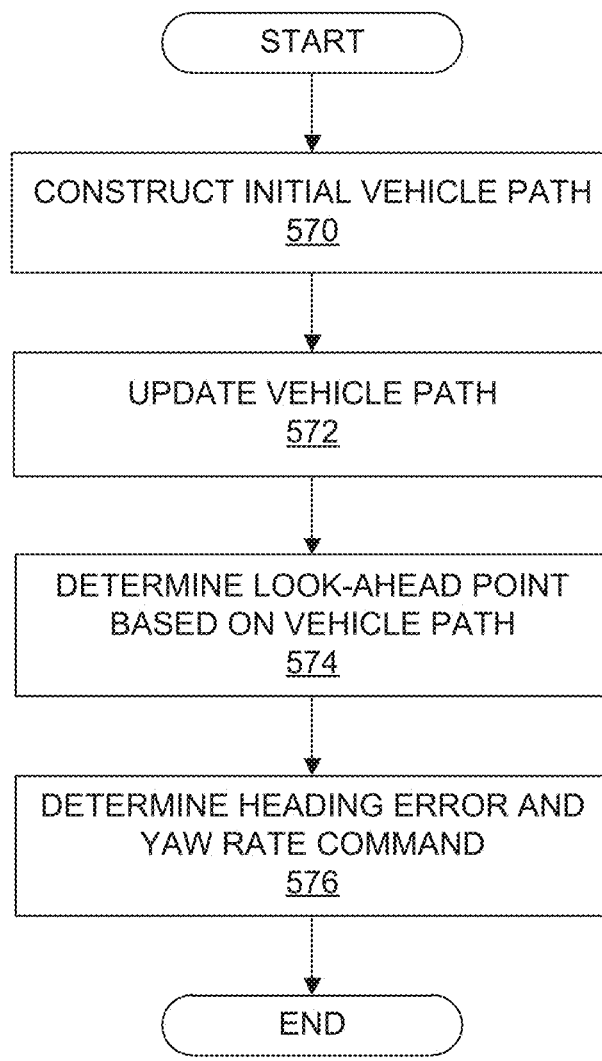
FIG. 5E is a flowchart showing an exemplary process for causing one or more navigational responses based on a vehicle path consistent with the disclosed embodiments.

FIG. 5E is a flowchart showing an exemplary process 500E for causing one or more navigational responses in vehicle 200 based on a vehicle path, consistent with the disclosed embodiments. At step 570, processing unit 110 may construct an initial vehicle path associated with vehicle 200. The vehicle path may be represented using a set of points expressed in coordinates (x, z), and the distance d, between two points in the set of points may fall in the range of 1 to 5 meters. In one embodiment, processing unit 110 may construct the initial vehicle path using two polynomials, such as left and right road polynomials. Processing unit 110 may calculate the geometric midpoint between the two polynomials and offset each point included in the resultant vehicle path by a predetermined offset (e.g., a smart lane offset), if any (an offset of zero may correspond to travel in the middle of a lane). The offset may be in a direction perpendicular to a segment between any two points in the vehicle path. In another embodiment, processing unit 110 may use one polynomial and an estimated lane width to offset each point of the vehicle path by half the estimated lane width plus a predetermined offset (e.g., a smart lane offset).

At step 572, processing unit 110 may update the vehicle path constructed at step 570. Processing unit 110 may reconstruct the vehicle path constructed at step 570 using a higher resolution, such that the distance $d_k$ between two points in the set of points representing the vehicle path is less than the distance $d_i$ described above. For example, the distance $d_k$ may fall in the range of 0.1 to 0.3 meters. Processing unit 110 may reconstruct the vehicle path using a parabolic spline algorithm, which may yield a cumulative distance vector S corresponding to the total length of the vehicle path (i.e., based on the set of points representing the vehicle path).

At step 574, processing unit 110 may determine a look-ahead point (expressed in coordinates as $(x_l, z_l)$) based on the updated vehicle path constructed at step 572. Processing unit 110 may extract the look-ahead point from the cumulative distance vector S, and the look-ahead point may be associated with a look-ahead distance and look-ahead time. The look-ahead distance, which may have a lower bound ranging from 10 to 20 meters, may be calculated as the product of the speed of vehicle 200 and the look-ahead time. For example, as the speed of vehicle 200 decreases, the look-ahead distance may also decrease (e.g., until it reaches the lower bound). The look-ahead time, which may range from 0.5 to 1.5 seconds, may be inversely proportional to the gain of one or more control loops associated with causing a navigational response in vehicle 200, such as the heading error tracking control loop. For example, the gain of the heading error tracking control loop may depend on the bandwidth of a yaw rate loop, a steering actuator loop, car lateral dynamics, and the like. Thus, the higher the gain of the heading error tracking control loop, the lower the look-ahead time.

At step 576, processing unit 110 may determine a heading error and yaw rate command based on the look-ahead point determined at step 574. Processing unit 110 may determine the heading error by calculating the arctangent of the look-ahead point, e.g., arctan $(x_l/z_l)$. Processing unit 110 may determine the yaw rate command as the product of the heading error and a high-level control gain. The high-level control gain may be equal to: (2/look-ahead time), if the look-ahead distance is not at the lower bound. Otherwise, the high-level control gain may be equal to: (2*speed of vehicle 200/look-ahead distance).

Figure 5F:
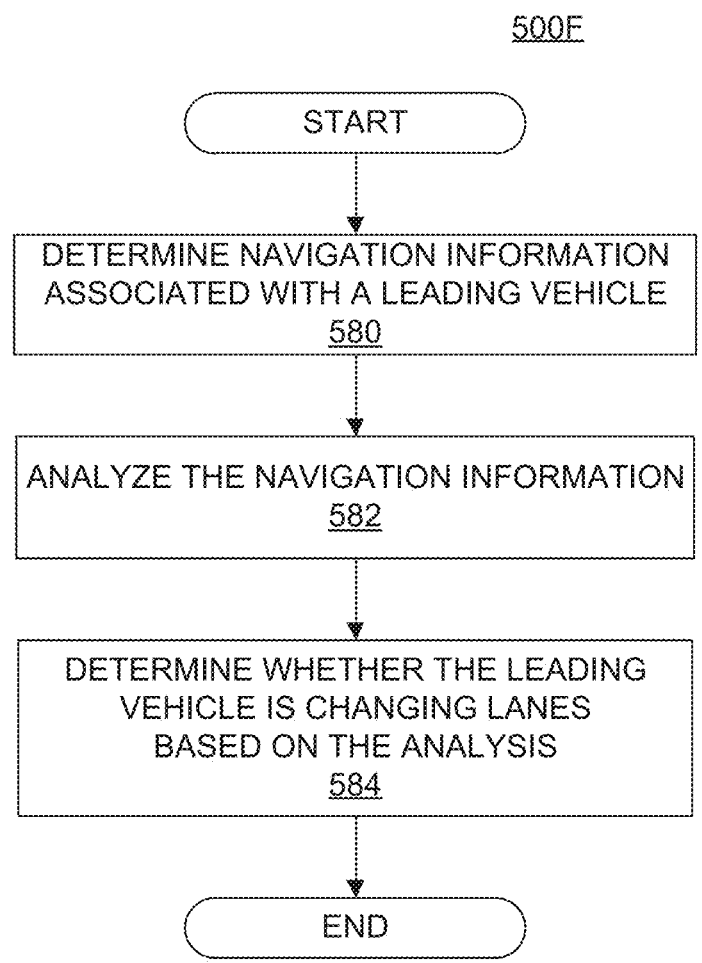
FIG. 5F is a flowchart showing an exemplary process for determining whether a leading vehicle is changing lanes consistent with the disclosed embodiments.

FIG. 5F is a flowchart showing an exemplary process 500F for determining whether a leading vehicle is changing lanes, consistent with the disclosed embodiments. At step 580, processing unit 110 may determine navigation information associated with a leading vehicle (e.g., a vehicle traveling ahead of vehicle 200). For example, processing unit 110 may determine the position, velocity (e.g., direction and speed), and/or acceleration of the leading vehicle, using the techniques described in connection with FIGS. 5A and 5B, above. Processing unit 110 may also determine one or more road polynomials, a look-ahead point (associated with vehicle 200), and/or a snail trail (e.g., a set of points describing a path taken by the leading vehicle), using the techniques described in connection with FIG. 5E, above.

At step 582, processing unit 110 may analyze the navigation information determined at step 580. In one embodiment, processing unit 110 may calculate the distance between a snail trail and a road polynomial (e.g., along the trail). If the variance of this distance along the trail exceeds a predetermined threshold (for example, 0.1 to 0.2 meters on a straight road, 0.3 to 0.4 meters on a moderately curvy road, and 0.5 to 0.6 meters on a road with sharp curves), processing unit 110 may determine that the leading vehicle is likely changing lanes. In the case where multiple vehicles are detected traveling ahead of vehicle 200, processing unit 110 may compare the snail trails associated with each vehicle. Based on the comparison, processing unit 110 may determine that a vehicle whose snail trail does not match with the snail trails of the other vehicles is likely changing lanes. Processing unit 110 may additionally compare the curvature of the snail trail (associated with the leading vehicle) with the expected curvature of the road segment in which the leading vehicle is traveling. The expected curvature may be extracted from map data (e.g., data from map database 160), from road polynomials, from other vehicles' snail trails, from prior knowledge about the road, and the like. If the difference in curvature of the snail trail and the expected curvature of the road segment exceeds a predetermined threshold, processing unit 110 may determine that the leading vehicle is likely changing lanes.

In another embodiment, processing unit 110 may compare the leading vehicle's instantaneous position with the look-ahead point (associated with vehicle 200) over a specific period of time (e.g., 0.5 to 1.5 seconds). If the distance between the leading vehicle's instantaneous position and the look-ahead point varies during the specific period of time, and the cumulative sum of variation exceeds a predetermined threshold (for example, 0.3 to 0.4 meters on a straight road, 0.7 to 0.8 meters on a moderately curvy road, and 1.3 to 1.7 meters on a road with sharp curves), processing unit 110 may determine that the leading vehicle is likely changing lanes. In another embodiment, processing unit 110 may analyze the geometry of the snail trail by comparing the lateral distance traveled along the trail with the expected curvature of the snail trail. The expected radius of curvature may be determined according to the calculation: $(\delta_z^2+\delta_x^2)/2/(\delta_x)$, where $\delta_x$ represents the lateral distance traveled and $\delta_z$ represents the longitudinal distance traveled. If the difference between the lateral distance traveled and the expected curvature exceeds a predetermined threshold (e.g., 500 to 700 meters), processing unit 110 may determine that the leading vehicle is likely changing lanes. In another embodiment, processing unit 110 may analyze the position of the leading vehicle. If the position of the leading vehicle obscures a road polynomial (e.g., the leading vehicle is overlaid on top of the road polynomial), then processing unit 110 may determine that the leading vehicle is likely changing lanes. In the case where the position of the leading vehicle is such that, another vehicle is detected ahead of the leading vehicle and the snail trails of the two vehicles are not parallel, processing unit 110 may determine that the (closer) leading vehicle is likely changing lanes.

At step 584, processing unit 110 may determine whether or not leading vehicle 200 is changing lanes based on the analysis performed at step 582. For example, processing unit 110 may make the determination based on a weighted average of the individual analyses performed at step 582. Under such a scheme, for example, a decision by processing unit 110 that the leading vehicle is likely changing lanes based on a particular type of analysis may be assigned a value of "1" (and "0" to represent a determination that the leading vehicle is not likely changing lanes). Different analyses performed at step 582 may be assigned different weights, and the disclosed embodiments are not limited to any particular combination of analyses and weights.

Figure 6:
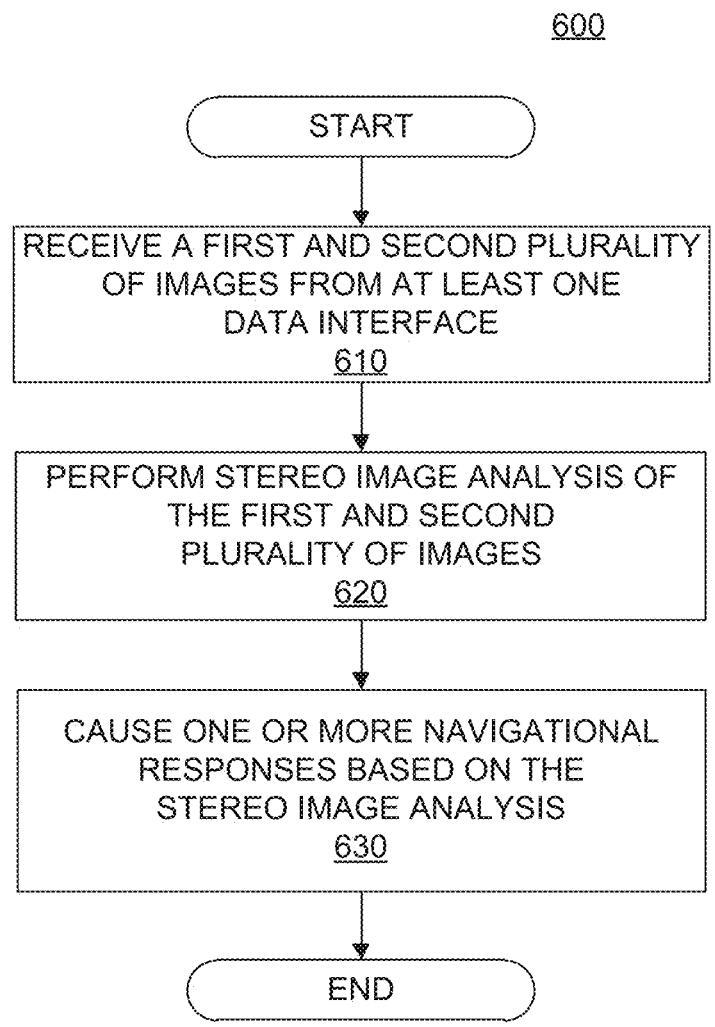
FIG. 6 is a flowchart showing an exemplary process for causing one or more navigational responses based on stereo image analysis consistent with the disclosed embodiments.

FIG. 6 is a flowchart showing an exemplary process 600 for causing one or more navigational responses based on stereo image analysis, consistent with disclosed embodiments. At step 610, processing unit 110 may receive a first and second plurality of images via data interface 128. For example, cameras included in image acquisition unit 120 (such as image capture devices 122 and 124 having fields of view 202 and 204) may capture a first and second plurality of images of an area forward of vehicle 200 and transmit them over a digital connection (e.g., USB, wireless, Bluetooth, etc.) to processing unit 110. In some embodiments, processing unit 110 may receive the first and second plurality of images via two or more data interfaces. The disclosed embodiments are not limited to any particular data interface configurations or protocols.

At step 620, processing unit 110 may execute stereo image analysis module 404 to perform stereo image analysis of the first and second plurality of images to create a 3D map of the road in front of the vehicle and detect features within the images, such as lane markings, vehicles, pedestrians, road signs, highway exit ramps, traffic lights, road hazards, and the like. Stereo image analysis may be performed in a manner similar to the steps described in connection with FIGS. 5A-5D, above. For example, processing unit 110 may execute stereo image analysis module 404 to detect candidate objects (e.g., vehicles, pedestrians, road marks, traffic lights, road hazards, etc.) within the first and second plurality of images, filter out a subset of the candidate objects based on various criteria, and perform multi-frame analysis, construct measurements, and determine a confidence level for the remaining candidate objects. In performing the steps above, processing unit 110 may consider information from both the first and second plurality of images, rather than information from one set of images alone. For example, processing unit 110 may analyze the differences in pixel-level data (or other data subsets from among the two streams of captured images) for a candidate object appearing in both the first and second plurality of images. As another example, processing unit 110 may estimate a position and/or velocity of a candidate object (e.g., relative to vehicle 200) by observing that the object appears in one of the plurality of images but not the other or relative to other differences that may exist relative to objects appearing if the two image streams. For example, position, velocity, and/or acceleration relative to vehicle 200 may be determined based on trajectories, positions, movement characteristics, etc. of features associated with an object appearing in one or both of the image streams.

At step 630, processing unit 110 may execute navigational response module 408 to cause one or more navigational responses in vehicle 200 based on the analysis performed at step 620 and the techniques as described above in connection with FIG. 4. Navigational responses may include, for example, a turn, a lane shift, a change in acceleration, a change in velocity, braking, and the like. In some embodiments, processing unit 110 may use data derived from execution of velocity and acceleration module 406 to cause the one or more navigational responses. Additionally, multiple navigational responses may occur simultaneously, in sequence, or any combination thereof.

FIG. 7 is a flowchart showing an exemplary process 700 for causing one or more navigational responses based on an analysis of three sets of images, consistent with disclosed embodiments. At step 710, processing unit 110 may receive a first, second, and third plurality of images via data interface 128. For instance, cameras included in image acquisition unit 120 (such as image capture devices 122, 124, and 126 having fields of view 202, 204, and 206) may capture a first, second, and third plurality of images of an area forward and/or to the side of vehicle 200 and transmit them over a digital connection (e.g., USB, wireless, Bluetooth, etc.) to processing unit 110. In some embodiments, processing unit 110 may receive the first, second, and third plurality of images via three or more data interfaces. For example, each of image capture devices 122, 124, 126 may have an associated data interface for communicating data to processing unit 110. The disclosed embodiments are not limited to any particular data interface configurations or protocols.

At step 720, processing unit 110 may analyze the first, second, and third plurality of images to detect features within the images, such as lane markings, vehicles, pedestrians, road signs, highway exit ramps, traffic lights, road hazards, and the like. The analysis may be performed in a manner similar to the steps described in connection with FIGS. 5A-5D and 6, above. For instance, processing unit 110 may perform monocular image analysis (e.g., via execution of monocular image analysis module 402 and based on the steps described in connection with FIGS. 5A-5D, above) on each of the first, second, and third plurality of images. Alternatively, processing unit 110 may perform stereo image analysis (e.g., via execution of stereo image analysis module 404 and based on the steps described in connection with FIG. 6, above) on the first and second plurality of images, the second and third plurality of images, and/or the first and third plurality of images. The processed information corresponding to the analysis of the first, second, and/or third plurality of images may be combined. In some embodiments, processing unit 110 may perform a combination of monocular and stereo image analyses. For example, processing unit 110 may perform monocular image analysis (e.g., via execution of monocular image analysis module 402) on the first plurality of images and stereo image analysis (e.g., via execution of stereo image analysis module 404) on the second and third plurality of images. The configuration of image capture devices 122, 124, and 126—including their respective locations and fields of view 202, 204, and 206—may influence the types of analyses conducted on the first, second, and third plurality of images. The disclosed embodiments are not limited to a particular configuration of image capture devices 122, 124, and 126, or the types of analyses conducted on the first, second, and third plurality of images.

In some embodiments, processing unit 110 may perform testing on system 100 based on the images acquired and analyzed at steps 710 and 720. Such testing may provide an indicator of the overall performance of system 100 for certain configurations of image capture devices 122, 124, and 126. For example, processing unit 110 may determine the proportion of "false hits" (e.g., cases where system 100 incorrectly determined the presence of a vehicle or pedestrian) and "misses."

At step 730, processing unit 110 may cause one or more navigational responses in vehicle 200 based on information derived from two of the first, second, and third plurality of images. Selection of two of the first, second, and third plurality of images may depend on various factors, such as, for example, the number, types, and sizes of objects detected in each of the plurality of images. Processing unit 110 may also make the selection based on image quality and resolution, the effective field of view reflected in the images, the number of captured frames, the extent to which one or more objects of interest actually appear in the frames (e.g., the percentage of frames in which an object appears, the proportion of the object that appears in each such frame, etc.), and the like.

In some embodiments, processing unit 110 may select information derived from two of the first, second, and third plurality of images by determining the extent to which information derived from one image source is consistent with information derived from other image sources. For example, processing unit 110 may combine the processed information derived from each of image capture devices 122, 124, and 126 (whether by monocular analysis, stereo analysis, or any combination of the two) and determine visual indicators (e.g., lane markings, a detected vehicle and its location and/or path, a detected traffic light, etc.) that are consistent across the images captured from each of image capture devices 122, 124, and 126. Processing unit 110 may also exclude information that is inconsistent across the captured images (e.g., a vehicle changing lanes, a lane model indicating a vehicle that is too close to vehicle 200, etc.). Thus, processing unit 110 may select information derived from two of the first, second, and third plurality of images based on the determinations of consistent and inconsistent information.

Navigational responses may include, for example, a turn, a lane shift, a change in acceleration, and the like. Processing unit 110 may cause the one or more navigational responses based on the analysis performed at step 720 and the techniques as described above in connection with FIG. 4. Processing unit 110 may also use data derived from execution of velocity and acceleration module 406 to cause the one or more navigational responses. In some embodiments, processing unit 110 may cause the one or more navigational responses based on a relative position, relative velocity, and/or relative acceleration between vehicle 200 and an object detected within any of the first, second, and third plurality of images. Multiple navigational responses may occur simultaneously, in sequence, or any combination thereof.

Analysis of captured images may allow for the generation and use of a sparse map model for autonomous vehicle navigation. In addition, analysis of captured images may allow for the localization of an autonomous vehicle using identified lane markings. Embodiments for detection of particular characteristics based on one or more particular analyses of captured images and for navigation of an autonomous vehicle using a sparse map model will be discussed below.

Sparse Road Model for Autonomous Vehicle Navigation

In some embodiments, the disclosed systems and methods may use a sparse map for autonomous vehicle navigation. In particular, the sparse map may be for autonomous vehicle navigation along a road segment. For example, the sparse map may provide sufficient information for navigating an autonomous vehicle without storing and/or updating a large quantity of data. As discussed below in further detail, an autonomous vehicle may use the sparse map to navigate one or more roads based on one or more stored trajectories.

Sparse Map for Autonomous Vehicle Navigation

In some embodiments, the disclosed systems and methods may generate a sparse map for autonomous vehicle navigation. For example, the sparse map may provide sufficient information for navigation without requiring excessive data storage or data transfer rates. As discussed below in further detail, a vehicle (which may be an autonomous vehicle) may use the sparse map to navigate one or more roads. For example, in some embodiments, the sparse map may include data related to a road and potentially landmarks along the road that may be sufficient for vehicle navigation, but which also exhibit small data footprints. For example, the sparse data maps described in detail below may require significantly less storage space and data transfer bandwidth as compared with digital maps including detailed map information, such as image data collected along a road.

For example, rather than storing detailed representations of a road segment, the sparse data map may store three-dimensional polynomial representations of preferred vehicle paths along a road. These paths may require very little data storage space. Further, in the described sparse data maps, landmarks may be identified and included in the sparse map road model to aid in navigation. These landmarks may be located at any spacing suitable for enabling vehicle navigation, but in some cases, such landmarks need not be identified and included in the model at high densities and short spacings. Rather, in some cases, navigation may be possible based on landmarks that are spaced apart by at least 50 meters, at least 100 meters, at least 500 meters, at least 1 kilometer, or at least 2 kilometers. As will be discussed in more detail in other sections, the sparse map may be generated based on data collected or measured by vehicles equipped with various sensors and devices, such as image capture devices, Global Positioning System sensors, motion sensors, etc., as the vehicles travel along roadways. In some cases, the sparse map may be generated based on data collected during multiple drives of one or more vehicles along a particular roadway. Generating a sparse map using multiple drives of one or more vehicles may be referred to as "crowdsourcing" a sparse map.

Consistent with disclosed embodiments, an autonomous vehicle system may use a sparse map for navigation. For example, the disclosed systems and methods may distribute a sparse map for generating a road navigation model for an autonomous vehicle and may navigate an autonomous vehicle along a road segment using a sparse map and/or a generated road navigation model. Sparse maps consistent with the present disclosure may include one or more three-dimensional contours that may represent predetermined trajectories that autonomous vehicles may traverse as they move along associated road segments.

Sparse maps consistent with the present disclosure may also include data representing one or more road features. Such road features may include recognized landmarks, road signature profiles, and any other road-related features useful in navigating a vehicle. Sparse maps consistent with the present disclosure may enable autonomous navigation of a vehicle based on relatively small amounts of data included in the sparse map. For example, rather than including detailed representations of a road, such as road edges, road curvature, images associated with road segments, or data detailing other physical features associated with a road segment, the disclosed embodiments of the sparse map may require relatively little storage space (and relatively little bandwidth when portions of the sparse map are transferred to a vehicle) but may still adequately provide for autonomous vehicle navigation. The small data footprint of the disclosed sparse maps, discussed in further detail below, may be achieved in some embodiments by storing representations of road-related elements that require small amounts of data but still enable autonomous navigation.

For example, rather than storing detailed representations of various aspects of a road, the disclosed sparse maps may store polynomial representations of one or more trajectories that a vehicle may follow along the road. Thus, rather than storing (or having to transfer) details regarding the physical nature of the road to enable navigation along the road, using the disclosed sparse maps, a vehicle may be navigated along a particular road segment without, in some cases, having to interpret physical aspects of the road, but rather, by aligning its path of travel with a trajectory (e.g., a polynomial spline) along the particular road segment. In this way, the vehicle may be navigated based mainly upon the stored trajectory (e.g., a polynomial spline) that may require much less storage space than an approach involving storage of roadway images, road parameters, road layout, etc.

In addition to the stored polynomial representations of trajectories along a road segment, the disclosed sparse maps may also include small data objects that may represent a road feature. In some embodiments, the small data objects may include digital signatures, which are derived from a digital image (or a digital signal) that was obtained by a sensor (e.g., a camera or other sensor, such as a suspension sensor) onboard a vehicle traveling along the road segment. The digital signature may have a reduced size relative to the signal that was acquired by the sensor. In some embodiments, the digital signature may be created to be compatible with a classifier function that is configured to detect and to identify the road feature from the signal that is acquired by the sensor, for example, during a subsequent drive. In some embodiments, a digital signature may be created such that the digital signature has a footprint that is as small as possible, while retaining the ability to correlate or match the road feature with the stored signature based on an image (or a digital signal generated by a sensor, if the stored signature is not based on an image and/or includes other data) of the road feature that is captured by a camera onboard a vehicle traveling along the same road segment at a subsequent time.

In some embodiments, a size of the data objects may be further associated with a uniqueness of the road feature. For example, for a road feature that is detectable by a camera onboard a vehicle, and where the camera system onboard the vehicle is coupled to a classifier that is capable of distinguishing the image data corresponding to that road feature as being associated with a particular type of road feature, for example, a road sign, and where such a road sign is locally unique in that area (e.g., there is no identical road sign or road sign of the same type nearby), it may be sufficient to store data indicating the type of the road feature and its location.

As will be discussed in further detail below, road features (e.g., landmarks along a road segment) may be stored as small data objects that may represent a road feature in relatively few bytes, while at the same time providing sufficient information for recognizing and using such a feature for navigation. In one example, a road sign may be identified as a recognized landmark on which navigation of a vehicle may be based. A representation of the road sign may be stored in the sparse map to include, e.g., a few bytes of data indicating a type of landmark (e.g., a stop sign) and a few bytes of data indicating a location of the landmark (e.g., coordinates). Navigating based on such data-light representations of the landmarks (e.g., using representations sufficient for locating, recognizing, and navigating based upon the landmarks) may provide a desired level of navigational functionality associated with sparse maps without significantly increasing the data overhead associated with the sparse maps. This lean representation of landmarks (and other road features) may take advantage of the sensors and processors included onboard such vehicles that are configured to detect, identify, and/or classify certain road features.

When, for example, a sign or even a particular type of a sign is locally unique (e.g., when there is no other sign or no other sign of the same type) in a given area, the sparse map may use data indicating a type of a landmark (a sign or a specific type of sign), and during navigation (e.g., autonomous navigation) when a camera onboard an autonomous vehicle captures an image of the area including a sign (or of a specific type of sign), the processor may process the image, detect the sign (if indeed present in the image), classify the image as a sign (or as a specific type of sign), and correlate the location of the image with the location of the sign as stored in the sparse map.

Road Feature Representation

In some embodiments, a sparse map may include at least one line representation of a road surface feature extending along a road segment and a plurality of landmarks associated with the road segment. In certain aspects, the sparse map may be generated via "crowdsourcing," for example, through image analysis of a plurality of images acquired as one or more vehicles traverse the road segment.

In addition to target trajectories and identified landmarks, a sparse may include information relating to various other road features. For example, FIG. 9A illustrates a representation of curves along a particular road segment that may be stored in a sparse map. In some embodiments, a single lane of a road may be modeled by a three-dimensional polynomial description of left and right sides of the road. Such polynomials representing left and right sides of a single lane are shown in FIG. 8A.

Figure 8A:
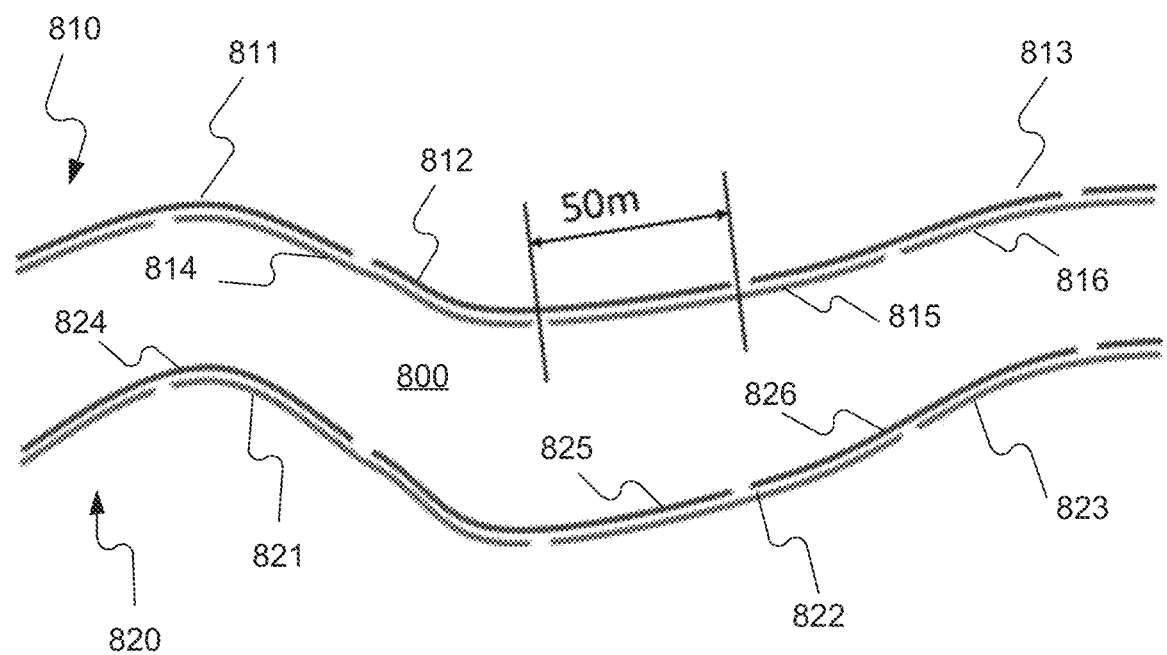
FIG. 8A illustrates a polynomial representation of a portions of a road segment consistent with the disclosed embodiments.
Figure 9A:
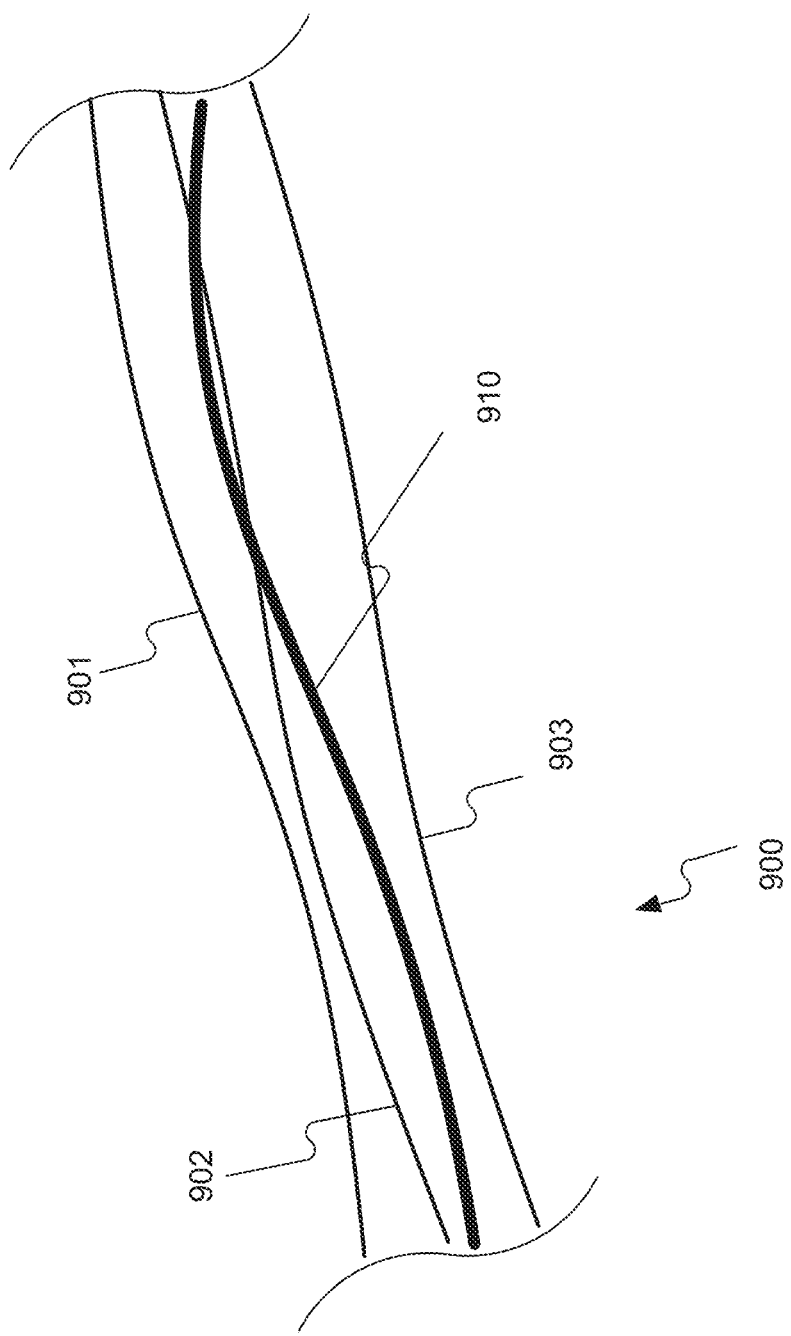
FIG. 9A shows polynomial representations of trajectories consistent with the disclosed embodiments.

Regardless of how many lanes a road may have, the road may be represented using polynomials in a way similar to that illustrated in FIG. 8A. For example, left and right sides of a multi-lane road may be represented by polynomials similar to those shown in FIG. 8A, and intermediate lane markings included on a multi-lane road (e.g., dashed markings representing lane boundaries, solid yellow lines representing boundaries between lanes traveling in different directions, etc.) may also be represented using polynomials such as those shown in FIG. 8A.

As shown in FIG. 8A, a lane 800 may be represented using polynomials (e.g., a first order, second order, third order, or any suitable order polynomials). For illustration, lane 800 is shown as a two-dimensional lane and the polynomials are shown as two-dimensional polynomials. As depicted in FIG. 8A, lane 800 includes a left side 810 and a right side 820. In some embodiments, more than one polynomial may be used to represent a location of each side of the road or lane boundary. For example, each of left side 810 and right side 820 may be represented by a plurality of polynomials of any suitable length. In some cases, the polynomials may have a length of about 100 m, although other lengths greater than or less than 100 m may also be used. Additionally, the polynomials can overlap with one another in order to facilitate seamless transitions in navigating based on subsequently encountered polynomials as a host vehicle travels along a roadway. For example, each of left side 810 and right side 820 may be represented by a plurality of third order polynomials separated into segments of about 100 meters in length (an example of the first predetermined range), and overlapping each other by about 50 meters. The polynomials representing the left side 810 and the right side 820 may or may not have the same order. For example, in some embodiments, some polynomials may be second order polynomials, some may be third order polynomials, and some may be fourth order polynomials.

In the example shown in FIG. 8A, left side 810 of lane 800 is represented by two groups of third order polynomials. The first group includes polynomial segments 811, 812, and 813. The second group includes polynomial segments 814, 815, and 816. The two groups, while substantially parallel to each other, follow the locations of their respective sides of the road. Polynomial segments 811, 812, 813, 814, 815, and 816 have a length of about 100 meters and overlap adjacent segments in the series by about 50 meters. As noted previously, however, polynomials of different lengths and different overlap amounts may also be used. For example, the polynomials may have lengths of 500 m, 1 km, or more, and the overlap amount may vary from 0 to 50 m, 50 m to 100 m, or greater than 100 m. Additionally, while FIG. 8A is shown as representing polynomials extending in 2D space (e.g., on the surface of the paper), it is to be understood that these polynomials may represent curves extending in three dimensions (e.g., including a height component) to represent elevation changes in a road segment in addition to X-Y curvature. In the example shown in FIG. 8A, right side 820 of lane 800 is further represented by a first group having polynomial segments 821, 822, and 823 and a second group having polynomial segments 824, 825, and 826.

Figure 8B:
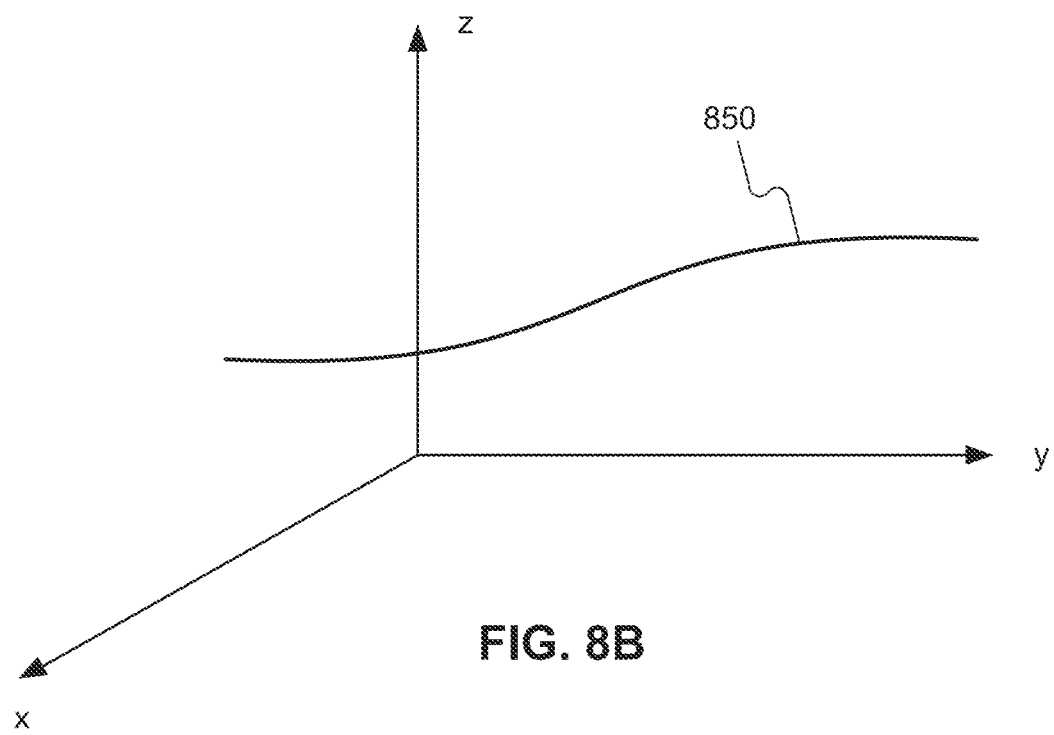
FIG. 8B illustrates a curve in three-dimensional space representing a target trajectory of a vehicle, for a particular road segment, included in a sparse map consistent with the disclosed embodiments.

Returning to the target trajectories of a sparse map, FIG. 8B shows a three-dimensional polynomial representing a target trajectory for a vehicle traveling along a particular road segment. The target trajectory represents not only the X-Y path that a host vehicle should travel along a particular road segment, but also the elevation change that the host vehicle will experience when traveling along the road segment. Thus, each target trajectory in a sparse map may be represented by one or more three-dimensional polynomials, like the three-dimensional polynomial 850 shown in FIG. 8B. A sparse map may include a plurality of trajectories (e g, millions or billions or more to represent trajectories of vehicles along various road segments along roadways throughout the world). In some embodiments, each target trajectory may correspond to a spline connecting three-dimensional polynomial segments.

Regarding the data footprint of polynomial curves stored in a sparse map, in some embodiments, each third degree polynomial may be represented by four parameters, each requiring four bytes of data. Suitable representations may be obtained with third degree polynomials requiring about 192 bytes of data for every 100 m. This may translate to approximately 200 kB per hour in data usage/transfer requirements for a host vehicle traveling approximately 100 km/hr.

A sparse map may describe the lanes network using a combination of geometry descriptors and meta-data. The geometry may be described by polynomials or splines as described above. The meta-data may describe the number of lanes, special characteristics (such as a car pool lane), and possibly other sparse labels. The total footprint of such indicators may be negligible.

Accordingly, a sparse map according to embodiments of the present disclosure may include at least one line representation of a road surface feature extending along the road segment, each line representation representing a path along the road segment substantially corresponding with the road surface feature. In some embodiments, as discussed above, the at least one line representation of the road surface feature may include a spline, a polynomial representation, or a curve. Furthermore, in some embodiments, the road surface feature may include at least one of a road edge or a lane marking. Moreover, as discussed below with respect to "crowdsourcing," the road surface feature may be identified through image analysis of a plurality of images acquired as one or more vehicles traverse the road segment.

FIG. 9A shows polynomial representations of trajectories captured during a process of building or maintaining a sparse map. A polynomial representation of a target trajectory included in a sparse map may be determined based on two or more reconstructed trajectories of prior traversals of vehicles along the same road segment. In some embodiments, the polynomial representation of the target trajectory included in a sparse map may be an aggregation of two or more reconstructed trajectories of prior traversals of vehicles along the same road segment. In some embodiments, the polynomial representation of the target trajectory included in a sparse map may be an average of the two or more reconstructed trajectories of prior traversals of vehicles along the same road segment. Other mathematical operations may also be used to construct a target trajectory along a road path based on reconstructed trajectories collected from vehicles traversing along a road segment.

As shown in FIG. 9A, a road segment 900 may be traveled by a number of vehicles 200 at different times. Each vehicle 200 may collect data relating to a path that the vehicle took along the road segment. The path traveled by a particular vehicle may be determined based on camera data, accelerometer information, speed sensor information, and/or GPS information, among other potential sources. Such data may be used to reconstruct trajectories of vehicles traveling along the road segment, and based on these reconstructed trajectories, a target trajectory (or multiple target trajectories) may be determined for the particular road segment. Such target trajectories may represent a preferred path of a host vehicle (e.g., guided by an autonomous navigation system) as the vehicle travels along the road segment.

In the example shown in FIG. 9A, a first reconstructed trajectory 901 may be determined based on data received from a first vehicle traversing road segment 900 at a first time period (e.g., day 1), a second reconstructed trajectory 902 may be obtained from a second vehicle traversing road segment 900 at a second time period (e.g., day 2), and a third reconstructed trajectory 903 may be obtained from a third vehicle traversing road segment 900 at a third time period (e.g., day 3). Each trajectory 901, 902, and 903 may be represented by a polynomial, such as a three-dimensional polynomial. It should be noted that in some embodiments, any of the reconstructed trajectories may be assembled onboard the vehicles traversing road segment 900.

Additionally, or alternatively, such reconstructed trajectories may be determined on a server side based on information received from vehicles traversing road segment 900. For example, in some embodiments, vehicles 200 may transmit data to one or more servers relating to their motion along road segment 900 (e.g., steering angle, heading, time, position, speed, sensed road geometry, and/or sensed landmarks, among things). The server may reconstruct trajectories for vehicles 200 based on the received data. The server may also generate a target trajectory for guiding navigation of autonomous vehicle that will travel along the same road segment 900 at a later time based on the first, second, and third trajectories 901, 902, and 903. While a target trajectory may be associated with a single prior traversal of a road segment, in some embodiments, each target trajectory included in a sparse map may be determined based on two or more reconstructed trajectories of vehicles traversing the same road segment. In FIG. 9A, the target trajectory is represented by 910. In some embodiments, the target trajectory 910 may be generated based on an average of the first, second, and third trajectories 901, 902, and 903. In some embodiments, the target trajectory 910 included in a sparse map may be an aggregation (e.g., a weighted combination) of two or more reconstructed trajectories.

Figure 9B:
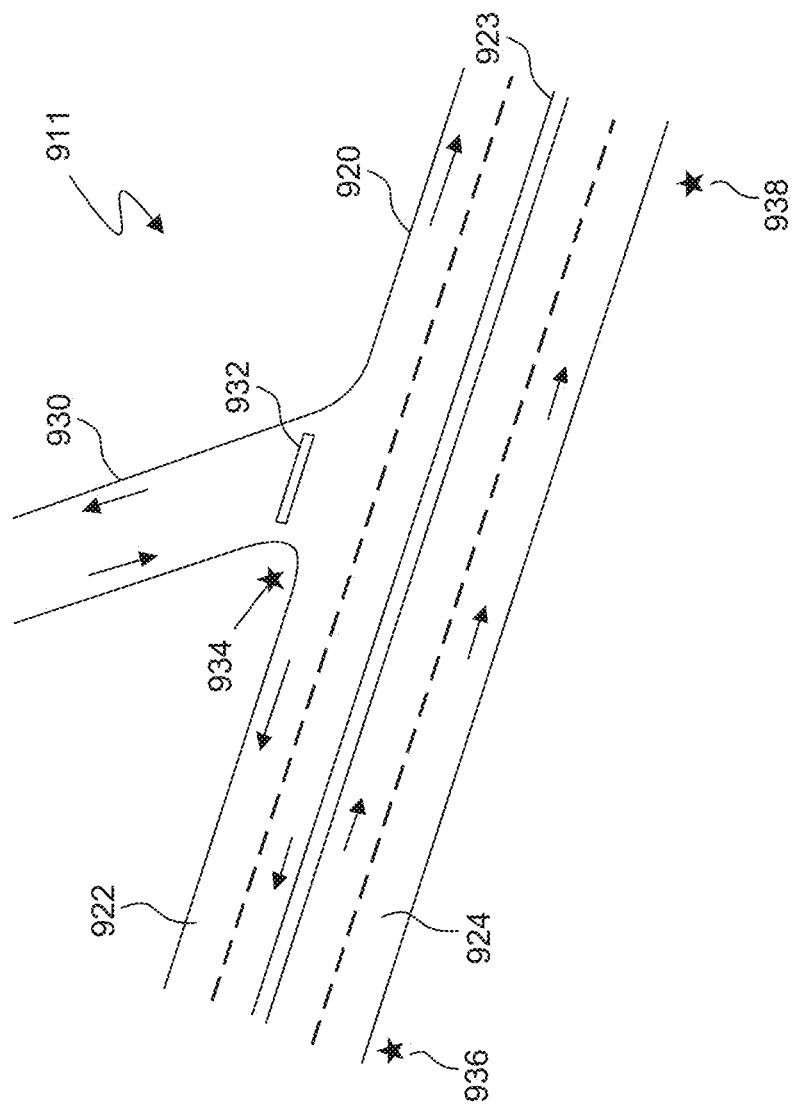
FIGS. 9B and 9C show target trajectories along a multi-lane road consistent with disclosed embodiments.
Figure 9C:
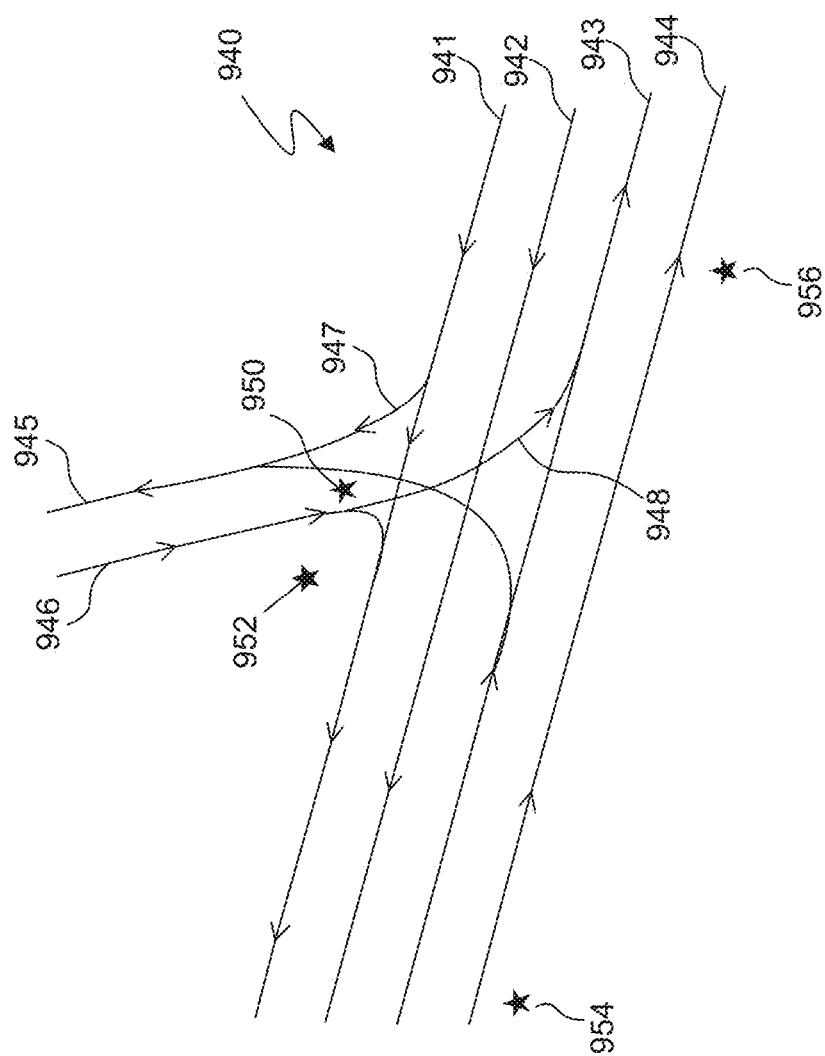

FIGS. 9B and 9C further illustrate the concept of target trajectories associated with road segments present within a geographic region 911. As shown in FIG. 9B, a first road segment 920 within geographic region 911 may include a multilane road, which includes two lanes 922 designated for vehicle travel in a first direction and two additional lanes 924 designated for vehicle travel in a second direction opposite to the first direction. Lanes 922 and lanes 924 may be separated by a double yellow line 923. Geographic region 911 may also include a branching road segment 930 that intersects with road segment 920. Road segment 930 may include a two-lane road, each lane being designated for a different direction of travel. Geographic region 911 may also include other road features, such as a stop line 932, a stop sign 934, a speed limit sign 936, and a hazard sign 938.

As shown in FIG. 9C, a sparse map may include a local map 940 including a road model for assisting with autonomous navigation of vehicles within geographic region 911. For example, local map 940 may include target trajectories for one or more lanes associated with road segments 920 and/or 930 within geographic region 911. For example, local map 940 may include target trajectories 941 and/or 942 that an autonomous vehicle may access or rely upon when traversing lanes 922. Similarly, local map 940 may include target trajectories 943 and/or 944 that an autonomous vehicle may access or rely upon when traversing lanes 924. Further, local map 940 may include target trajectories 945 and/or 946 that an autonomous vehicle may access or rely upon when traversing road segment 930. Target trajectory 947 represents a preferred path an autonomous vehicle should follow when transitioning from lanes 920 (and specifically, relative to target trajectory 941 associated with a right-most lane of lanes 920) to road segment 930 (and specifically, relative to a target trajectory 945 associated with a first side of road segment 930. Similarly, target trajectory 948 represents a preferred path an autonomous vehicle should follow when transitioning from road segment 930 (and specifically, relative to target trajectory 946) to a portion of road segment 924 (and specifically, as shown, relative to a target trajectory 943 associated with a left lane of lanes 924.

A sparse map may also include representations of other road-related features associated with geographic region 911. For example, a sparse map may also include representations of one or more landmarks identified in geographic region 911. Such landmarks may include a first landmark 950 associated with stop line 932, a second landmark 952 associated with stop sign 934, a third landmark associated with speed limit sign 954, and a fourth landmark 956 associated with hazard sign 938. Such landmarks may be used, for example, to assist an autonomous vehicle in determining its current location relative to any of the shown target trajectories, such that the vehicle may adjust its heading to match a direction of the target trajectory at the determined location.

Figure 9D:
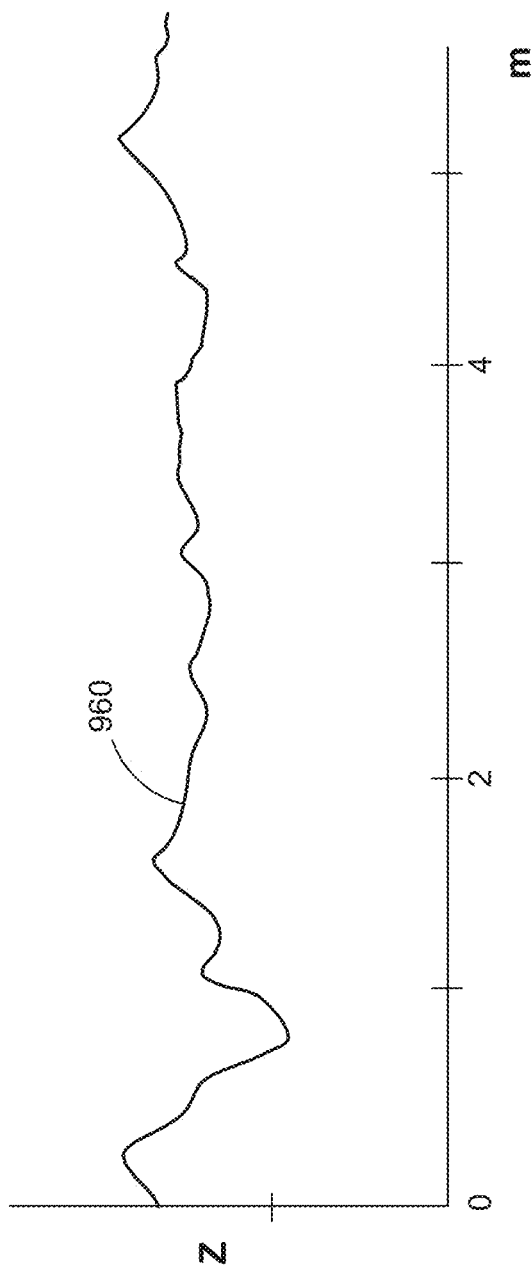
FIG. 9D shows an example road signature profile consistent with disclosed embodiments.

In some embodiments, a sparse map may also include road signature profiles. Such road signature profiles may be associated with any discernible/measurable variation in at least one parameter associated with a road. For example, in some cases, such profiles may be associated with variations in road surface information such as variations in surface roughness of a particular road segment, variations in road width over a particular road segment, variations in distances between dashed lines painted along a particular road segment, variations in road curvature along a particular road segment, etc. FIG. 9D shows an example of a road signature profile 960. While profile 960 may represent any of the parameters mentioned above, or others, in one example, profile 960 may represent a measure of road surface roughness, as obtained, for example, by monitoring one or more sensors providing outputs indicative of an amount of suspension displacement as a vehicle travels a particular road segment.

Alternatively or concurrently, profile 960 may represent variation in road width, as determined based on image data obtained via a camera onboard a vehicle traveling a particular road segment. Such profiles may be useful, for example, in determining a particular location of an autonomous vehicle relative to a particular target trajectory. That is, as it traverses a road segment, an autonomous vehicle may measure a profile associated with one or more parameters associated with the road segment.

If the measured profile can be correlated/matched with a predetermined profile that plots the parameter variation with respect to position along the road segment, then the measured and predetermined profiles may be used (e.g., by overlaying corresponding sections of the measured and predetermined profiles) in order to determine a current position along the road segment and, therefore, a current position relative to a target trajectory for the road segment.

In some embodiments, a sparse map may include different trajectories based on different characteristics associated with a user of autonomous vehicles, environmental conditions, and/or other parameters relating to driving. For example, in some embodiments, different trajectories may be generated based on different user preferences and/or profiles. A sparse map including such different trajectories may be provided to different autonomous vehicles of different users. For example, some users may prefer to avoid toll roads, while others may prefer to take the shortest or fastest routes, regardless of whether there is a toll road on the route. The disclosed systems may generate different sparse maps with different trajectories based on such different user preferences or profiles. As another example, some users may prefer to travel in a fast moving lane, while others may prefer to maintain a position in the central lane at all times.

Different trajectories may be generated and included in a sparse map based on different environmental conditions, such as day and night, snow, rain, fog, etc. Autonomous vehicles driving under different environmental conditions may be provided with a sparse map generated based on such different environmental conditions. In some embodiments, cameras provided on autonomous vehicles may detect the environmental conditions, and may provide such information back to a server that generates and provides sparse maps. For example, the server may generate or update an already generated a sparse map to include trajectories that may be more suitable or safer for autonomous driving under the detected environmental conditions. The update of a sparse map based on environmental conditions may be performed dynamically as the autonomous vehicles are traveling along roads.

Other different parameters relating to driving may also be used as a basis for generating and providing different sparse maps to different autonomous vehicles. For example, when an autonomous vehicle is traveling at a high speed, turns may be tighter. Trajectories associated with specific lanes, rather than roads, may be included in a sparse map such that the autonomous vehicle may maintain within a specific lane as the vehicle follows a specific trajectory. When an image captured by a camera onboard the autonomous vehicle indicates that the vehicle has drifted outside of the lane (e.g., crossed the lane mark), an action may be triggered within the vehicle to bring the vehicle back to the designated lane according to the specific trajectory.

Figure 10:
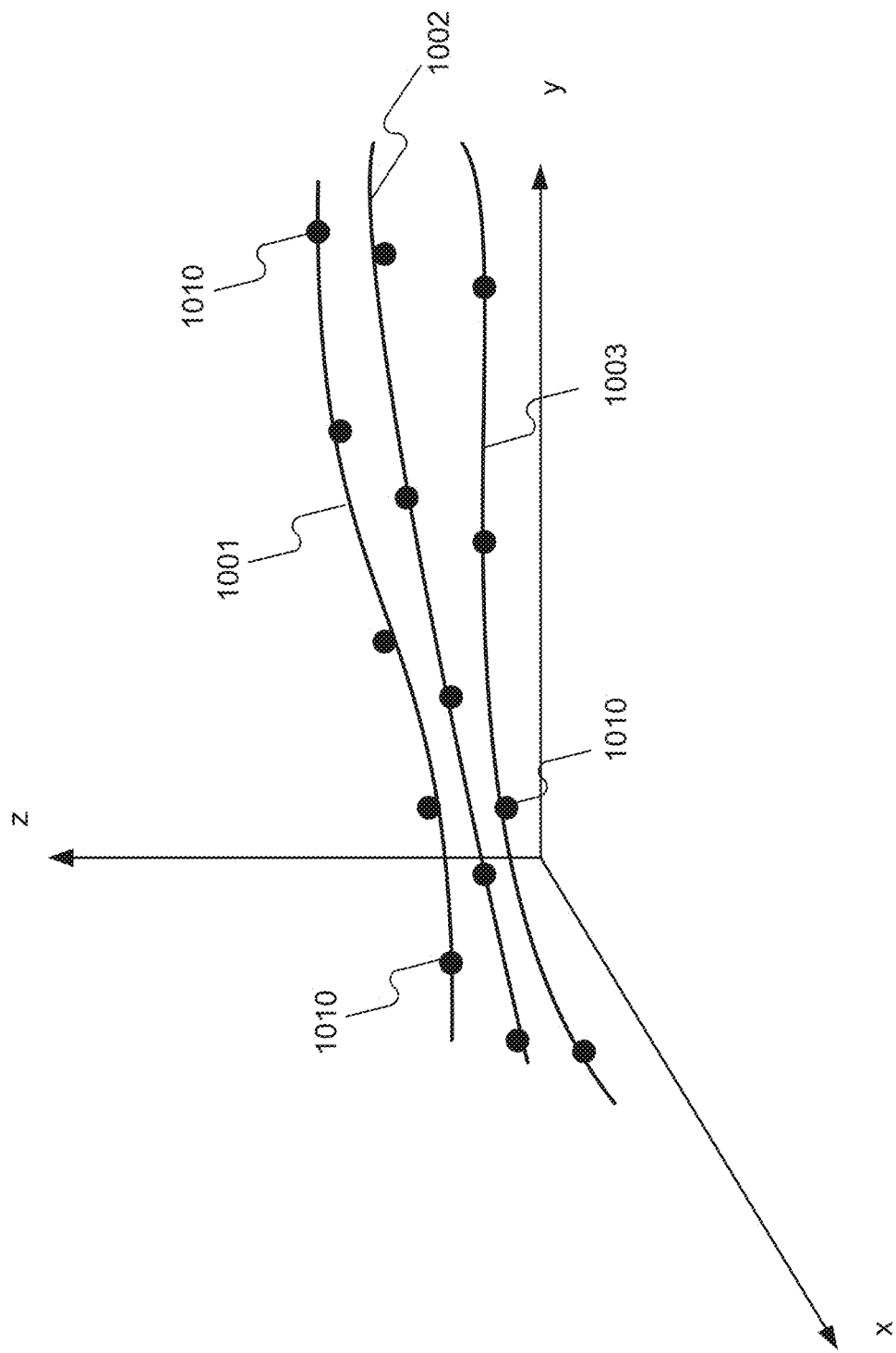
FIG. 10 illustrates an example autonomous vehicle road navigation model represented by a plurality of three dimensional splines, consistent with the disclosed embodiments.

FIG. 10 illustrates an example autonomous vehicle road navigation model represented by a plurality of three dimensional splines 1001, 1002, and 1003. The curves 1001, 1002, and 1003 shown in FIG. 10 are for illustration purpose only. Each spline may include one or more three dimensional polynomials connecting a plurality of data points 1010. Each polynomial may be a first order polynomial, a second order polynomial, a third order polynomial, or a combination of any suitable polynomials having different orders. Each data point 1010 may be associated with the navigation information received from a plurality of vehicles. In some embodiments, each data point 1010 may be associated with data related to landmarks (e.g., size, location, and identification information of landmarks) and/or road signature profiles (e.g., road geometry, road roughness profile, road curvature profile, road width profile). In some embodiments, some data points 1010 may be associated with data related to landmarks, and others may be associated with data related to road signature profiles.

Figure 11:
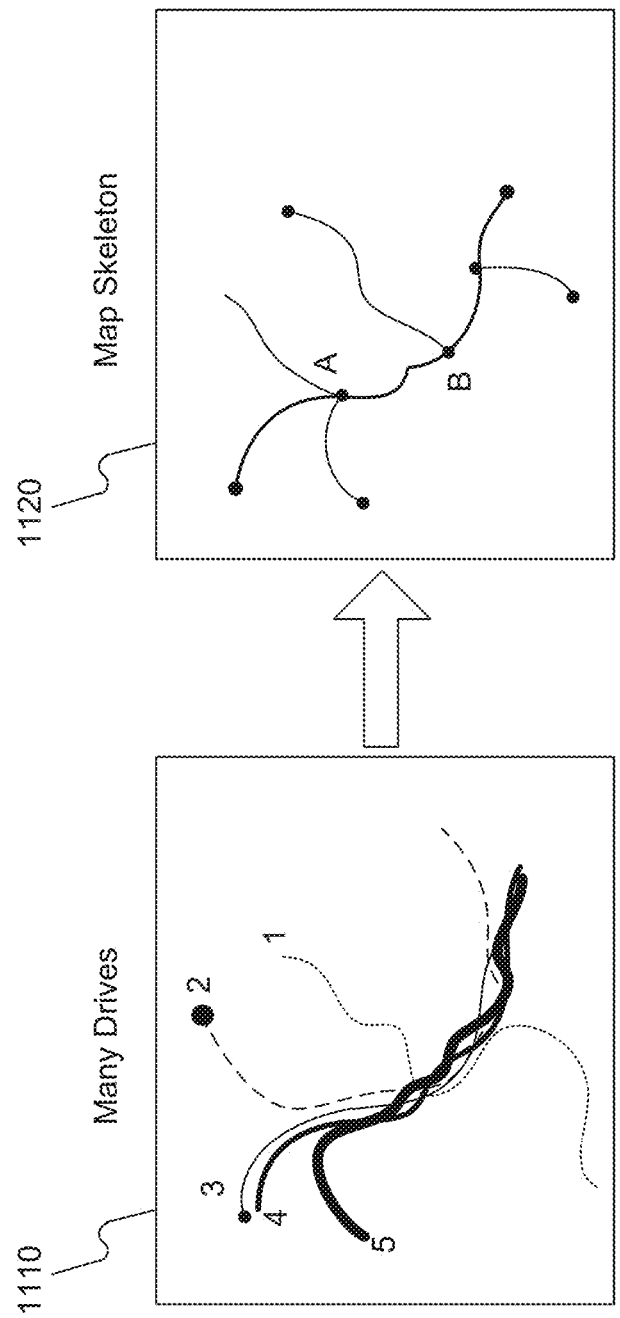
FIG. 11 shows a map skeleton generated from combining location information from many drives, consistent with the disclosed embodiments.

FIG. 11 illustrates raw location data 1110 (e.g., GPS data) received from five separate drives. One drive may be separate from another drive if it was traversed by separate vehicles at the same time, by the same vehicle at separate times, or by separate vehicles at separate times. To account for errors in the location data 1110 and for differing locations of vehicles within the same lane (e.g., one vehicle may drive closer to the left of a lane than another), a remote server may generate a map skeleton 1120 using one or more statistical techniques to determine whether variations in the raw location data 1110 represent actual divergences or statistical errors. Each path within skeleton 1120 may be linked back to the raw data 1110 that formed the path. For example, the path between A and B within skeleton 1120 is linked to raw data 1110 from drives 2, 3, 4, and 5 but not from drive 1. Skeleton 1120 may not be detailed enough to be used to navigate a vehicle (e.g., because it combines drives from multiple lanes on the same road unlike the splines described above) but may provide useful topological information and may be used to define intersections.

Safety and Comfort Constraints for Navigation

In addition to navigational models, an autonomous vehicle (whether full autonomous, e.g., a self-driving vehicle, or partially autonomous, e.g., one or more driver assist systems or functions) generally uses a driving policy to ensure safety of other drivers and pedestrians as well as comfort of the passengers inside.

Accordingly, an autonomous vehicle may sense a navigational state in an environment of a host vehicle. For example, the vehicle may rely upon input from various sensors and sensing systems associated with the host vehicle. These inputs may include images or image streams from one or more onboard cameras, GPS position information, accelerometer outputs, user feedback, or user inputs to one or more user interface devices, radar, lidar, etc. Sensing, which may include data from cameras and/or any other available sensors, along with map information, may be collected, analyzed, and formulated into a "sensed state," describing information extracted from a scene in the environment of the host vehicle. The sensed state may include sensed information relating to target vehicles, lane markings, pedestrians, traffic lights, road geometry, lane shape, obstacles, distances to other objects/vehicles, relative velocities, relative accelerations, among any other potential sensed information. Supervised machine learning may be implemented in order to produce a sensing state output based on sensed data provided. The output of the sensing module may represent a sensed navigational "state" of the host vehicle, which may be used in a driving policy, as described below.

While a sensed state may be developed based on image data received from one or more cameras or image sensors associated with a host vehicle, a sensed state for use in navigation may be developed using any suitable sensor or combination of sensors. In some embodiments, the sensed state may be developed without reliance upon captured image data. In fact, any of the navigational principles described herein may be applicable to sensed states developed based on captured image data as well as sensed states developed using other non-image based sensors. The sensed state may also be determined via sources external to the host vehicle. For example, a sensed state may be developed in full or in part based on information received from sources remote from the host vehicle (e.g., based on sensor information, processed state information, etc. shared from other vehicles, shared from a central server, or from any other source of information relevant to a navigational state of the host vehicle).

The autonomous vehicle may implement a desired driving policy in order to decide on one or more navigational actions for the host vehicle to take in response to the sensed navigational state. If there are no other agents (e.g., target vehicles or pedestrians) present in the environment of the host vehicle, the sensed state input may be handled in a relatively straightforward manner. The task becomes more complex when the sensed state requires negotiation with one or more other agents. The technology used to generate the output of from the driving policy may include reinforcement learning (discussed in more detail below). The output of the driving policy may include at least one navigational action for the host vehicle and may include a desired acceleration (which may translate to an updated speed for the host vehicle), a desired yaw rate for the host vehicle, a desired trajectory, among other potential desired navigational actions.

Based on the output from the driving policy, the autonomous vehicle may develop control instructions for one or more actuators or controlled devices associated with the host vehicle. Such actuators and devices may include an accelerator, one or more steering controls, a brake, a signal transmitter, a display, or any other actuator or device that may be controlled as part of a navigation operation associated with a host vehicle. Aspects of control theory may be used to generate the control instructions. The instructions to controllable components of the host vehicle may implement the desired navigational goals or requirements of the driving policy.

Returning to the driving policy discussed above, in some embodiments, a trained system trained through reinforcement learning may be used to implement the driving policy. In other embodiments, the driving policy may be implemented without a machine learning approach, by using specified algorithms to "manually" address the various scenarios that may arise during autonomous navigation. Such an approach, however, while viable, may result in a driving policy that is too simplistic and may lack the flexibility of a trained system based on machine learning. A trained system, for example, may be better equipped to handle complex navigational states and may better determine whether a taxi is parking or is stopping to pick up or drop off a passenger; determine whether a pedestrian intends to cross the street ahead of the host vehicle; balance unexpected behavior of other drivers with defensiveness; negotiate in dense traffic involving target vehicles and/or pedestrians; decide when to suspend certain navigational rules or augment other rules; anticipate un-sensed, but anticipated conditions (e.g., whether a pedestrian will emerge from behind a car or obstacle); etc. A trained system based on reinforcement learning may also be better equipped to address a state space that is continuous and high-dimensional along with an action space that is continuous.

Training of the system using reinforcement learning may involve learning a driving policy in order to map from sensed states to navigational actions. A driving policy may be a function $\pi:S \to A$, where S is a set of states and $A \subset \mathbb{R}^2$ is the action space (e.g., desired speed, acceleration, yaw commands, etc.). The state space is $S=S_s \times S_p$, where $S_s$ is the sensing state and $S_p$ is additional information on the state saved by the policy. Working in discrete time intervals, at time t, the current state $s_t \in S$ may be observed, and the policy may be applied to obtain a desired action, $a_t = \pi(s_t)$.

The system may be trained through exposure to various navigational states, having the system apply the policy, providing a reward (based on a reward function designed to reward desirable navigational behavior). Based on the reward feedback, the system may "learn" the policy and becomes trained in producing desirable navigational actions. For example, the learning system may observe the current state $s_t \in S$ and decide on an action $a_t \in A$ based on a policy $\pi:S \to \mathbb{D}(A)$. Based on the decided action (and implementation of the action), the environment moves to the next state $s_{t+1} \in S$ for observation by the learning system. For each action developed in response to the observed state, the feedback to the learning system is a reward signal $r_1$, $r_2$, . . . .

The goal of Reinforcement Learning (RL) is generally to find a policy $\pi$. It is usually assumed that at time t, there is a reward function $r_t$ which measures the instantaneous quality of being at state $s_t$ and taking action $a_t$. However, taking the action $a_t$ at time t affects the environment and therefore affects the value of the future states. As a result, when deciding on what action to take, not only should the current reward be taken into account, but future rewards should also be considered. In some instances the system should take a certain action, even though it is associated with a reward lower than another available option, when the system determines that in the future a greater reward may be realized if the lower reward option is taken now. To formalize this, observe that a policy, $\pi$, and an initial state, s, induces a distribution over $\mathbb{R}^T$, where the probability of a vector $(r_1, \ldots, r_T)$ is the probability of observing the rewards $r_1, \ldots, r_T$, if the agent starts at state $s_0=s$ and from there on follows the policy $\pi$. The value of the initial state s may be defined as:

$$V^\pi(s) = \mathbb{E}\left[\sum_{t=1}^{T} r_t \,\middle|\, s_0 = s, \forall t \geq 1, a_t = \pi(s_t)\right].$$

Instead of restricting the time horizon to T, the future rewards may be discounted to define, for some fixed $\gamma \in (0, 1)$:

$$V^\pi(s) = \mathbb{E}\left[\sum_{t=1}^{\infty} \gamma^t r_t \,\middle|\, s_0 = s, \forall t \geq 1, a_t = \pi(s_t)\right].$$

In any case, the optimal policy is the solution of $$\operatorname*{argmax}_\pi \mathbb{E}[V^\pi(s)],$$

where the expectation is over the initial state, s.

There are several possible methodologies for training the driving policy system. For example, an imitation approach (e.g., behavior cloning) may be used in which the system learns from state/action pairs where the actions are those that would be chosen by a good agent (e.g., a human) in response to a particular observed state. Suppose a human driver is observed. Through this observation, many examples of the form $(s_t, a_t)$, where $s_t$ is the state and $a_t$ is the action of the human driver could be obtained, observed, and used as a basis for training the driving policy system. For example, supervised learning can be used to learn a policy $\pi$ such that $\pi(s_t) \approx a_t$. There are many potential advantages of this approach. First, there is no requirement to define a reward function. Second, the learning is supervised and happens offline (there is no need to apply the agent in the learning process). A disadvantage of this method is that different human drivers, and even the same human drivers, are not deterministic in their policy choices. Hence, learning a function for which $\|\pi(s_t)-a_t\|$ is very small is often infeasible. And, even small errors may accumulate over time to yield large errors.

Another technique that may be employed is policy based learning. Here, the policy may be expressed in parametric form and directly optimized using a suitable optimization technique (e.g., stochastic gradient descent). The approach is to directly solve the problem given in $$\operatorname*{argmax}_\pi \mathbb{E}[V^\pi(s)].$$

There are of course many ways to solve the problem. One advantage of this approach is that it tackles the problem directly, and therefore often leads to good practical results. One potential disadvantage is that it often requires an "on-policy" training, namely, the learning of it is an iterative process, where at iteration j we have a non-perfect policy, $\pi_j$, and to construct the next policy $\pi_j$, we must interact with the environment while acting based on $\pi_j$.

The system may also be trained through value based learning (learning Q or V functions). Suppose a good approximation can be learned to the optimal value function V*. An optimal policy may be constructed (e.g., by relying on the Bellman equation). Some versions of value based learning can be implemented offline (called "off-policy" training). Some disadvantages of the value-based approach may result from its strong dependence on Markovian assumptions and required approximation of a complicated function (it may be more difficult to approximate the value function than to approximate the policy directly).

Another technique may include model based learning and planning (learning the probability of state transitions and solving the optimization problem of finding the optimal V). Combinations of these techniques may also be used to train the learning system. In this approach, the dynamics of the process may be learned, namely, the function that takes ($s_t$, $a_t$) and yields a distribution over the next state $s_{t+1}$. Once this function is learned, the optimization problem may be solved to find the policy $\pi$ whose value is optimal. This is called "planning". One advantage of this approach may be that the learning part is supervised and can be applied offline by observing triplets ($s_t$, $a_t$, $s_{t+1}$). One disadvantage of this approach, similar to the "imitation" approach, may be that small errors in the learning process can accumulate and to yield inadequately performing policies.

Another approach for training driving policy module 803 may include decomposing the driving policy function into semantically meaningful components. This allows implementation of parts of the policy manually, which may ensure the safety of the policy, and implementation of other parts of the policy using reinforcement learning techniques, which may enable adaptivity to many scenarios, a human-like balance between defensive/aggressive behavior, and a human-like negotiation with other drivers. From the technical perspective, a reinforcement learning approach may combine several methodologies and offer a tractable training procedure, where most of the training can be performed using either recorded data or a self-constructed simulator.

In some embodiments, training of driving policy module 803 may rely upon an "options" mechanism. To illustrate, consider a simple scenario of a driving policy for a two-lane highway. In a direct RL approach, a policy it that maps the state into $A \in \mathbb{R}^2$, where the first component of $\pi(s)$ is the desired acceleration command and the second component of $\pi(s)$ is the yaw rate. In a modified approach, the following policies can be constructed:

Automatic Cruise Control (ACC) policy, $o_{ACC}:S \to A$: this policy always outputs a yaw rate of 0 and only changes the speed so as to implement smooth and accident-free driving.

ACC+Left policy, $o_L:S \to A$: the longitudinal command of this policy is the same as the ACC command. The yaw rate is a straightforward implementation of centering the vehicle toward the middle of the left lane, while ensuring a safe lateral movement (e.g., don't move left if there's a car on the left side).

ACC+Right policy, $o_R:S \to A$: Same as $o_L$, but the vehicle may be centered toward the middle of the right lane.

These policies may be referred to as "options". Relying on these "options", a policy can be learned that selects options, $\pi_o:S \to O$, where O is the set of available options. In one case, $O=\{o_{ACC}, o_L, o_R\}$. The option-selector policy, $\pi_o$, defines an actual policy, $\pi:S \to A$, by setting, for every s, $\pi(s)=o_{\pi_o(s)}(s)$.

In practice, the policy function may be decomposed into an options graph. The options graph can represent a hierarchical set of decisions organized as a Directed Acyclic Graph (DAG). There is a special node called the root node of the graph. This node has no incoming nodes. The decision process traverses through the graph, starting from the root node, until it reaches a "leaf" node, which refers to a node that has no outgoing decision lines. Upon encountering a leaf node, the driving policy may output the acceleration and steering commands associated with a desired navigational action associated with the leaf node.

Internal nodes may result in implementation of a policy that chooses a child among its available options. The set of available children of an internal node include all of the nodes associated with a particular internal node via decision lines.

Flexibility of the decision making system may be gained by enabling nodes to adjust their position in the hierarchy of the options graph. For example, any of the nodes may be allowed to declare themselves as "critical." Each node may implement a function "is critical," that outputs "True" if the node is in a critical section of its policy implementation. For example, a node that is responsible for a takeover, may declare itself as critical while in the middle of a maneuver. This may impose constraints on the set of available children of a node u, which may include all nodes v which are children of node u and for which there exists a path from v to a leaf node that goes through all nodes designated as critical. Such an approach may allow, on one hand, declaration of the desired path on the graph at each time step, while on the other hand, stability of a policy may be preserved, especially while critical portions of the policy are being implemented.

By defining an options graph, the problem of learning the driving policy $\pi:S \to A$ may be decomposed into a problem of defining a policy for each node of the graph, where the policy at internal nodes should choose from among available children nodes. For some of the nodes, the respective policy may be implemented manually (e.g., through if-then type algorithms specifying a set of actions in response to an observed state) while for others the policies may be implemented using a trained system built through reinforcement learning. The choice between manual or trained/learned approaches may depend on safety aspects associated with the task and on its relative simplicity. The option graphs may be constructed in a manner such that some of the nodes are straightforward to implement, while other nodes may rely on trained models. Such an approach can ensure safe operation of the system.

As discussed above, the input to the driving policy is a "sensed state," which summarizes the environment map, for example, as obtained from available sensors. The output of the driving policy is a set of desires (optionally, together with a set of hard constraints) that define a trajectory as a solution of an optimization problem.

As described above, the options graph represents a hierarchical set of decisions organized as a DAG. There is a special node called the "root" of the graph. The root node is the only node that has no incoming edges (e.g., decision lines). The decision process traverses the graph, starting from the root node, until it reaches a "leaf" node, namely, a node that has no outgoing edges. Each internal node should implement a policy that picks a child among its available children. Every leaf node should implement a policy that, based on the entire path from the root to the leaf, defines a set of Desires (e.g., a set of navigational goals for the host vehicle). The set of Desires, together with a set of hard constraints that are defined directly based on the sensed state, establish an optimization problem whose solution is the trajectory for the vehicle. The hard constraints may be employed to further increase the safety of the system, and the Desires can be used to provide driving comfort and human-like driving behavior of the system. The trajectory provided as a solution to the optimization problem, in turn, defines the commands that should be provided to the steering, braking, and/or engine actuators in order to accomplish the trajectory.

Various semantic meanings may be assigned to target vehicles in an environment of the host vehicle. For example, in some embodiments the semantic meaning may include any of the following designations: 1) not relevant: indicating that the sensed vehicle in the scene is currently not relevant; 2) next lane: indicating that the sensed vehicle is in an adjacent lane and an appropriate offset should be maintained relative to this vehicle (the exact offset may be calculated in the optimization problem that constructs the trajectory given the Desires and hard constraints, and can potentially be vehicle dependent—the stay leaf of the options graph sets the target vehicle's semantic type, which defines the Desire relative to the target vehicle); 3) give way: the host vehicle will attempt to give way to the sensed target vehicle by, for example, reducing speed (especially where the host vehicle determines that the target vehicle is likely to cut into the lane of the host vehicle); 4) take way: the host vehicle will attempt to take the right of way by, for example, increasing speed; 5) follow: the host vehicle desires to maintain smooth driving following after this target vehicle; 6) takeover left/ right: this means the host vehicle would like to initiate a lane change to the left or right lane.

Another example of a node is a select gap node. This node may be responsible for selecting a gap between two target vehicles in a particular target lane that host vehicle desires to enter. By choosing a node of the form IDj, for some value of j, the host vehicle arrives at a leaf that designates a Desire for the trajectory optimization problem—e.g., the host vehicle wishes to make a maneuver so as to arrive at the selected gap. Such a maneuver may involve first accelerating/braking in the current lane and then heading to the target lane at an appropriate time to enter the selected gap. If the select gap node cannot find an appropriate gap, it may transition to an abort node, which defines a desire to move back to the center of the current lane and cancel the takeover.

As discussed above, nodes of the options graph may declare themselves as "critical," which may ensure that the selected option passes through the critical nodes. Formally, each node may implement a function IsCritical. After performing a forward pass on the options graph, from the root to a leaf, and solving the optimization problem of the trajectory planner, a backward pass may be performed from the leaf back to the root. Along this backward pass, the IsCritical function of all nodes in the pass may be called, and a list of all critical nodes may be saved. In the forward path corresponding to the next time frame, the driving policy may be required to choose a path from the root node to a leaf that goes through all critical nodes.

For example, in a situation where an overtake action is initiated, and the driving policy arrives at a leaf corresponding to IDk, it would be undesirable to choose, for example, a stay node when the host vehicle is in the middle of the takeover maneuver. To avoid such jumpiness, the IDj node can designate itself as critical. During the maneuver, the success of the trajectory planner can be monitored, and function IsCritical will return a "True" value if the overtake maneuver progresses as intended. This approach may ensure that in the next time frame, the takeover maneuver will be continued (rather than jumping to another, potentially inconsistent maneuver prior to completion of the initially selected maneuver). If, on the other hand, monitoring of the maneuver indicates that the selected maneuver is not progressing as intended, or if the maneuver has become unnecessary or impossible, the function IsCritical can return a "False" value. This can allow the select gap node to select a different gap in the next time frame, or to abort the overtake maneuver altogether. This approach may allow, on one hand, declaration of the desired path on the options graph at each time step, while on the other hand, may help to promote stability of the policy while in critical parts of the execution.

Hard constraints, which will be discussed in more detail below, may be differentiated from navigational desires. For example, hard constraints may ensure safe driving by applying an added layer of filtering of a planned navigational action. The implicated hard constraints, which may be programmed and defined manually, rather than through use of a trained system built upon reinforcement learning, can be determined from the sensed state. In some embodiments, however, the trained system may learn the applicable hard constraints to be applied and followed. Such an approach may promote driving policy module 803 arriving at a selected action that is already in compliance with the applicable hard constraints, which may reduce or eliminate selected actions that may require later modification to comply with applicable hard constraints. Nevertheless, as a redundant safety measure, hard constraints may be applied to the output of the driving policy even where the driving policy has been trained to account for predetermined hard constraints.

There are many examples of potential hard constraints. For example, a hard constraint may be defined in conjunction with a guardrail on an edge of a road. In no situation may the host vehicle be allowed to pass the guardrail. Such a rule induces a hard lateral constraint on the trajectory of the host vehicle. Another example of a hard constraint may include a road bump (e.g., a speed control bump), which may induce a hard constraint on the speed of driving before the bump and while traversing the bump. Hard constraints may be considered safety critical and, therefore, may be defined manually rather than relying solely on a trained system learning the constraints during training.

In contrast to hard constraints, the goal of desires may be to enable or achieve comfortable driving. As discussed above, an example of a desire may include a goal of positioning the host vehicle at a lateral position within a lane that corresponds to the center of the host vehicle lane. Another desire may include the ID of a gap to fit into. Note that there is not a requirement for the host vehicle to be exactly in the center of the lane, but instead a desire to be as close as possible to it may ensure that the host vehicle tends to migrate to the center of the lane even in the event of deviations from the center of the lane. Desires may not be safety critical. In some embodiments, desires may require negotiation with other drivers and pedestrians. One approach for constructing the desires may rely on the options graph, and the policy implemented in at least some nodes of the graph may be based on reinforcement learning.

For the nodes of an options graph implemented as nodes trained based on learning, the training process may include decomposing the problem into a supervised learning phase and a reinforcement learning phase. In the supervised learning phase, a differentiable mapping from $(s_t, a_t)$ to $\hat{s}_{t+1}$ can be learned such that $\hat{s}_{t+1} \approx s_{t+1}$. This may be similar to "model-based" reinforcement learning. However, in the forward loop of the network, $\hat{s}_{t+1}$ may be replaced by the actual value of $s_{t+1}$, therefore eliminating the problem of error accumulation. The role of prediction of $\hat{s}_{t+1}$ is to propagate messages from the future back to past actions. In this sense, the algorithm may be a combination of "model-based" reinforcement learning with "policy-based learning."

An important element that may be provided in some scenarios is a differentiable path from future losses/rewards back to decisions on actions. With the option graph structure, the implementation of options that involve safety constraints are usually not differentiable. To overcome this issue, the choice of a child in a learned policy node may be stochastic. That is, a node may output a probability vector, p, that assigns probabilities used in choosing each of the children of the particular node. Suppose that a node has k children and let $a^{(1)}, \ldots, a^{(k)}$ be the actions of the path from each child to a leaf. The resulting predicted action is therefore $$\hat{a} = \sum_{i=1}^{k} p_i a^{(i)},$$

which may result in a differentiable path from the action to p. In practice, an action a may be chosen to be $a^{(i)}$ for $i \sim p$, and the difference between a and a may be referred to as additive noise.

For the training of $\hat{s}_{t+1}$ given $s_t, a_t$, supervised learning may be used together with real data. For training the policy of nodes simulators can be used. Later, fine tuning of a policy can be accomplished using real data. Two concepts may make the simulation more realistic. First, using imitation, an initial policy can be constructed using the "behavior cloning" paradigm, using large real world data sets. In some cases, the resulting agents may be suitable. In other cases, the resulting agents at least form very good initial policies for the other agents on the roads. Second, using self-play, our own policy may be used to augment the training. For example, given an initial implementation of the other agents (cars/pedestrians) that may be experienced, a policy may be trained based on a simulator. Some of the other agents may be replaced with the new policy, and the process may be repeated. As a result, the policy can continue to improve as it should respond to a larger variety of other agents that have differing levels of sophistication.

Further, in some embodiments, the system may implement a multi-agent approach. For example, the system may take into account data from various sources and/or images capturing from multiple angles. Further, some disclosed embodiments may provide economy of energy, as anticipation of an event which does not directly involve the host vehicle, but which may have an effect on the host vehicle can be considered, or even anticipation of an event that may lead to unpredictable circumstances involving other vehicles may be a consideration (e.g., radar may "see through" the leading vehicle and anticipation of an unavoidable, or even a high likelihood of an event that will affect the host vehicle).

Global Accuracy and Local Accuracy

In the context of autonomous driving, a loss function may be defined in order to adequately define (and therefore impose conditions on) that accuracy of measurements from camera, sensors, or the like. Accordingly, a scene may defined as a finite set S of objects (such as vehicles, pedestrians, lane marks, or the like). S contains the host vehicle, which may be denoted as h. In this context, a positioning may comprise a mapping $p: S \rightarrow \mathbb{R}^3$, where $p(h) = 0 = (0, 0, 0)$. Accordingly, the first coordinate of $p(a)$ may comprise a lateral position of object a, the second coordinate may comprise a longitudinal position of object a, and the last coordinate may comprise a height of object a.

A loss function may therefore be defined between two positionings p and $\hat{p}$ with respect to two objects a and b in set S. The loss function may be defined as $$l_{additive}(a,b;p,\hat{p}) \stackrel{def}{=} \|(p(a)-p(b))-(\hat{p}(a)-\hat{p}(b))\|.$$

Imposing constraints on the loss function is generally not realistic. for example, if object a is a vehicle at a positioning $p(a) = (a, z, 0)$ and object b is lane mark at a positioning $p(b) = (-a, z, 0)$, then second positionings of a and b at $\hat{p}(a) = p(a) + (\beta p(a)/\|p(a)\|)$ and $\hat{p}(b) = p(b)$, respectively, will result in a loss of $\beta$. Accordingly, if the objects a and b are at a longitudinal position of 150 meters, and the loss $\beta$ is 0.2 (that is, 20%), then it is impossible to impose an absolute loss constraint of 20 centimeters since this would render most losses unacceptable.

Accordingly, a relative loss function may be defined as follows:

$$\ell_{relative}(a, b; p, \hat{p}) \stackrel{def}{=} \frac{\|(p(a) - p(b)) - (\hat{p}(a) - \hat{p}(b))\|}{\|p(a) - p(b)\| + v},$$

where v is (0, 1].

By normalizing the loss function, realistic loss constraints may be imposed that account for greater losses for farther objects. However, there are two ways to define accuracy using the normalized loss function. One is ego accuracy and is measured with respect to host vehicle h:

$$l_{relative}(a,h;p,\hat{p}) \leq \epsilon,$$

where $\epsilon$ is the loss constraint.

This requirement, however, depends on the range z of objects detected in a field of view of the vehicle because, if $p(h) = \hat{p}(h) = 0$, $p(a) = (a, z, 0)$, and $\hat{p}(a) = p(a) + (\beta p(a)/\|p(a)\|)$ $$\ell_{relative}(a, h; p, \hat{p}) = \frac{\beta}{\sqrt{z^2 + \alpha^2} + v} \leq \frac{\beta}{z}.$$

To avoid dependence on the range z, another definition of accuracy that is pairwise may be used:

$$l_{relative}(a,b;p,\hat{p}) \leq \epsilon,$$

where $\epsilon$ is the loss constraint.

For $p(a) = (a, z, 0)$, $p(b) = (-a, z, 0)$, $\hat{p}(a) = p(a) + (\beta p(a)/\|p(a)\|)$, and $\hat{p}(b) = p(b)$, pairwise accuracy simplifies to:

$$\ell_{relative}(a, b; p, \hat{p}) = \frac{\beta}{2\alpha + v} = \frac{\beta}{1 + v}.$$

Therefore, $$\frac{\beta}{2} < \ell_{relative}(a, b; p, \hat{p}) < \beta,$$

which is independent of z.

Furthermore, there are situations having ego accuracy without pairwise accuracy. In particular, if $l_{relative}(a,h;p,\hat{p}) < \epsilon$, then $$\ell_{relative}(a, h; p, \hat{p}) \le \frac{\beta}{z}$$

such mat $\beta = \epsilon z$. Accordingly, $$\frac{\epsilon z}{2} < \ell_{relative}(a, h; p, \hat{p}) < \epsilon z,$$

meaning that z>2 results in a loss of pairwise-accuracy.

In one particular example, if $\epsilon$=0.2 and z=100 meters, then $\beta$=2 meters, which is a reasonable loss constraint of 2 meters per 100 meters. However, this results in $l_{relative}$ (a, b; p,$\hat{p}$)<1, which means that this situation is 50-fold away from 0.02-pairwise accuracy. To obtain pairwise accuracy, one could set z=1 meter and $\beta$=0.02, resulting in a 2 centimeter error at a range of 100 meters. However, this is unrealistic given most extant sensors. On the other hand, pairwise accuracy may be enforced realistically without regards to ego-accuracy. To enforce this accuracy, a reference coordinate frame may be used in which relevant objects (such as vehicles, pedestrians, lanes, or the like) of the scene reside simultaneously. This, however, may involve use of a camera rather than a lidar, GPS, or other sensor.

Accordingly, in some embodiments, a host vehicle navigation system may use the 2-D coordinate system of the camera rather than the 3-D coordinate system of the vehicle. The system may then convert a map (e.g., landmarks and splines of a sparse map) onto the 2-D coordinate system and perform navigation in the 2-D coordinate system. Moreover, the system may perform navigation in the 3-D coordinate system by converting determinations made in the 2-D coordinate system to the 3-D coordinate system. This enforces pairwise accuracy rather than ego accuracy, which provides greater safety and reliability. Moreover, this technique increases the efficiency of the system because converting maps to 2-D is faster than converting images to 3-D and because performing prediction and navigation in 2-D is faster than doing so in 3-D.

In one example embodiment, a navigation system may determine a location of the host vehicle. For example, the location may be within a geographic area. The navigation system may further access a map including the geographic area. For example, the navigation system may access a stored map or access a map from one or more remote servers that includes the geographic area. In some embodiments, the map may include a sparse map or a roadbook (described below) or a portion thereof based on the geographic area. As explained above, the sparse map may include at least one spline representing a predetermined path of travel and/or at least one landmark. Accordingly, the at least one feature may include the at least one landmark.

The navigation system may, based on the location of the host vehicle, extract at least one feature from the map. For example, the navigation system may determine a field of view of the host vehicle and extract at least one feature expected to be in the field of view based on the location. In some embodiments, at least one feature may include a lane marking, a road edge, or other landmark included in the map. For example, the road edge may include at least one of a lane marking, a curb, a guardrail, or a Jersey wall.

The navigation system may receive, from at least one image sensor, at least one image representative of an environment of the host vehicle and convert coordinates of the at least one feature from a coordinate system of the map to a coordinate system of the at least one image sensor. For example, the coordinate system of the map may comprise a three-dimensional coordinate system (e.g., a global coordinate system based on GPS, a coordinate system local to a road segment included in the geographic area, or the like), and the coordinate system of the at least one image sensor may comprise a two-dimensional coordinate system based on a field of view of the at least one image sensor. In some embodiments, the at least one feature may be transformed from the three-dimensional coordinate system of the map to a three-dimensional coordinate system centered on the host vehicle (e.g., using the location) and then projected onto the two-dimensional plane of the at least one image sensor (e.g., using a known relation between the host vehicle and the field of view).

The navigation system may analyze the at least one image to identify the at least one feature in the environment of the host vehicle and cause at least one navigational change to the host vehicle based on a comparison between the converted coordinates and coordinates of the identified at least one feature in the at least one image. For example, the navigation system may determine an expected location of the at least one feature in the two-dimensional coordinate system of the at least one image sensor based on the converted coordinates and search one or more images from the at least one image sensor at and/or near the expected location. Nearness may be determined absolutely, e.g., within 10 pixels, within 20 pixels, or the like of the expected location, or relatively, e.g., within 10% of an expected dimension, such as length or width, of the at least one feature, or the like.

In some embodiments, the at least one of navigational change may include slowing the host vehicle, accelerating the host vehicle, or activating a steering mechanism of the host vehicle. For example, the host vehicle may slow, accelerate, and/or steer based on a difference between an identified location of the at least one feature in the at least one image and the expected location based on the converted coordinates.

In some embodiments, the at least one navigational change may be determined within the coordinate system of the at least one image sensor. For example, a vector may be determined based on the difference between the identified location of the at least one feature in the at least one image and the expected location based on the converted coordinates. The vector may represent the at least one navigational change such that the at least one feature will appear where expected. In such embodiments, the navigation system may convert the at least one navigational change to the coordinate system of the map. For example, the navigation system may project the difference vector into a three-dimensional coordinate system (e.g., a global coordinate system or a coordinate system centered on the host vehicle) based on a depth of the at least one feature in the at least one image and/or an expected depth of the at least one feature from the map.

Fusion with Comfort and Safety Constraints

In some embodiments, a host vehicle may receive data from multiple sources, such as map data coupled with cameras, lidar, radar, and so on. A navigation system of the host vehicle may use different schemes to fuse data from these various sources. For example, in a unification scheme, the navigation system may verify a target object (i.e., confirm that a potential object should in fact be treated as a detected object) if detected by at least one source, which is a fast but low accuracy technique for detection. In an intersection scheme, the navigation system may approve a target object if detected by multiple sources, and in a synergy scheme, the navigation system may approve a target object if detected using a combination of data from multiple sources. The intersection and synergy schemes are slower but more accurate than the unification scheme. Accordingly, by selectively using the intersection and synergy schemes as well as the unification scheme, accuracy of the system's reaction may be optimized without sacrificing safety. This solves a technical problem of how to interpret sensor data from an autonomous vehicle accurately without sacrificing safety.

Figure 12:
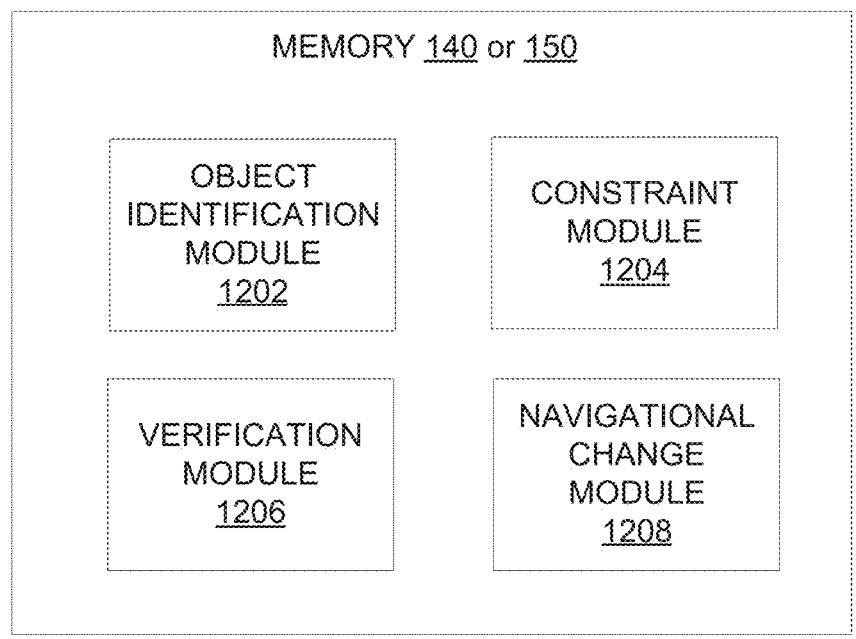
FIG. 12 is an exemplary block diagram of a memory configured to store instructions for performing one or more operations consistent with the disclosed embodiments.

FIG. 12 is an exemplary functional block diagram of memory 140 and/or 150, which may be stored/programmed with instructions for performing one or more operations consistent with the disclosed embodiments. Although the following refers to memory 140, one of skill in the art will recognize that instructions may be stored in memory 140 and/or 150.

As shown in FIG. 12, memory 140 may store an object identification module 1202, a constraint module 1204, a verification module 1206, and a navigational change module 1208. The disclosed embodiments are not limited to any particular configuration of memory 140. Further, applications processor 180 and/or image processor 190 may execute the instructions stored in any of modules 1202, 1204, 1206, and 1208 included in memory 140. One of skill in the art will understand that references in the following discussions to processing unit 110 may refer to applications processor 180 and image processor 190 individually or collectively. Accordingly, steps of any of the following processes may be performed by one or more processing devices.

In one embodiment, object identification module 1202 may store instructions (such as computer vision software) which, when executed by processing unit 110, receives a first output from a first data source associated with the host vehicle and a second output from a second data source associated with the host vehicle. At least one of the first data source and the second data source comprise a sensor onboard the host vehicle. For example, object identification module 1202 may receive a first output from a first sensor onboard the host vehicle and a second output from a second sensor onboard the host vehicle. Accordingly, the first data source may comprise at least one of a camera, a lidar, or a radar onboard the host vehicle, and the second data source may comprise at least one of a camera, a lidar, or a radar onboard the host vehicle distinct from the first data source.

Alternatively, object identification module 1202 may receive a first output from a first sensor onboard the host vehicle and a second output from a map accessed by processing unit 110. Accordingly, first data source may comprise at least one of a camera, a lidar, or a radar onboard the host vehicle, and the second data source may comprise the map data.

In one embodiment, object identification module 1202 may store instructions (such as computer vision software) which, when executed by processing unit 110, identifies a representation of a target object in the first output. For example, object identification module 1202 may execute all or a portion of process 500B, described above, in order to identify the representation of the target object.

In one example, object identification module 1202 may determine a set of candidate objects representing the target object (e.g., a vehicle, a pedestrian, a stationary object, a lane marking, or the like) by scanning the first output, comparing the first output to one or more predetermined patterns, and identifying within the first output possible locations that may contain objects of interest (e.g., vehicles, pedestrians, stationary objects, lane markings, or the like). The predetermined patterns may match the type of output from the first sensor. For example, if the first sensor is a camera, the predetermined patterns may be visual while if the first sensor is a microphone, the predetermined patterns may be aural. In some embodiments, the predetermined patterns may be configured to achieve a high rate of "false hits" and a low rate of "misses." For example, object identification module 1202 may use a low threshold of similarity to predetermined patterns for identifying candidate objects as possible target objects in order to reduce the probability of missing (e.g., not identifying) a candidate object representing a target object.

Object identification module 1202 may further filter the set of candidate objects to exclude certain candidates (e.g., irrelevant or less relevant objects) based on classification criteria. Such criteria may be derived from various properties associated with object types stored in a database, e.g., a database stored in memory 140 (not shown) and/or accessed from one or more remote servers. Properties may include object shape, dimensions, texture, position (e.g., relative to the host vehicle), speed (e.g., relative to the host vehicle), and the like. Thus, object identification module 1202 may use one or more sets of criteria to reject false candidates from the set of candidate objects.

In embodiments where the first output comprises multiple frames over time, object identification module 1202 may also analyze multiple frames of the first output to determine whether objects in the set of candidate objects represent target objects. For example, object identification module 1202 may track a detected candidate object across consecutive frames and accumulate frame-by-frame data associated with the detected object (e.g., size, position relative to the host vehicle, speed relative to the host vehicle, etc.). Additionally or alternatively, object identification module 1202 may estimate parameters for the detected object and compare the object's frame-by-frame position data to a predicted position. The use of "frames" does not imply that the first output must be images, although it may be. As used herein, "frames" refers to any discretized sequence of measurements across time received from the first sensor, the second sensor, or any additional sensors.

Object identification module 1202 may further construct a set of measurements for the detected objects. Such measurements may include, for example, position, velocity, and acceleration values (e.g., relative to the host vehicle) associated with the detected objects. In some embodiments, target object module 2004 may construct the measurements based on estimation techniques using a series of time-based observations such as Kalman filters or linear quadratic estimation (LQE), and/or based on available modeling data for different object types (e.g., cars, trucks, pedestrians, bicycles, road signs, etc.). The Kalman filters may be based on a measurement of an object's scale, where the scale measurement is proportional to a time to collision (e.g., the amount of time for the host vehicle to reach the object).

In embodiments where the first output comprises multiple frames over time, object identification module 1202 may perform an optical flow analysis of one or more images to reduce the probabilities of detecting a "false hit" and missing a candidate object that represents a vehicle or pedestrian. The optical flow analysis may refer to, for example, analyzing motion patterns relative to vehicle 200 in the one or more images associated with other vehicles and pedestrians, and that are distinct from road surface motion. Processing unit 110 may calculate the motion of candidate objects by observing the different positions of the objects across multiple image frames, which are captured at different times. Processing unit 110 may use the position and time values as inputs into mathematical models for calculating the motion of the candidate objects. Thus, optical flow analysis may provide another method of detecting vehicles and pedestrians that are nearby vehicle 200. Processing unit 110 may perform optical flow analysis in combination with steps 540-546 to provide redundancy for detecting vehicles and pedestrians and increase the reliability of system 100.

Additionally or alternatively, object identification module 1202 may execute all or a portion of process 500C described above, in order to identify the representation of the target object. In embodiments where object identification module 1202 is implemented as an additional layer of processing for selected actions of a trained system, object identification module 1202 may receive an identification of the target object from the trained system. Accordingly, object identification module 1202 may scan the first output, compare the first output to patterns matching the target object received from the trained system, and identify within the first output the location of the target object. For example, object identification module 1202 may receive an identification of another vehicle from the trained network, extract the patterns stored in a database, e.g., a database stored in memory 140 (not shown) and/or accessed from one or more remote servers, and indexed as patterns of vehicles as well as matching the type of the first output (e.g., visual, aural, thermal, or the like), and identify within the first output a location of the other vehicle by comparing the first output to the extracted patterns.

Alternatively, in embodiments where object identification module 1202 is implemented as an additional layer of processing for selected actions of a trained system, object identification module 1202 may receive an identification of the target object from the trained system as well as a location of the target object. If the received location is in the first output, object identification module 1202 may perform classification (e.g., using the comparison described above) at and/or near the received location to identify the target object in the first output. If the received location is in another output (e.g., from another sensor), object identification module 1202 may extract patterns stored in a database, e.g., a database (not shown) stored in memory 140 and/or accessed from one or more remote servers, and indexed as patterns of types of objects matching the target object (e.g., vehicle, pedestrians, stationary objects, or the like) as well as matching the type of the first output (e.g., visual, aural, thermal, or the like), and identify within the first output a location of the target object by comparing the first output to the extracted patterns. Additionally, or alternatively to this comparison, object identification module 1202 may construct an atlas including information mapping locations on the output used by the trained system to locations on the first output. Based thereon, object identification module 1202 may determine a location in the first output where a representation of the target object would be expected based on its location in the output used by the trained system and perform classification (e.g., using the comparison described above) to identify within the first output a location of the target object.

In one embodiment, navigational constraint module 1204 may store software executable by processing unit 110 to determine whether a characteristic of the target object triggers at least one navigational constraint. Characteristics of target objects may trigger hard (safety) constraints or soft (comfort) constraints. For example, a distance of the target object may trigger a hard constraint based on a minimum distance or a maximum distance (e.g., to other vehicles, to pedestrians, to road edges, to lane markings, or the like) and/or a soft constraint based on a preferred distance. In another example, a size of the target object may trigger a hard constraint based on a minimum size or a maximum size (e.g., a height of an obstacle, a height of a clearance, or the like) and/or a soft constraint based on a preferred size. In yet another example, a location of the target object may trigger a hard constraint based on restricted zone (e.g., within a current lane of travel of the host vehicle, within a particular threshold distance of a projected trajectory of the host vehicle, or the like) and/or a soft constraint based on a preferred zone (e.g., on a lane or sidewalk neighboring the current lane of travel, within a range of the projected trajectory, or the like).

In one embodiment, if the at least one navigational constraint is not triggered by the characteristic of the target object, verification module 1206 may verify the identification of the representation of the target object based on a combination of the first output and the second output. For example, the combination may comprise an intersection scheme or a synergy scheme. An intersection scheme may comprise a requirement that the target object be identified in both the first output and the second output for verification. For example, the target object may need to be identified in a radar, lidar, or camera comprising the first data source and a radar, lidar, or camera comprising the second data source in order to be verified. That is, the target object may be considered to be approved if detected by multiple data sources. A synergy scheme may comprise a combination of the first data source and the second data source in order to verify the target object. For example, a synergy scheme may involve identifying or approving a target object based on combining partial data obtained from a plurality of data sources. One example of a synergy scheme may include camera estimation of a range of the target object, the range being measured from a road elevation model (e.g., based on another camera) or from lidar. Another example may include detection of the target object with a lidar and measurement of the target object using a road elevation model based on optical flow from one or more cameras. Yet another example may include lane detection (e.g., the target object comprising a road edge or a lane marking) using a camera and then confirming the detection using map data. Yet another example may include detection of the target object using one or more cameras and the use of lidar to determine free space in the environment of the host vehicle.

On the other hand, if the at least one navigational constraint is triggered by the characteristic of the target object, verification module 1206 may verify the identification of the representation of the target object based on the first output. For example, a unification scheme may be used such that only the first output is used to approve or verify the target object.

Navigational change module 1208 may use the output of object identification module 1202 and/or verification module 1206 to implement a decision tree for navigational adjustments. The navigational adjustments may be based on data derived from the first sensor, the second sensor, any other sensors, map data, and one or more objects detected from the first output, the second output, and any other output. Navigational change module 1208 may also determine a desired navigational response based on input from other systems of vehicle 200, such as throttling system 220, braking system 230, and steering system 240 of vehicle 200. Additionally or alternatively, navigational change module 1208 may receive one or more navigational adjustments from other memory modules (not shown) and/or from a trained system, as discussed above. Accordingly, navigational change module 1208 may be implemented as an additional layer of processing for selected actions of a trained system.

Accordingly, navigational change module 1208 may, in response to the verification, cause at least one navigational change to the host vehicle. In order to cause the at least one navigational change, navigational change module 1208 may transmit electronic signals to throttling system 220, braking system 230, and steering system 240 of vehicle 200 to trigger a desired navigational response by, for example, turning the steering wheel of vehicle 200 to achieve a rotation of a predetermined angle. In some embodiments, the at least one navigational change may comprise foregoing any adjustments to the one or more navigational actuators of the host vehicle in response to the verification.

Furthermore, any of the modules (e.g., modules 1204, 1204, 1206, and 1208) disclosed herein may implement techniques associated with a trained system (such as a neural network or a deep neural network) or an untrained system. Additionally or alternatively, any of the modules (e.g., modules 1204, 1204, 1206, and 1208) disclosed herein may implement techniques as an additional layer of processing for selected actions of a trained system.

Figure 13A:
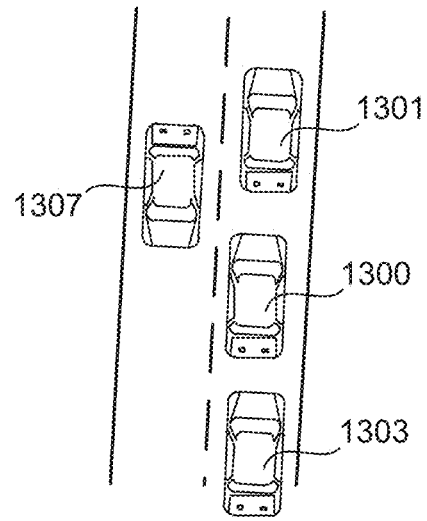
FIGS. 13A and 13B provide diagrammatic depictions of example safety and comfort constraints consistent with the disclosed embodiments.
Figure 13B:
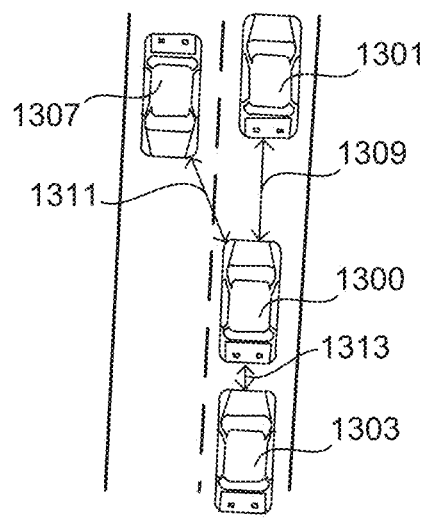

FIGS. 13A and 13B provide diagrammatic depictions of example safety and comfort constraints. As depicted in FIG. 13A, host vehicle 1300 may detect other vehicles ahead of host vehicle 1300 (such as vehicle 1301), other vehicles behind host vehicle 1300 (such as vehicle 1303), and other vehicles in lanes other than that in which host vehicle 1300 is traveling (such as vehicle 1307) as target objects.

Characteristics of such detected objects may trigger navigational constraints. For example, the distance 1309 between host vehicle 1300 and other vehicle 1301, the distance 1311 between host vehicle 1300 and other vehicle 1307, and/or the distance 1313 between host vehicle 1300 and other vehicle 1303 may trigger navigational constraints. Although not depicted in FIGS. 13A and 13B, other characteristics associated with one or more of vehicles 1301, 1303, and 1305 may include relative speeds between host vehicle 1300 and one or more of vehicles 1301, 1303, and 1305, times-of-collision with one or more of vehicles 1301, 1303, and 1305, or the like.

In the examples described above, the triggered navigational constraint may be associated with a distance to one or more of vehicles 1301, 1303, and 1305 (such as a minimum distance), a relative speed between host vehicle 1300 and one or more of vehicles 1301, 1303, and 1305 (such as a maximum relative speed, e.g., near zero), a time-of-collision with one or more of vehicles 1301, 1303, and 1305 (such as a minimum time-of-collision, e.g., near infinity), or the like. Accordingly, the characteristics may trigger a hard (or safety) constraint. Alternatively, the characteristics may not trigger a navigational constraint. For example, one or more soft constraints (or "desires") may be associated with the characteristics.

Figure 13C:
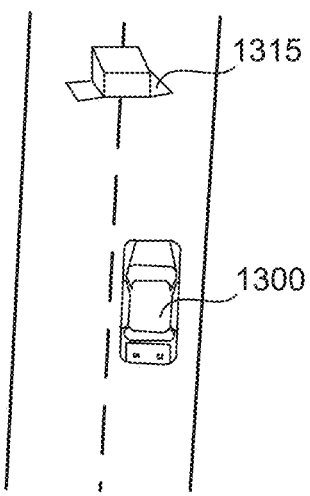
FIGS. 13C and 13D provides diagrammatic depictions of further example safety and comfort constraints consistent with the disclosed embodiments.
Figure 13D:
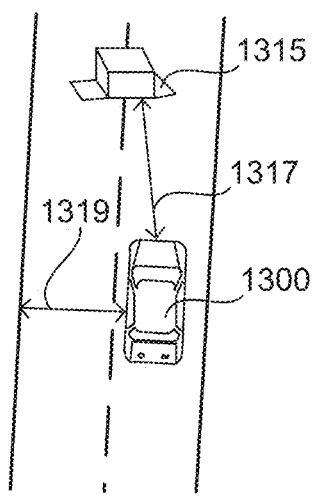

FIGS. 13C and 13D provides diagrammatic depictions of further example safety and comfort constraints consistent with the disclosed embodiments. As depicted in FIGS. 13C and 13D, host vehicle 1300 may detect a stationary object 1315 on the roadway on which host vehicle 1300 is traversing as a target object. Additionally or alternatively, host vehicle 1300 may detect a lane marking as a target object.

In the example of FIGS. 13C and 13D, the distance 1317 between host vehicle 1300 and stationary object 1315 may be a characteristic triggering a navigational constraint. Additionally or alternatively, the distance 1319 between host vehicle 1300 and the lane marking may be a characteristic triggering a navigational constraint. Although not depicted in FIGS. 13C and 13D, other characteristics associated with stationary object 1315 or the lane marking may include a relative speed between host vehicle 1300 and stationary object 1315 or the lane marking, a time-of-collision with stationary object 1315 or the lane marking, or the like.

In the examples above, a navigational constraint may be associated with a distance to stationary object 1315 or the lane marking (such as a minimum distance), a relative speed between host vehicle 1300 and stationary object 1315 or the lane marking (such as a maximum relative speed, e.g., near zero), a time-of-collision with stationary object 1315 or the lane marking (such as a minimum time-of-collision, e.g., near infinity), or the like. Accordingly, the characteristics may trigger a hard (or safety) constraint. Alternatively, the characteristics may not trigger a navigational constraint. For example, one or more soft constraints (or "desires") may be associated with the characteristics.

Figure 14:
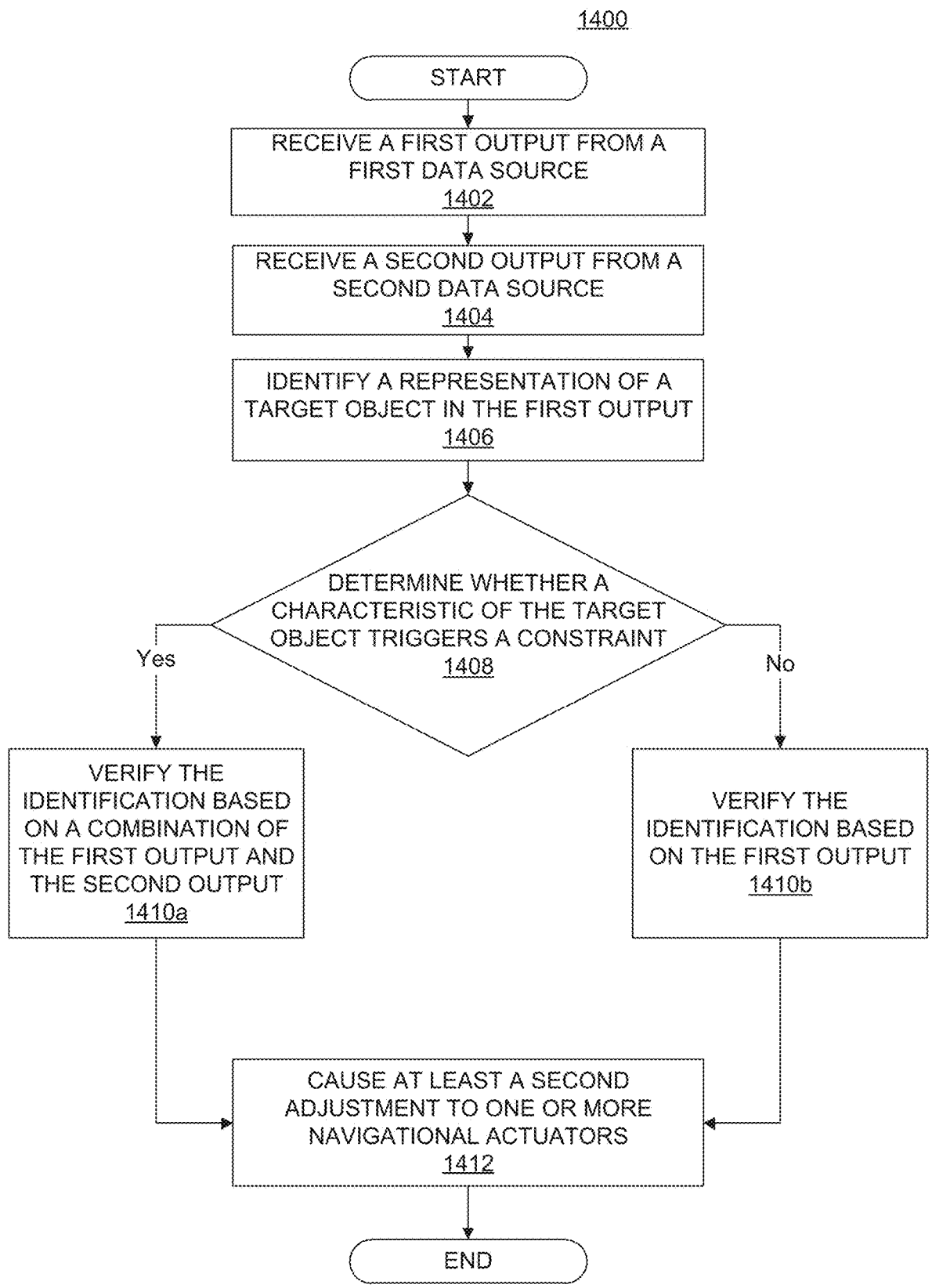
FIG. 14 is a flowchart showing an exemplary process for navigating a host vehicle based on safety and comfort constraints consistent with the disclosed embodiments.

FIG. 14 provides a flowchart representing an example process 1400 for navigating a host vehicle based on safety and comfort constraints consistent with the disclosed embodiments. Process 1400 may be performed by at least one processing device, such as processing device 110.

At step 1402, processing device 110 may receive a first output from a first data source associated with the host vehicle. For example, as explained above with respect to object identification module 1202, the first data source may comprise at least one of a camera, a lidar, or a radar onboard the host vehicle.

At step 1404, processing device 110 may receive a second output from a second data source associated with the host vehicle. For example, as explained above with respect to object identification module 1202, the second data source may comprise map data accessed by the at least one processing device.

In some embodiments, then, at least one of the first data source and the second data source comprise a sensor onboard the host vehicle. In some embodiments, both the first data source and the second data source may comprise sensors. For example, the first data source and the second data source may comprise different cameras, the first data source may comprise a camera and the second data source may comprise a radar, the first data source may comprise a camera and the second data source may comprise a lidar, or the like. In other embodiments, the other of the first data source and the second data source may comprise another data source, such as map data.

At step 1406, processing device 110 may identify a representation of a target object in the first output. For example, processing device 110 may identify the target object as described above with respect to object identification module 1202.

At step 1408, processing device 110 may determine whether a characteristic of the target object triggers at least one navigational constraint. For example, as explained above with respect to navigational constraint module 1204, the characteristic may include a size of the target object, a distance from the host vehicle to the target object, or a location of the target object in an environment of the host vehicle.

At step 1410*a*, as explained above with respect to verification module 1206, if the at least one navigational constraint is not triggered by the characteristic of the target object, processing device 110 may verify the identification of the representation of the target object based on a combination of the first output and the second output.

In some embodiments, verifying the identification of the representation of the target object based on the combination of the first output and the second output may comprise determining whether a representation of the target object is identified in both the first output and the second output. For example, as explained above with respect to verification module 1206, the combination may comprise an intersection scheme.

Additionally or alternatively, verifying the identification of the representation of the target object based on the combination of the first output and the second output may comprise determining the characteristic of the target object using the second output projected onto the first output. For example, as explained above with respect to verification module 1206, the combination may comprise a synergy scheme. In one example, if the second output comprises map data, and the first output comprises at least one image of an environment of the host vehicle, the projection may comprise detecting one or more road edges in the at least one image using the map data. In another example, if the second output comprises output from a lidar, and the first output comprises at least one image of an environment of the host vehicle, the projection may comprise detecting free space in the at least one image using the second output.

At step 1410*b*, as explained above with respect to verification module 1206, if the at least one navigational constraint is triggered by the characteristic of the target object, processing device 110 may verify the identification of the representation of the target object based on the first output.

At step 1412, in response to the verification, processing device 110 may cause at least one navigational change to the host vehicle. For example, as explained above with respect to navigational change module 1208, the at least one navigational change may include slowing the host vehicle, accelerating the host vehicle, or activating a steering mechanism of the host vehicle.

Method 1400 may further include additional steps. For example, method 1400 may include determining the at least one navigational change based on whether the at least one navigational constraint is triggered. For example, as explained above with respect to navigational change module 1208, the at least navigational change may comprise a first change if the at least one navigational constraint is triggered but a second, different change if the at least one navigational constraint is not triggered. In such embodiments, the second change may comprise a narrower angle of adjusting to a steering mechanism, a lighter application of a braking mechanism, a lighter acceleration, or the like than the first change.

Batch Alignment for Navigation

As explained above, a remote server may crowdsource a sparse map from a plurality of vehicles. However, globally aligning of a plurality of drives results in error accumulation in the sparse map. For example, ego motion drift in the drives may deform the geometry of the road and may be exaggerated during global aggregation. Moreover, using GPS data to perform global alignment is often inaccurate due to errors in GPS measurement.

Accordingly, rather than align the drives globally to develop a sparse map, the remote server(s) may align a batch of drives locally to develop a roadbook. As used herein, the term "roadbook" may refer to a sparse map (explained above) or other representation of location data (e.g., stored as one or more splines) and/or landmark data (e.g., stored as locations of the landmarks and/or descriptive data related to an appearance, identification, or the like of the landmarks) stored in coordinates local to a road segment rather than global coordinates. Alignment of such data may result in more reliable alignment and smaller, more localized maps. Moreover, local roadbooks may be extrapolated to global coordinates with greater accuracy than if the drives are aligned within global coordinates without antecedent local alignment. For example, ego drift may be accounted for during local alignment and, thus, will not propagate if the local roadbook is extrapolated to global coordinates. Moreover, local alignment may be performed using visual clues such as lane markings, which may be more accurately positioned, than with GPS data, which includes inherent errors and drift.

Additionally, global alignment may fail to account for moving shadows, different lighting, shininess due to rain, and other changes in the images and data from the plurality of drives due to the different times and days during which the drivers were performed. Accordingly, batch alignment of drives taken on the same days, during similar times, and/or during similar weather conditions further improves the accuracy of the roadbooks.

Figure 15:
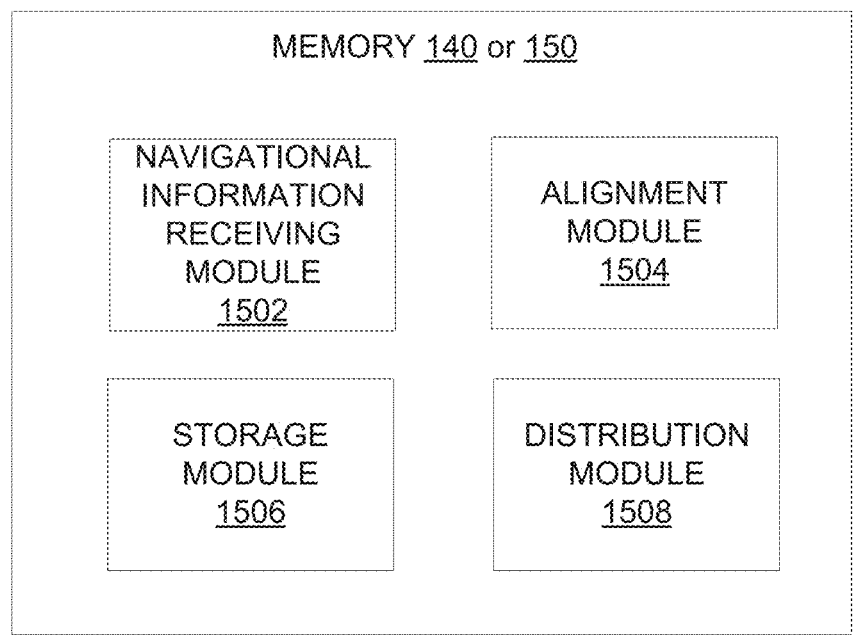
FIG. 15 is an exemplary block diagram of a memory configured to store instructions for performing one or more operations consistent with the disclosed embodiments.

FIG. 15 is an exemplary functional block diagram of memory 140 and/or 150, which may be stored/programmed with instructions for performing one or more operations consistent with the disclosed embodiments. Although the following refers to memory 140, one of skill in the art will recognize that instructions may be stored in memory 140 and/or 150.

As shown in FIG. 15, memory 140 may store a navigational information receiving module 1502, an alignment module 1504, a storage module 1506, and a distribution module 1508. The disclosed embodiments are not limited to any particular configuration of memory 140. Further, applications processor 180 and/or image processor 190 may execute the instructions stored in any of modules 1502, 1504, 1506, and 1508 included in memory 140. One of skill in the art will understand that references in the following discussions to processing unit 110 may refer to applications processor 180 and image processor 190 individually or collectively. Alternatively at least one processing device of a server remote from a host vehicle may execute the instructions stored in any of modules 1502, 1504, 1506, and 1508 included in memory 140. Accordingly, steps of any of the following processes may be performed by one or more processing devices.

In one embodiment, navigational information receiving module 1502 may store instructions (such as computer vision software) which, when executed by processing unit 110, receives navigation information from a plurality of vehicles. For example, the navigation information from the plurality of vehicles may be associated with a common road segment. The navigation information may be received over one or more computer networks. For example, the plurality of vehicles may upload the information during the drives or the plurality of vehicles may upload the information after completing the drives, e.g., during an hourly, daily, weekly, or the like upload session.

In some embodiments, the navigation information may include one or more images captured by one or more image sensors of the vehicles during the drives. Additionally or alternatively, the navigation information may include processed information from the images, such as locations of and/or descriptive information about one or more landmarks identified in the images. The navigation information may additionally or alternatively include location information of the vehicles, such as GPS data or the like.

In one embodiment, alignment module 1504 may store instructions (such as computer vision software) which, when executed by processing unit 110, aligns the navigation information within a coordinate system local to the common road segment. For example, the navigation information may be aligned using landmarks identified in images from the image sensors of the vehicles. In a simple scheme, the alignment may comprise averaging of the locations of the landmarks detected in the images. In more complicated schemes, the alignment may comprise linear regression or other statistical techniques to converge the locations of the landmarks detected in the images. By using the images, alignment module 1504 may align the navigation information in a local coordinate system rather than a global coordinate system, e.g., based on GPS data. Indeed, alignment module 1504 may adjust GPS data included in the navigation information based on alignment of the landmarks rather than adjusting the landmarks based on alignment of the GPS data.

In one embodiment, storage module 1506 may store instructions (such as computer vision software) which, when executed by processing unit 110, stores the aligned navigational information in association with the common road segment. For example, the navigation information may be stored in a database such that an identifier of the common road segment is stored with and used to index the aligned navigational information. The identifier of the common road segment may comprise one or more coordinates (e.g., global coordinates of a starting point of the common road segment and/or of an ending point of the common road segment) used to delineate the common road segment.

In one embodiment, distribution module 1508 may store instructions (such as computer vision software) which, when executed by processing unit 110, distributes the aligned navigational information to one or more autonomous vehicles for use in autonomously navigating the one or more autonomous vehicles along the common road segment. For example, the one or more vehicles may request navigational information when the vehicles are approaching or otherwise anticipating traversing the common road segment. Distribution module 1508 may transmit the aligned navigational information to the requesting vehicle over one or more computer networks.

Figure 16:
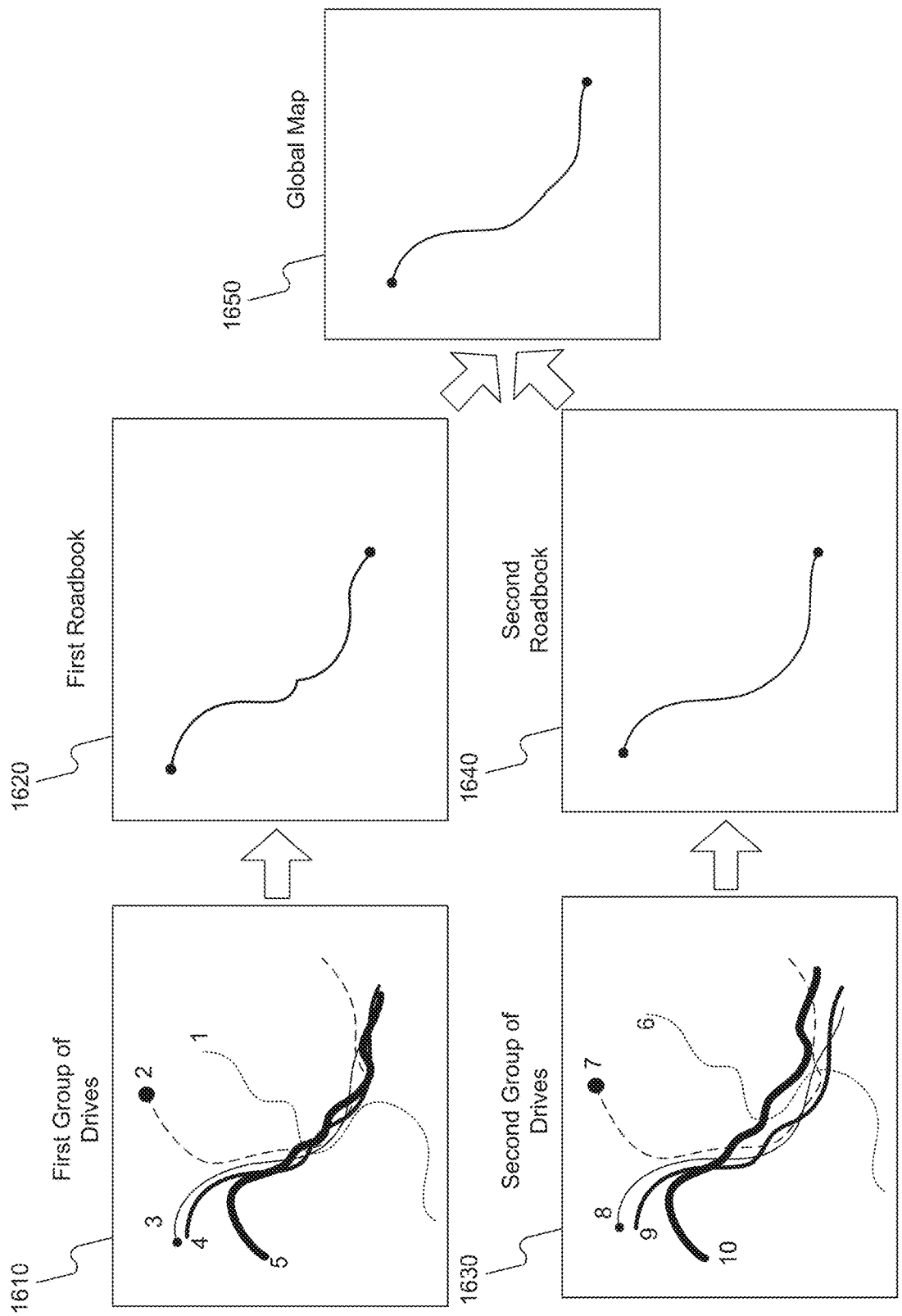
FIG. 16 shows example road data generated from combining navigational information from many drives and an example global map generated from combining road data, consistent with the disclosed embodiments.

FIG. 16 shows example roadbooks 1620 and 1640 generated from combining navigational information from many drives and an example global map 1650 generated from combining roadbooks, consistent with the disclosed embodiments. As depicted in FIG. 16, a first group of drives 1610 may include location data (e.g., GPS data) received from five separate drives along a common road segment. One drive may be separate from another drive if it was traversed by separate vehicles at the same time, by the same vehicle at separate times, or by separate vehicles at separate times. A remote server may generate a roadbook 1620 using one or more statistical techniques to align the location data along the road segment. For example, the remote server may determine whether variations in the location data represent actual divergences or statistical errors and may align the location data using a coordinate system determined by images captured during the drives. Accordingly, the alignment will be local to the road segment and will be self-consistent rather than consistent with an external coordinate system, such as a global coordinate system.

Similarly, a second group of drives 1630 may include location data (e.g., GPS data) received from five additional drives along the common road segment. The remote server may generate a roadbook 1640 using one or more statistical techniques to align the location data along the road segment. For example, the remote server may determine whether variations in the location data represent actual divergences or statistical errors and may align the location data using a coordinate system determined by images captured during the drives. Accordingly, the alignment will be local to the road segment and will be self-consistent rather than consistent with an external coordinate system, such as a global coordinate system.

First group of drives 1610 and second group of drives 1630 may be clustered by the remote server, e.g., according to the time of day in which the drives were undertaken, the day on which the drives were undertaken, one or more weather conditions during the drives, or the like. Accordingly, roadbook 1620 and roadbook 1640 may have increased accuracy compared to conventional techniques in which drives from different times of day, different days, and/or different weather conditions are aligned with each other.

As further depicted in FIG. 16, roadbooks 1620 and 1640 may be extrapolated to a global coordinate system and aligned as part of global map 1650. For example, the remote server may again one or more statistical techniques to align the location data along the road segment. The remote server may use GPS data or other data in the global coordinate system rather than images captured during the drives to ensure that the alignment of roadbooks 1620 and 1640 is performed in the global coordinate system rather than a local coordinate system. Because roadbooks 1620 and 1640 provide more accurate input than a single drive, global map 1650 has greater accuracy than if first group of drives 1610 and second group of drives 1630 had been directly aligned on the global coordinate system.

Although depicted with drive data, roadbooks 1620 and 1640 (as well as global map 1650) may further include one or more landmarks associated with the road segment and present in the images. For example, the landmarks may be aligned when roadbooks 1620 and 1640 are formed (or even used to align the drive data forming roadbooks 1620 and 1640). Similarly, the landmarks may be aligned when global map 1650 is formed (or even used to align roadbooks 1620 and 1640 globally).

Figure 17:
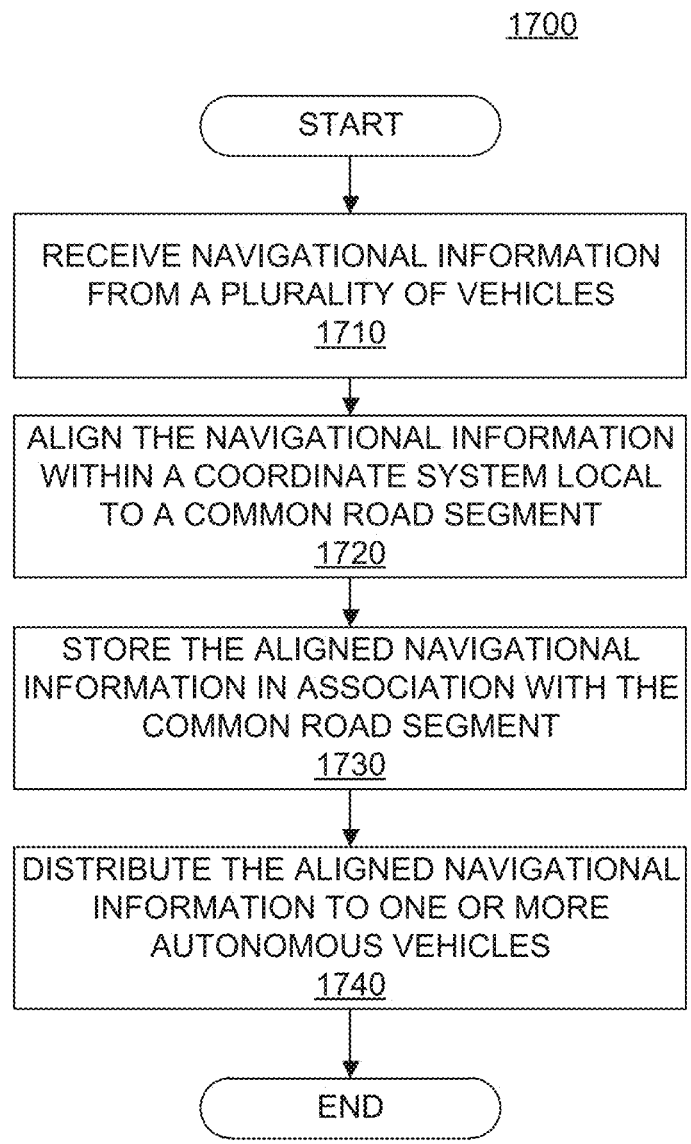
FIG. 17 is a flowchart showing an exemplary process for aligning navigation information from a plurality of vehicles consistent with the disclosed embodiments.

FIG. 17 provides a flowchart representing an example process 1700 for aligning navigation information from a plurality of vehicles consistent with the disclosed embodiments. Process 1700 may be performed by at least one processing device, such as processing device 110. Alternatively, process 1700 may be performed by at least one processing device of a server remote from a host vehicle.

At step 1710, the server may receive navigation information from a plurality of vehicles. For example, the navigation information from the plurality of vehicles may be associated with a common road segment. In some embodiments, as explained above with respect to navigational information receiving module 1502, the navigational information may include global positioning system (GPS) information and/or one or more landmarks included in images captured by the image sensors included on the plurality of vehicles. For example, the one or more landmarks may comprise visible objects along the common road segment. In such embodiments, the objects may comprise at least one of road markings and road signs.

In some embodiments, the navigational information may be received over a computer network (e.g., cellular, the Internet, etc.) by use of a radio frequency, infrared frequency, magnetic field, an electric field, or the like. The navigational information may be transmitted using any known standard to transmit and/or receive data (e.g., Wi-Fi, Bluetooth®, Bluetooth Smart, 802.15.4, ZigBee, etc.).

At step 1720, as explained above with respect to alignment module 1504, the server may align the navigation information within a coordinate system local to the common road segment. For example, the local coordinate system may comprise a coordinate system based on a plurality of images captured by image sensors included on the plurality of vehicles.

In some embodiments, aligning the navigational information may be based on the one or more landmarks. For example, as explained above, the server may adjust GPS data included in the navigation information based on alignment of the landmarks rather than adjusting the landmarks based on alignment of the GPS data.

At step 1730, as explained above with respect to storage module 1506, the server may store the aligned navigational information in association with the common road segment. For example, the navigation information may be stored in a database such that an identifier of the common road segment is stored with and used to index the aligned navigational information.

At step 1740, as explained above with respect to distribution module 1508, the server may distribute the aligned navigational information to one or more autonomous vehicles for use in autonomously navigating the one or more autonomous vehicles along the common road segment. For example, the one or more vehicles may request navigational information, and the server may transmit the aligned navigational information over a computer network (e.g., cellular, the Internet, etc.) in response to the request(s) and by use of a radio frequency, infrared frequency, magnetic field, an electric field, or the like. The aligned navigational information may be transmitted using any known standard to transmit and/or receive data (e.g., Wi-Fi, Bluetooth®, Bluetooth Smart, 802.15.4, ZigBee, etc.).

Method 1700 may further include additional steps. For example, in some embodiments, the plurality of vehicles may have captured the navigational information during a particular time period. In such embodiments, method 1700 may further include receiving additional navigational information from a second plurality of vehicles, the additional navigation information from the second plurality of vehicles being captured during a second time period and associated with the common road segment, and aligning the additional navigation information within a coordinate system local to the common road segment, the local coordinate system being a coordinate system based on a plurality of images captured by image sensors included on the second plurality of vehicles, and storing the aligned additional navigational information in association with the common road segment.

Additionally or alternatively, the plurality of vehicles may have captured the navigational information over a number of drives, the number of drives not exceeding a threshold number of drives. In such embodiments, method 1700 may further include receiving additional navigational information from a second plurality of vehicles, the additional navigation information from the second plurality of vehicles being captured over additional drives and associated with the common road segment, aligning the additional navigation information within a coordinate system local to the common road segment, the local coordinate system being a coordinate system based on a plurality of images captured by image sensors included on the second plurality of vehicles, and storing the aligned additional navigational information in association with the common road segment.

In any of the embodiments described above, method 1700 may further include extrapolating the aligned navigational information to a set of global coordinates and storing the globally aligned navigational information in association with the common road segment. Moreover, in embodiments including additional navigation information, method 1700 may further include extrapolating the aligned navigational information and the aligned additional navigational information to a set of global coordinates and storing the globally aligned navigational information and additional navigational information in association with the common road segment.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, 4K Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A navigational system for a host vehicle, the navigational system comprising:
at least one processing device comprising circuitry and a memory, wherein the memory includes instructions that when executed by the circuitry cause the at least one processor to:
receive a first output from a first data source associated with the host vehicle and a second output from a second data source associated with the host vehicle, wherein at least one of the first data source and the second data source comprise a sensor onboard the host vehicle;

identify a representation of a target object in the first output;

determine a characteristic of the target object based on the first output, the characteristic including at least one of a type or a size of the target object;

determine whether the characteristic of the target object triggers at least one navigational constraint, the at least one navigational constraint comprising a limitation imposed on one or more navigational actions available to the host vehicle;

based on a determination that the at least one navigational constraint is not triggered by the characteristic of the target object, verify the identification of the representation of the target object based on a combination of the first output and the second output;

based on a determination that the at least one navigational constraint is triggered by the characteristic of the target object, verify the identification of the representation of the target object based on the first output; and in response to the verification, cause at least one navigational change to the host vehicle.

2. The system of claim 1, wherein the at least one navigational change includes slowing the host vehicle.

3. The system of claim 1, wherein the at least one navigational change includes accelerating the host vehicle.

4. The system of claim 1, wherein the at least one navigational change includes activating a steering mechanism of the host vehicle.

5. The system of claim 1, wherein the first data source comprises at least one of a camera, a lidar, or a radar onboard the host vehicle.

6. The system of claim 1, wherein the second data source comprises map data accessed by the at least one processing device.

7. The system of claim 1, wherein verifying the identification of the representation of the target object based on the combination of the first output and the second output comprises determining whether a representation of the target object is identified in both the first output and the second output.

8. The system of claim 1, wherein verifying the identification of the representation of the target object based on the combination of the first output and the second output comprises determining the characteristic of the target object using the second output projected onto the first output.

9. The system of claim 8, wherein the second output comprises map data, the first output comprises at least one image of an environment of the host vehicle, and the projection comprises detecting one or more road edges in the at least one image using the map data.

10. The system of claim 8, wherein the second output comprises output from a lidar, the first output comprises at least one image of an environment of the host vehicle, and the projection comprises detecting free space in the at least one image using the second output.

11. The system of claim 1, wherein the characteristic of the target object further includes a distance from the host vehicle to the target object.

12. The system of claim 1, wherein the characteristic of the target object further includes a location of the target object in an environment of the host vehicle.

13. A computer-implemented method for navigating a host vehicle, the method comprising:

receiving a first output from a first data source associated with the host vehicle and a second output from a second data source associated with the host vehicle, wherein at least one of the first data source and the second data source comprise a sensor onboard the host vehicle;

identifying a representation of a target object in the first output;

determining a characteristic of the target object based on the first output, the characteristic including at least one of a type or a size of the target object;

determining whether the characteristic of the target object triggers at least one navigational constraint, the at least one navigational constraint comprising a limitation imposed on one or more navigational actions available to the host vehicle;

based on a determination that the at least one navigational constraint is not triggered by the characteristic of the target object, verifying the identification of the representation of the target object based on a combination of the first output and the second output;

based on a determination that the at least one navigational constraint is triggered by the characteristic of the target object, verifying the identification of the representation of the target object based on the first output; and in response to the verification, causing at least one navigational change to the host vehicle.

14. The method of claim 13, wherein the at least one navigational change includes at least one of slowing the host vehicle, accelerating the host vehicle, or activating a steering mechanism of the host vehicle.

15. The method of claim 13, wherein the first data source comprises at least one of a camera, a lidar, or a radar onboard the host vehicle.

16. The method of claim 13, wherein the second data source comprises map data accessed by the at least one processing device.

17. The method of claim 13, wherein verifying the identification of the representation of the target object based on the combination of the first output and the second output comprises determining whether a representation of the target object is identified in both the first output and the second output.

18. The method of claim 13, verifying the identification of the representation of the target object based on the combination of the first output and the second output comprises determining the characteristic of the target object using the second output projected onto the first output.

19. A non-transitory, computer-readable medium storing instructions that, when executed by at least one processing device, cause at least one processing device to:

receive a first output from a first data source associated with a host vehicle and a second output from a second data source associated with the host vehicle, wherein at least one of the first data source and the second data source comprise a sensor onboard the host vehicle;

identify a representation of a target object in the first output;

determine a characteristic of the target object based on the first output, the characteristic including at least one of a type or a size of the target object;

determine whether the characteristic of the target object triggers at least one navigational constraint, the at least one navigational constraint comprising a limitation imposed on one or more navigational actions available to the host vehicle;

based on a determination that the at least one navigational constraint is not triggered by the characteristic of the target object, verify the identification of the representation of the target object based on a combination of the first output and the second output;

based on a determination that the at least one navigational constraint is triggered by the characteristic of the target object, verify the identification of the representation of the target object based on the first output; and in response to the verification, cause at least one navigational change to the host vehicle.

* * * * *